United States Patent
Yoshimura

(10) Patent No.: US 9,430,845 B2
(45) Date of Patent: Aug. 30, 2016

(54) SEMICONDUCTOR DEVICE, IMAGE SEGMENTATION METHOD, AND IMAGE PROCESSOR

(71) Applicant: Hitachi, Ltd., Tokyo (JP)

(72) Inventor: Chihiro Yoshimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/638,613

(22) Filed: Mar. 4, 2015

(65) Prior Publication Data
US 2016/0063725 A1    Mar. 3, 2016

(30) Foreign Application Priority Data

Aug. 29, 2014 (JP) .................................. 2014-176126

(51) Int. Cl.
*G06K 9/34* (2006.01)
*G06T 7/00* (2006.01)
*G06T 1/20* (2006.01)

(52) U.S. Cl.
CPC .............. *G06T 7/0087* (2013.01); *G06T 1/20* (2013.01); *G06T 2207/20076* (2013.01); *G06T 2207/20112* (2013.01)

(58) Field of Classification Search
CPC .......... G06T 2207/20076; G06T 2207/20112; G06T 7/0087; G06T 1/20
See application file for complete search history.

(56) References Cited

U.S. PATENT DOCUMENTS

2009/0307660 A1*  12/2009  Srinivasan .............. G06F 8/314
                                                              717/114
2010/0322525 A1*  12/2010  Kohli .................... G06K 9/6297
                                                              382/226
2014/0046626 A1    2/2014  Yamamoto et al.

FOREIGN PATENT DOCUMENTS

JP     2012-217518 A     11/2012
WO     2012/118064 A1    9/2012

* cited by examiner

*Primary Examiner* — Phuoc Tran
(74) *Attorney, Agent, or Firm* — Volpe and Koenig, P.C.

(57) ABSTRACT

A semiconductor device in which components each serving as a basic constitutional unit are arranged in order to find a solution of an interaction model. The semiconductor device includes multiple units each of which has: a first memory cell for scoring a value indicating a state of one node of the interaction model; a second memory cell for storing an interaction coefficient indicating an interaction from another node connected to the one node; a third memory cell for storing a flag for fixing a value of the first memory cell; a first arithmetic circuit that decides a next state of the one node based on a value indicating a state of the other node and the interaction coefficient; and a second arithmetic circuit that decides whether or not to record a value indicating the next state in the first memory cell according to a value of the flag.

12 Claims, 40 Drawing Sheets

SPIN UNIT 300

- SPIN
- INTERACTION COEFFICIENT
- EXTERNAL MAGNETIC FIELD COEFFICIENT

Fig.12

MEMORY MAP 2000

| ADDRESS | BIT 0 | BIT 1 | BIT 2 | BIT 3 | BIT 4 | BIT 5 |
|---|---|---|---|---|---|---|
| 0 | N | N | N | N | N | N |
| 1 | IS0 | IS0 | IS0 | IS0 | IS0 | IS0 |
| 2 | IS1 | IS1 | IS1 | IS1 | IS1 | IS1 |
| 3 | IU0 | IU0 | IU0 | IU0 | IU0 | IU0 |
| 4 | IU1 | IU1 | IU1 | IU1 | IU1 | IU1 |
| 5 | IL0 | IL0 | IL0 | IL0 | IL0 | IL0 |
| 6 | IL1 (N000) | IL1 (N001) | IL1 (N100) | IL1 (N101) | IL1 (N200) | IL1 (N201) |
| 7 | IR0 | IR0 | IR0 | IR0 | IR0 | IR0 |
| 8 | IR1 | IR1 | IR1 | IR1 | IR1 | IR1 |
| 9 | ID0 | ID0 | ID0 | ID0 | ID0 | ID0 |
| 10 | ID1 | ID1 | ID1 | ID1 | ID1 | ID1 |
| 11 | IF0 | IF0 | IF0 | IF0 | IF0 | IF0 |
| 12 | IF1 | IF1 | IF1 | IF1 | IF1 | IF1 |
| 13 | N | N | N | N | N | N |
| 14 | IS0 | IS0 | IS0 | IS0 | IS0 | IS0 |
| 15 | IS1 | IS1 | IS1 | IS1 | IS1 | IS1 |
| 16 | IU0 | IU0 | IU0 | IU0 | IU0 | IU0 |
| 17 | IU1 | IU1 | IU1 | IU1 | IU1 | IU1 |
| 18 | IL0 | IL0 | IL0 | IL0 | IL0 | IL0 |
| 19 | IL1 (N010) | IL1 (N011) | IL1 (N110) | IL1 (N111) | IL1 (N210) | IL1 (N211) |
| 20 | IR0 | IR0 | IR0 | IR0 | IR0 | IR0 |
| 21 | IR1 | IR1 | IR1 | IR1 | IR1 | IR1 |
| 22 | ID0 | ID0 | ID0 | ID0 | ID0 | ID0 |
| 23 | ID1 | ID1 | ID1 | ID1 | ID1 | ID1 |
| 24 | IF0 | IF0 | IF0 | IF0 | IF0 | IF0 |
| 25 | IF1 | IF1 | IF1 | IF1 | IF1 | IF1 |
| 26 | N | N | N | N | N | N |
| 27 | IS0 | IS0 | IS0 | IS0 | IS0 | IS0 |
| 28 | IS1 | IS1 | IS1 | IS1 | IS1 | IS1 |
| 29 | IU0 | IU0 | IU0 | IU0 | IU0 | IU0 |
| 30 | IU1 | IU1 | IU1 | IU1 | IU1 | IU1 |
| 31 | IL0 | IL0 | IL0 | IL0 | IL0 | IL0 |
| 32 | IL1 (N020) | IL1 (N021) | IL1 (N120) | IL1 (N121) | IL1 (N220) | IL1 (N221) |
| 33 | IR0 | IR0 | IR0 | IR0 | IR0 | IR0 |
| 34 | IR1 | IR1 | IR1 | IR1 | IR1 | IR1 |
| 35 | ID0 | ID0 | ID0 | ID0 | ID0 | ID0 |
| 36 | ID1 | ID1 | ID1 | ID1 | ID1 | ID1 |
| 37 | IF0 | IF0 | IF0 | IF0 | IF0 | IF0 |
| 38 | IF1 | IF1 | IF1 | IF1 | IF1 | IF1 |

Fig.17

PROBLEM DEFINITION 1700

INTERACTION DEFINITION PART 1710

| INTERACTION SOURCE SPIN | INTERACTION DESTINATION SPIN | INTERACTION COEFFICIENT |
|---|---|---|
| v1 | v2 | J12 |
| v2 | v1 | J21 |
| v1 | v3 | J13 |
| v1 | v2 | J12 |

EXTERNAL MAGNETIC FIELD COEFFICIENT DEFINITION PART 1720

| SPIN | EXTERNAL MAGNETIC FIELD COEFFICIENT |
|---|---|
| v1 | h1 |
| v2 | h2 |

EXPLANATORY NOTES

- $v_i$     IDENTIFIER OF SPIN
- $J_{ij}$    INTERACTION COEFFICIENT (FROM i-th SPIN TO j-th SPIN)
- $h_i$     EXTERNAL MAGNETIC FIELD COEFFICIENT (i-th SPIN)

Fig.18

```
         ┌─ PROBLEM DATA 1800
         │
    ┌────┴─────────────────┐
    │ I  v1  v2  J12       │
    │ I  v2  v1  J21       │
    │ I  v1  v3  J13       │
    │ I  v1  v2  J12       │
    │ E  v1  h1            │
    │ E  v2  h2            │
    └──────────────────────┘
```

EXPLANATORY NOTES

I      IDENTIFIER INDICATING INTERACTION COEFFICIENT DEFINITION PART

E      IDENTIFIER INDICATING EXTERNAL MAGNETIC FIELD DEFINITION PART $v$ $i$      IDENTIFIER OF SPIN $Jij$      INTERACTION COEFFICIENT (FROM i-th SPIN TO j-th SPIN)

$Hi$      EXTERNAL MAGNETIC FIELD COEFFICIENT (i-th SPIN)

SOLUTION 1900

| SPIN | VALUE OF SPIN |
|---|---|
| v1 | σ1 |
| v2 | σ2 |
| v3 | σ3 |

SOLUTION DATA 1920

σ1 σ2 σ3

EXPLANATORY NOTES $vi$     IDENTIFIER OF SPIN $\sigma i$     VALUE OF i-th SPIN (BINARY OF -1/+1)

Fig.20
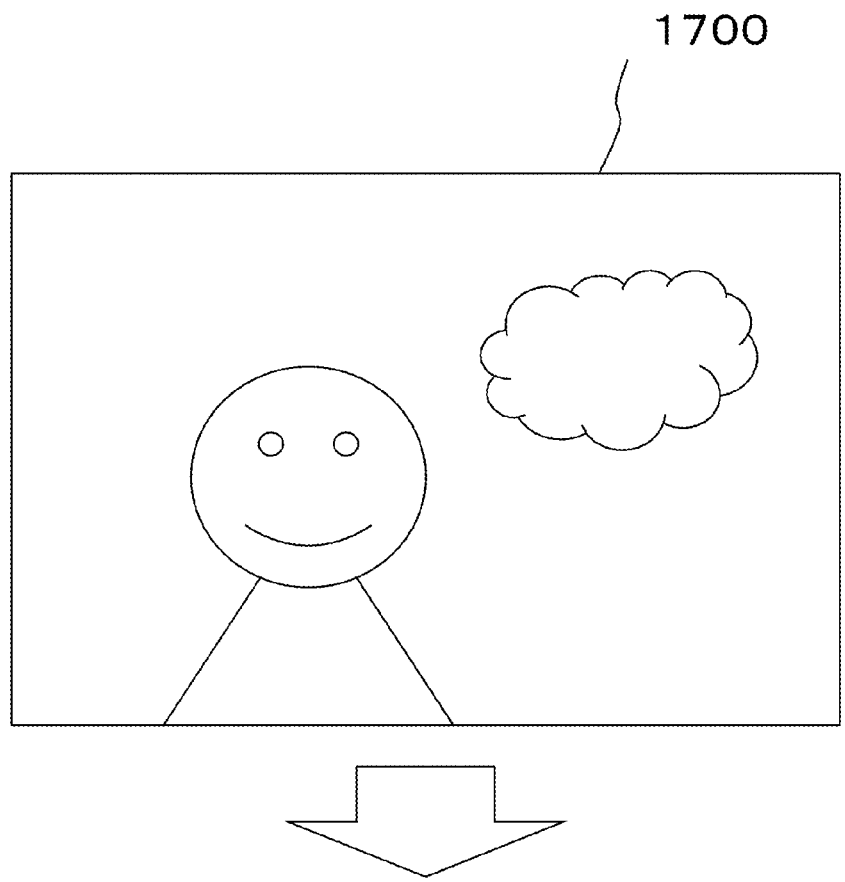
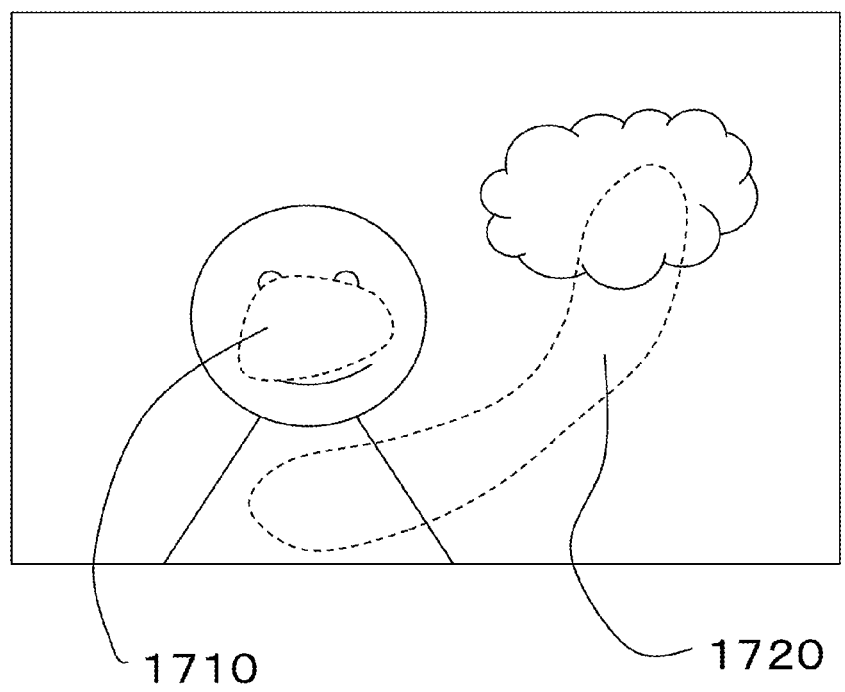

- ⊕ SPIN
- ⊖ SPIN (FIXED TO -1)

- ▭ INTERACTION COEFFICIENT (SMOOTHING TERM)
- ▭ INTERACTION COEFFICIENT (BACKGROUND DATA TERM)
- ▢ EXTERNAL MAGNETIC FIELD COEFFICIENT (FOREGROUND DATA TERM)

⊕ Spin

▭ INTERACTION TERM (SMOOTHING TERM)

☐ EXTERNAL MAGNETIC FIELD COEFFICIENT (DATA TERM)
= FOREGROUND DATA TERM - BACKGROUND DATA TERM

Fig.33

| DEFINITION OF SPIN INITIAL VALUE3300 | | |
|---|---|---|
| SPIN | VALUE OF SPIN | FIXED FLAG |
| v1 | σ1 | True/False |
| v2 | σ2 | True/False |
| v3 | σ3 | True/False |

| ADDRESS | BIT0 | BIT1 | BIT2 | BIT3 | BIT4 | BIT5 |
|---|---|---|---|---|---|---|
| 0 | N | N | N | N | N | N |
| 1 | FIX | FIX | FIX | FIX | FIX | FIX |
| 2 | IS0 | N/A | IS0 | N/A | IS0 | N/A |
| 3 | IS1 | N/A | IS1 | N/A | IS1 | N/A |
| 4 | IU0 | N/A | IU0 | N/A | IU0 | N/A |
| 5 | IU1 | N/A | IU1 | N/A | IU1 | N/A |
| 6 | IL0 (N000) | N/A (N001) | IL0 (N100) | N/A (N101) | IL0 (N200) | N/A (N201) |
| 7 | IL1 | N/A | IL1 | N/A | IL1 | N/A |
| 8 | IR0 | N/A | IR0 | N/A | IR0 | N/A |
| 9 | IR1 | N/A | IR1 | N/A | IR1 | N/A |
| 10 | ID0 | N/A | ID0 | N/A | ID0 | N/A |
| 11 | ID1 | N/A | ID1 | N/A | ID1 | N/A |
| 12 | IF0 | N/A | IF0 | N/A | IF0 | N/A |
| 13 | IF1 | N/A | IF1 | N/A | IF1 | N/A |
| 14 | N | N | N | N | N | N |
| 15 | FIX | FIX | FIX | FIX | FIX | FIX |
| 16 | IS0 | N/A | IS0 | N/A | IS0 | N/A |
| 17 | IS1 | N/A | IS1 | N/A | IS1 | N/A |
| 18 | IU0 | N/A | IU0 | N/A | IU0 | N/A |
| 19 | IU1 | N/A | IU1 | N/A | IU1 | N/A |
| 20 | IL0 (N010) | N/A (N011) | IL0 (N110) | N/A (N111) | IL0 (N210) | N/A (N211) |
| 21 | IL1 | N/A | IL1 | N/A | IL1 | N/A |
| 22 | IR0 | N/A | IR0 | N/A | IR0 | N/A |
| 23 | IR1 | N/A | IR1 | N/A | IR1 | N/A |
| 24 | ID0 | N/A | ID0 | N/A | ID0 | N/A |
| 25 | ID1 | N/A | ID1 | N/A | ID1 | N/A |
| 26 | IF0 | N/A | IF0 | N/A | IF0 | N/A |
| 27 | IF1 | N/A | IF1 | N/A | IF1 | N/A |
| 28 | N | N | N | N | N | N |
| 29 | FIX | FIX | FIX | FIX | FIX | FIX |
| 30 | IS0 | N/A | IS0 | N/A | IS0 | N/A |
| 31 | IS1 | N/A | IS1 | N/A | IS1 | N/A |
| 32 | IU0 | N/A | IU0 | N/A | IU0 | N/A |
| 33 | IU1 | N/A | IU1 | N/A | IU1 | N/A |
| 34 | IL0 (N020) | N/A (N021) | IL0 (N120) | N/A (N121) | IL0 (N220) | N/A (N221) |
| 35 | IL1 | N/A | IL1 | N/A | IL1 | N/A |
| 36 | IR0 | N/A | IR0 | N/A | IR0 | N/A |
| 37 | IR1 | N/A | IR1 | N/A | IR1 | N/A |
| 38 | ID0 | N/A | ID0 | N/A | ID0 | N/A |
| 39 | ID1 | N/A | ID1 | N/A | ID1 | N/A |
| 40 | IF0 | N/A | IF0 | N/A | IF0 | N/A |
| 41 | IF1 | N/A | IF1 | N/A | IF1 | N/A |

Fig.35

| ADDRESS | BIT0 | BIT1 | BIT2 | BIT3 | BIT4 | BIT5 |
|---|---|---|---|---|---|---|
| 0 | 1 | 0 | RANDOM | 0 | RANDOM | 0 |
| 1 | 1 | N/A | 0 | N/A | 0 | N/A |
| 2 | IS0 | N/A | IS0 | N/A | IS0 | N/A |
| 3 | IS1 | N/A | IS1 | N/A | IS1 | N/A |
| 4 | IU0 | N/A | IU0 | N/A | IU0 | N/A |
| 5 | IU1 | N/A | IU1 | N/A | IU1 | N/A |
| 6 | IL0 (N000) | N/A (N001) | IL0 (N100) | N/A (N101) | IL0 (N200) | N/A (N201) |
| 7 | IL1 | N/A | IL1 | N/A | IL1 | N/A |
| 8 | IR0 | N/A | IR0 | N/A | IR0 | N/A |
| 9 | IR1 | N/A | IR1 | N/A | IR1 | N/A |
| 10 | ID0 | N/A | ID0 | N/A | ID0 | N/A |
| 11 | ID1 | N/A | ID1 | N/A | ID1 | N/A |
| 12 | IF0 | N/A | IF0 | N/A | IF0 | N/A |
| 13 | IF1 | N/A | IF1 | N/A | IF1 | N/A |
| 14 | 1 | 0 | RANDOM | 0 | RANDOM | 0 |
| 15 | 1 | N/A | 0 | N/A | 0 | N/A |
| 16 | IS0 | N/A | IS0 | N/A | IS0 | N/A |
| 17 | IS1 | N/A | IS1 | N/A | IS1 | N/A |
| 18 | IU0 | N/A | IU0 | N/A | IU0 | N/A |
| 19 | IU1 | N/A | IU1 | N/A | IU1 | N/A |
| 20 | IL0 (N010) | N/A (N011) | IL0 (N110) | N/A (N111) | IL0 (N210) | N/A (N211) |
| 21 | IL1 | N/A | IL1 | N/A | IL1 | N/A |
| 22 | IR0 | N/A | IR0 | N/A | IR0 | N/A |
| 23 | IR1 | N/A | IR1 | N/A | IR1 | N/A |
| 24 | ID0 | N/A | ID0 | N/A | ID0 | N/A |
| 25 | ID1 | N/A | ID1 | N/A | ID1 | N/A |
| 26 | IF0 | N/A | IF0 | N/A | IF0 | N/A |
| 27 | IF1 | N/A | IF1 | N/A | IF1 | N/A |
| 28 | RANDOM | 0 | RANDOM | 0 | RANDOM | 0 |
| 29 | 0 | N/A | 0 | N/A | 0 | N/A |
| 30 | IS0 | N/A | IS0 | N/A | IS0 | N/A |
| 31 | IS1 | N/A | IS1 | N/A | IS1 | N/A |
| 32 | IU0 | N/A | IU0 | N/A | IU0 | N/A |
| 33 | IU1 | N/A | IU1 | N/A | IU1 | N/A |
| 34 | IL0 (N020) | N/A (N021) | IL0 (N120) | N/A (N121) | IL0 (N220) | N/A (N221) |
| 35 | IL1 | N/A | IL1 | N/A | IL1 | N/A |
| 36 | IR0 | N/A | IR0 | N/A | IR0 | N/A |
| 37 | IR1 | N/A | IR1 | N/A | IR1 | N/A |
| 38 | ID0 | N/A | ID0 | N/A | ID0 | N/A |
| 39 | ID1 | N/A | ID1 | N/A | ID1 | N/A |
| 40 | IF0 | N/A | IF0 | N/A | IF0 | N/A |
| 41 | IF1 | N/A | IF1 | N/A | IF1 | N/A |

SEMICONDUCTOR DEVICE, IMAGE SEGMENTATION METHOD, AND IMAGE PROCESSOR

CLAIM OF PRIORITY

The present application claims priority from Japanese application serial no. JP2014-176126, filed on Aug. 29, 2014, the content of which is hereby incorporated by reference into this application.

BACKGROUND

The present invention relates to a device for calculating an interaction model.

Currently, the mainstream of computer architectures is the Neumann type. A basic action of the Neumann type architecture is successive execution of an instruction sequence. Heretofore, improvement in performance of the computer has mainly depexided on improvement in clock frequency. However, in recent years, instead of the clock, frequency that has hit the ceiling, a method for improving the performance by parallel processing by realizing multi core in the processor has become a mainstream.

In parallel processing by realisation of multi cores, improvement in the performance is attained by finding portions that can be executed in parallel from a successive instruction sequence (extraction of parallelism), and executing them in parallel. However, it is not easy to extract parallelism from a program that is written down as an instruction sequence from a successive algorithm.

Taking such a situation into consideration, in order to attain improvement in the performance of the computer from now on, it is necessary to shift to essentially parallel information processing not being based on execution of the successive instruction sequence like before. For that purpose, a method for describing a problem suitable to realising essentially parallel information processing is needed instead of a method for describing a problem with the conventional successive instruction sequence.

Various physical phenomena and social phenomena can be represented by the interaction model. The interaction model is a model that is defined with multiple entities constituting the model, an interaction between nodes, and, if necessary, a bias for every node. Various models have been proposed in physics and social science, any one of which can be interpreted as one mode of the interaction model. Moreover, as a feature of the interaction model, it can be enumerated that an influence between the nodes is limited to an interaction between two nodes (interaction between two bodies). For example, considering dynamics of planets in space, although it can foe interpreted as a kind of the interaction model in a respect that an interaction by universal gravitation exists between nodes called planets, an influence between the planets is not only one between two planets bat also three or more planets mutually influence one another, causing complex behaviors (this becomes a so-called three-body problem or many-body problem).

Moreover, in the world of biology, a neural network that models the brain is one example of the interaction model. In the neural network, an artificial neuron that imitates the neuron of the nerve cell is made to serve as a node, and artificial neurons have an interaction called a synaptic connection between them. Moreover, there is also a case where a bias is given to each neuron. In the world of social science, when communication between human beings is considered, for example, it can foe easily understood that there is a node called a human being and an interaction accomplished by a language and communication. Moreover, it can also be imagined that a bias exists individually in each human being. Therefore, a research that imitates human beings' communication as an Ising model etc. that is common in terms of the interaction model and tries to make clear its characteristic are being conducted (for example, see Japanese Unexamined Patent Application Publication No. 2012-217518).

The Ising model that is one example of the interaction models is a model of statistical mechanics for explaining a behavior of a magnetic substance, and is used for research of the magnetic substance. The Ising model is defined as an interaction between sites (spins that take a binary of +1/−1). It is known that finding a ground state of the Ising model whose topology is a nonplanar graph is an NP hard problem. Since the Ising model represents a problem with interaction coefficients that spread in directions of space, it may be able to realise information processing that uses essential parallelism.

Incidentally, since it is the NP hard problem to find the ground state of the Ising model as described above, solving it with the Neumann computer poses a difficulty in the respect of a calculation time. Although an algorithm that attains improvement in speed toy introducing heuristics is also proposed, a calculation that uses a physical phenomenon more directly, not being the Neumann computer, namely, a method for finding the ground state of the Ising model at high speed with an analog computer is proposed.

As such a device, there is a device described in WO 2012/118054, for example. With such a device, parallel degree corresponding to a problem to solve is needed. In the case of the Ising model, corresponding to the number of spins of the Ising model whose ground state should be searched, an element that realizes the spin and the interaction becomes necessary. For example, in a device described in WO 2012/118064, a spin and a laser are made to correspond to each other, the lasers whose number is proportional to the number of the spins become necessary. That is, height of scalability that can realise a large number of elements is required. Therefore, it is desirable that a device for finding the ground state of the Ising model at high speed is one in which a large number of circuits each acting as a unit component are arranged on a semiconductor substrate. That such a design, principle is effective in order to obtain the high scalability may foe clear from examples of semiconductor memory like dynamic random access memory (DRAM) and static random access memory (SRAM) that are currently used widely.

Furthermore, in realizing such a device capable of finding the ground state of the Ising model at high speed, its application must be also considered together with it. Moreover, a cooperative design of the application and the device such as making the device for finding the ground state of the Icing model reflect the application according to its characteristic becomes important.

As applications, one such that a calculation amount is large, and therefore it is hard for the conventional computer to handle it or a huge resource is required is promising. Moreover, since the device as described above can also be expected to be in a smaller size and have a lower power consumption, than the conventional computer, an application to a so-called embedded system that is used being incorporated in various apparatuses can be expected.

As an application having such, a characteristic, there is image processing. Since the image processing has generally many steps of processing each having a large amount of calculation, conventionally there have been many approaches in which an exclusive processor for image processing is developed and used. In particular, image processing whose demand is increasing in recent years is medical-oriented image processing (hereinafter, described as medical image processing). For example, in diagnosis, image segmentation where the inside of the patient's body is photographed by computer tomography (CT) and an affected part such as a tumor is extracted from the image becomes necessary. Moreover, there may come out a necessity of performing the medical image processing in real time such as performing radiation therapy while seeing the inside of the patient body by CT in the future. It has high industrial usefulness that the image processing, typified by the image segmentation, can be realized in real time with a small-sized and small-power-consumption device, and there is an expectation for a device for performing ground state search of the Ising model at high speed as described above.

SUMMARY OF THE INVENTION

The present invention aims at realizing a configuration of calculating an interaction model with solid state components that is created by application of the technology of the semiconductor device.

One profile of the present invention for solving the abovementioned problem is provided as a semiconductor device. Thus the semiconductor device includes multiple units each of which has: a first memory cell for storing a value indicating a state of one node of the interaction model; a second memory cell for storing an interaction coefficient indicating an interaction from another node connected to the one node; a third memory cell for storing a flag for fixing the value of the first memory cell; a first arithmetic circuit that decides a next state of the one node based on a value indicating a state of the other node and the interaction coefficient; and a second arithmetic circuit that decides whether or not to record the value indicating the next state in the first memory cell according to a value of the flag.

Another profile of the present invention is an image segmentation method for extracting a pixel that has a characteristic similar to a characteristic (feature) of a seed pixel specified by a user from multiple pixels included in an image. This method is an image segmentation method for extracting a pixel that has a characteristic similar to the characteristic of the seed pixel specified toy the user from multiple pixels included in the image, and uses an array having multiple units each of which has: a memory cell for storing a value of one node of the interaction model; a memory cell for storing an interaction coefficient from another node that exerts an interaction on the one node, a memory cell for storing a bias coefficient of the one nods; and a logic circuit that decides and rewrites a next state of one node based on a function of indicating a state of a system including the one node and the other nodes. Then, the multiple pixels included in the image are made to correspond to one node of the multiple units, a value of the one node is read after rewriting the one node a prescribed number of times, and the value is designated as a result of the segmentation.

Another profile of the present invention is an image processor that has an input device, an output device, a storage device, and first and second processors. The first processor includes an array having multiple units each of which has: a memory cell for storing a value of an attention node of an interaction model; a memory cell for storing an interaction coefficient from a neighbor node that exerts an interaction on the node; and a logic circuit that decides and rewrites a next state of the attention node based on a function of indicating a state of a system including the attention node and the neighbor nodes. The second processor includes a function of making the storage device store an image inputted from the output device; a function of making the output device display the image inputted from the input device; a function of permitting a user to specify a predetermined region of the image displayed as a seed region through the input device; a function of making multiple pixels included in the image correspond to the attention node of multiple units; a function of setting the attention node corresponding to a pixel in the specified region of the image to a first state; and a function of rewriting the attention node a prescribed number of times with a logic circuit, in which a value of the attention node is read after rewriting the attention node a prescribed number of times, and a pixel corresponding to the attention node set to the first state is displayed on the output device as being belonging to the seed region specified by the user.

It is possible to realize a configuration of searching a solution of a state that takes a desired value in a function representing the interaction model with a solid state component created by applying a technology of the semiconductor device.

Problems, configurations, and effects other than what is described above will be clarified by explanations of the following embodiments.

BRIEF DESCRIPTION OF THE DRAWINGS

FIG. 12 is a plan view showing one example of a memory map of the Ising chip;

FIG. 17 is a table diagram showing a configuration of a problem definition of the Ising chip;

FIG. 18 is a table diagram showing a configuration of problem data of the Ising chip;

FIG. 20 is a plan view for explaining an operation of image segmentation;

FIG. 33 is a diagram showing a configuration of a spin initial value definition of the Ising chip;

FIG. 34 is a plan view showing one example of the memory map of the Ising chip;

FIG. 35 is a plan view showing an example of memory contents of the Ising chip in which a spin initial value for the image segmentation is set;

DETAIL DESCRIPTION OF THE PREFERRED EMBODIMENTS

Figure 1:
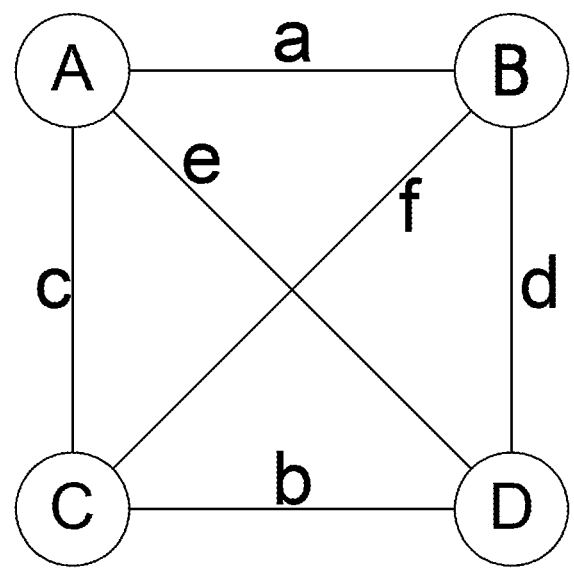
FIG. 1 is a graphical representation for explaining one example of a graph problem that an Ising chip solves.

As an example of typical interaction models in the world of physics, an Ising model can foe given. The Ising model considers a spin that fakes two states of +1/−1 (or an upward direction and a downward direction, etc.) as a node and the model is defined with an interaction coefficient that decides the interaction between two spins and an external magnetic field coefficient that is a bias to each spin. In this embodiment, as a unit for calculating the interaction model, an Ising chip that is a device capable of handling the Ising model is taken as an example and explained. As may well be guessed, the present invention can be generally applied to a technology of calculating a value that a variable of the function takes when a value of a function representing the interaction model is converged to a desired value in the model, and its application is not limited to the Ising model. Moreover, although the device in the embodiment is called the ising chip for convenience, it does hot preclude the present invention being applied to interaction models other than the Ising model.

One example of this embodiment is provided as a semiconductor device. This semiconductor device includes multiple spin units each of which includes: a memory cell for storing a value of a specified spin (attention spin) of the Ising model; a memory cell for storing the interaction coefficients from neighbor spins each exerting an interaction on the attention spin; a memory cell for storing the external magnetic field coefficient of the attention spin; a memory cell for storing a flag for fixing a value of the memory cell for storing the value of the attention spin; and a logic circuit for deciding a next state of the attention spin based on an energy function of a system including the attention spin and the neighbor spins. The multiple spin, units form an array structure.

Another example of this embodiment is an image segmentation method for extracting a pixel that has a characteristic similar to a characteristic (feature) of a seed pixel specified by a user from multiple pixels included in an image.

This method uses a spin array having the multiple spin units each of which has: a memory cell for storing a value of the attention spin of the Ising model; a memory cell for storing the interaction coefficients from the neighbor spins each exerting an interaction on the spin; a memory cell for storing the external magnetic field coefficient of the attention spin; and a logic circuit that decides and rewrites the next state of the attention spin based on the energy function of the system including the attention spin and the neighbor spins.

Then, multiple pixels included in the image are made to correspond to the attention spin of the multiple spin units, and the value of the attention spin is read after rewriting the attention spin for the prescribed number of times and is designated as a result of the segmentation.

Another, example of this embodiment is an image processor that has an input device, an output device, a storage device, and first and second processors.

The first processor includes a spin array having the multiple spin units each of which has; a memory cell for storing a value of the attention spin of the Ising model; a memory cell for storing the interaction coefficients from the neighbor spins each exerting an interaction on the spin; a memory cell for storing the external magnetic field coefficient of the attention spin; and a logic circuit that decides and rewrites the next state of the attention spin based on the energy function of the system including the attention spin and the neighbor spins.

The second processor has: a function of making a storage device store an image inputted from an input device; a function of making an output device display the image inputted from the input device; a function of making the input device permit the user to specify a predetermined region of the displayed image as a seed region; a function of making multiple pixels included in the image correspond to attention spins of the multiple spin units; and a function of setting the attention spin corresponding to a pixel in the specified region of the image to a first state; and a function of rewriting the attention spin a prescribed number of times with a logic circuit, in which a value of the attention spin is read after rewriting the attention spin a prescribed number of times and a pixel corresponding to the attention spin set to the first state is displayed on the output device as being belonging to the seed region specified by the user.

Moreover, the second processor may have a function that creates an Ising model for performing the segmentation from data of the inputted image and data of the seed region, and maps a site (spin) of which the Ising model is comprised and the coefficient in the spin array. At this time, the map shall maintain a topology of the Ising model.

Hereinafter, embodiments of the present invention will be described by drawings. In the first half, an embodiment of a basic configuration of the Ising chip that performs ground state search of the interaction model will be explained. In the second half, an embodiment about an application of the Ising chip will be explained.

However, the present invention shall not be interpreted as being limited to description contents of the embodiment that will be illustrated below. A person skilled in the art can easily understand that its concrete configuration can be modified without deviating from the idea or gist of the present invention.

In the configuration of the present invention explained below, the same reference letter is used for the same portion or a portion having the identical function in common between different drawings, and a repeated explanation is omitted.

Notations of "the first," "the second," "the third," etc, in this specification etc. are attached in order to identify components, and they necessarily limit neither the number of if nor an order between them.

A position, a size, a shape, a range, etc, of each component shown in the drawing etc, may not represent actual position, size, shape, range, etc, in order to make understanding of the present invention, easy. For this reason, the present invention is not necessarily limited by a position, a size, a shape, a range, etc. that are disclosed in the drawings etc.

The publications, patents, and patent applications that are quoted in this specification constitute a part of explanations of this specification as they are.

(1) Basic Configuration of Ising Chip

Below, the Ising chip that is a concrete embodiment of the device for performing the ground state search of the interaction model of the present invention will be explained. The Ising chip has multiple units each having first to seventh memory cells of binary or mutivalued number (ternary and multiple value number more than ternary are called multivalued number). To a certain one unit (attention unit), pieces of data of the seventh memory cells of first to fifth units other than the attention unit are inputted, a calculation is performed based on five pieces of data from the other units and pieces of data of the first to sixth memory cells of the attention unit, and the data of the seventh memory cell of the attention unit is rewritten according to a result of the calculation. At this time, the Ising chip is controlled so that the data of the seventh memory cell of the attention unit and pieces of data of the seventh memory cells of the other first to fifth units may not be rewritten simultaneously. In conformity with the topology of the Ising model, a connection relation between the data of the memory cells and the units are stipulated for the Ising chip of the above configuration.

(1-1) Conversion of Problem to be Solved into Ground State Search Problem of Ising Model The Ising model is a model of the statistical mechanics for explaining behavior of a magnetic substance. Typically, the Ising model is defined by spins that take binaries of +1/−1 (or 0/1 or upward direction/downward direction), the interaction coefficient indicating an interaction between the spins, and the external magnetic field coefficient that accompanies each spin.

The Ising model can calculate energy at that time from given spin alignment, interaction coefficient, and external magnetic field coefficient. The energy function $E(\sigma)$ of the Ising model is generally expressed by the following formula (Formula 1). Incidentally, parameters shall represent the followings; $\sigma_i$ and $\sigma_j$: values of i-th and j-th spins, respectively; $J_{i,j}$: an interaction coefficient between the i-th and the j-th spins; $h_i$: the external magnetic field coefficient for the i-th spin; $<i, j>$: a combination of two neighbor sites; and $\sigma$: alignment of the spin, $$E(\sigma) = -\sum_{(i,j)} J_{i,j}\sigma_i\sigma_j - \sum_i h_i\sigma_i \qquad \text{[Formula 1]}$$

Finding a ground state of the Ising model is an optimization problem of finding alignment of the spins that minimises the energy function of the Ising model. For example, a problem that is unrelated to a magnetic substance at first glance such as factorization and a travelling salesman problem can be converted into an Ising model. Then, the ground state of the Ising model obtained by the conversion corresponds to a solution of an original problem. From this, it can be said that a device capable of finding the ground state of the Ising model is a computer available for a general-purpose use.

In this embodiment, in order to give explanations thoroughly from a problem that is intended to be solved to a setting of the Ising chip, a maximum cut problem of a graph is shown as an exercise.

FIG. 1 is a graphical representation for explaining one example of a graph problem that the Ising chip solves.

First, the meaning of the graph will be explained. A graph $G=(V, E)$ of FIG. 1 includes a set of vertexes $V=\{A, B, C, D\}$ and a set of sides $E=\{a, b, c, d, e, f\}$. Each side has a weighting factor. When describing a, b, c, d, e, and f, they shall represent the weighting factors of the sides.

Figure 2:
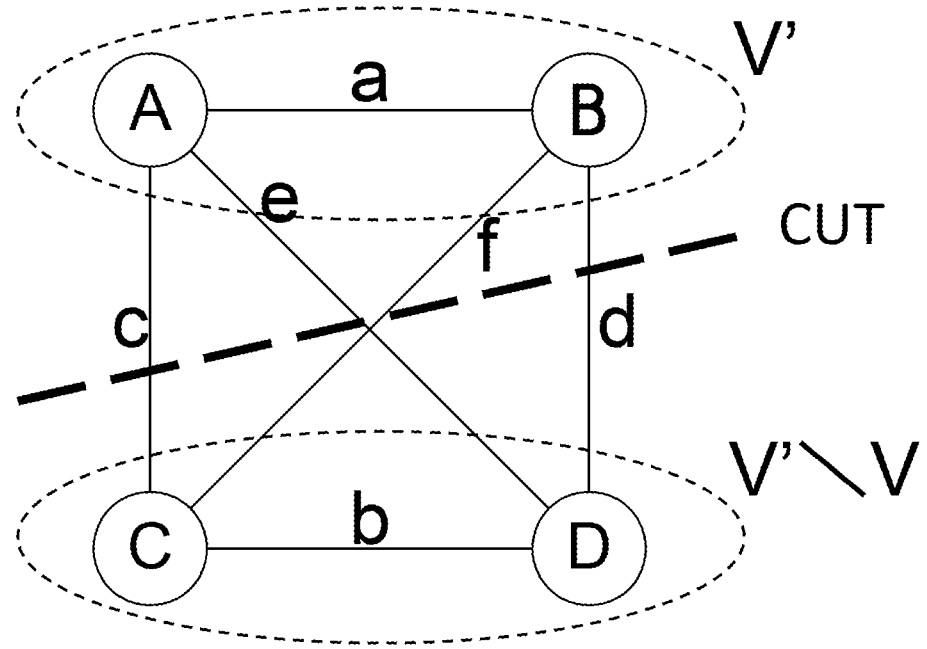
FIG. 2 is a graphical representation for explaining a concept of a cut of the one example of the graph problem that the Ising chip solves.

As shown, in FIG. 2, dividing the vertexes V of this graph into two subset V' and V'\V is called a cut. V'\V shows a set obtained by excluding V' from V. Here, a side (in the example of FIGS. 2, c, d, e, and f) that is striding between the divided V' and V'\V is called an edge striding over the cut, or a cut edge. The number of cut edges in the case of a graph with no weights or a total sum of the weights of the cut edges in the case of a graph with the weights as shown in FIG. 2 is called the size of the cut. In the example of FIG. 2, the size of the cut is c+d+e+f. Incidentally, although FIG.

1 and FIG. 2 show examples of undirected graphs, these are also expandable to directed graphs.

The maximum cut problem is to find a cut that maximises the size of the cut when the graph G=(V, E) is given. In other words, it may be said that it is to group a set V of vertexes into V' and V'\V so that the size of the cut may be maximised.

Figure 3:
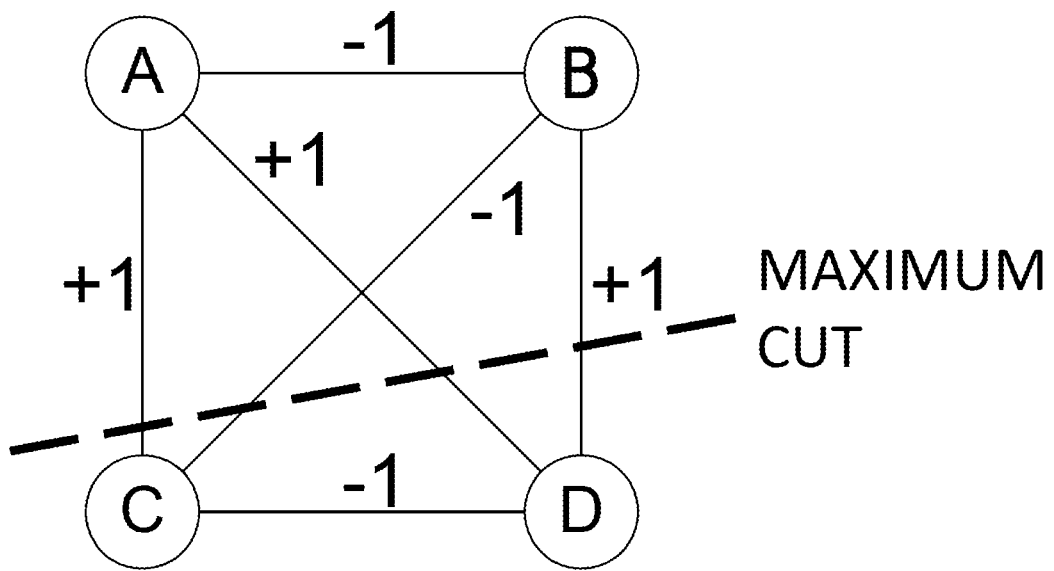
FIG. 3 is a graphical representation for explaining a maximum out of the one example of the graph problem that the Ising chip solves.

FIG. 3 shows a concrete example of the maximum cut problem, in this example, when cutting the vertexes V so that the vertexes V may be divided into V'={A, B} and V'\V={C, D}, a size of the cut becomes w{V'}=2 and the cut becomes a maximum cut in this graph.

Returning to FIG. 2, a relation of the out of the graph and the Ising model will be explained. In a graph of FIG. 2, the size of the cut is w(V')=c+d+e+f. Here, if the graph of FIG. 2 is considered as the Ising model, weights of side E={a, b, c, d, e, f} will become the interaction coefficients of the Ising model. Then, the vertexes V={A, B, C, D} become spins each having a state of binary of +1/−1, respectively, in the Ising model. Here, the vertexes belonging to the vertexes V' obtained by cutting shall be the spins of +1, and the vertexes belonging to V'\V shall be the spins of −1. That is, A=+1, B=+1, C=−1, and D=−1 are set. If the energy of the Ising model at this time is calculated along the energy function shown in Formula 1, it will be −(a+b−c−d−e−f)=−a−b+c+d+e+f. Incidentally, since the size of the cut is w(V')=c+d+e+f, this energy function can be written as Formula 2.

$$E(\sigma) = -\left(\sum_{(i,j)} J_{i,j} - 2w(V')\right)$$ [Formula 2]

If the energy is calculated concretely in accordance with the example of FIG. 2, it will be checked that the energy becomes −{(a+b+c+d+e+f)−2(c+d+e+f)}=−(a+b−c−d−e−f). Seeing Formula 2, it turns out that that when the size of the cut v(V') is maximised, the energy E(σ) also becomes large. That is, maximization of the size of the cut will maximize the energy of the Ising model. On the contrary, minimisation of the size of the cut will minimize the energy of the Ising model. That is, the ground state search of the Ising model corresponds to finding a minimum cut. Therefore, in order to find the minimum cut, finding the maximum cut is converted into finding the minimum cut by inverting all the signs of the weights of the maximum cut problem.

Figure 4:
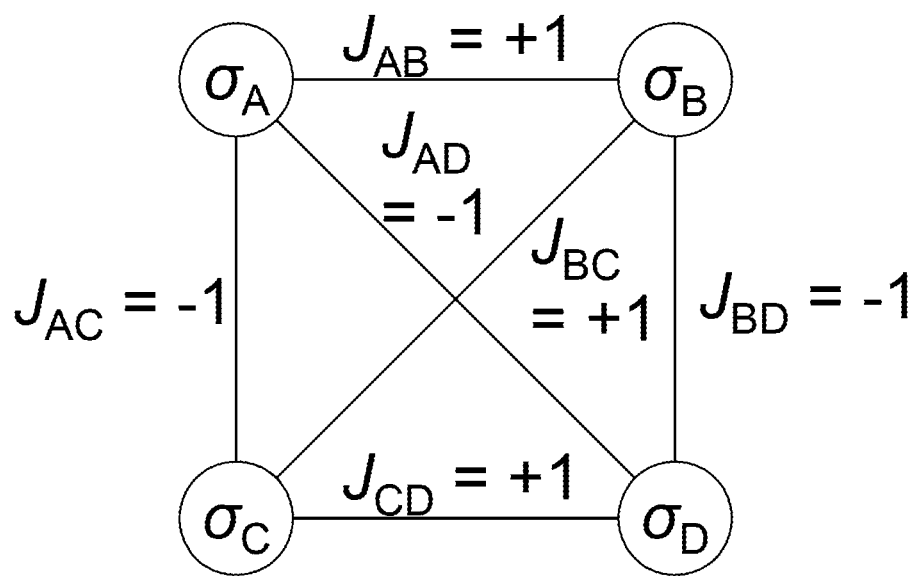
FIG. 4 is a graphical representation for explaining one example of an interaction model corresponding to the graph problem.

FIG. 4 shows an example in which the maximum cut problem shown in FIG. 3 is converted into a ground state search problem of the Ising mode. Seeing the interaction coefficients JAB, JAC, JAD, JBC, JBC, and JCD attached to respective sides of FIG. 4, they are the interaction coefficients with the weights of FIG. 3 inverted, respectively. This corresponds to the conversion from the maximum cut problem described above into a minimum cut problem.

Figure 5:
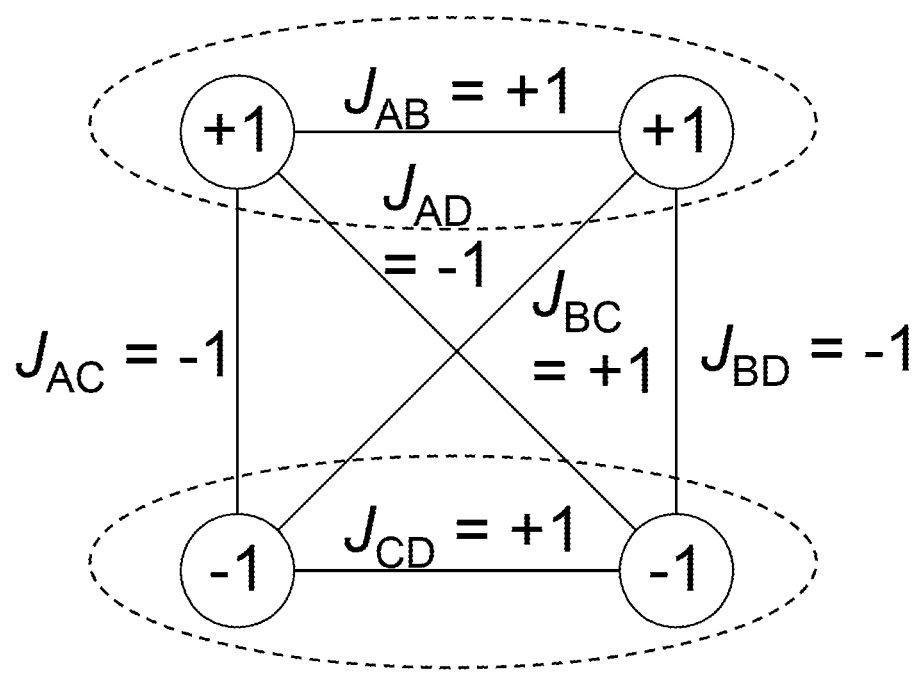
FIG. 5 is a graphical representation for explaining a solution of the one example of the interaction model corresponding to the graph problem.

FIG. 5 shows the spins $\sigma_A$, $\sigma_B$, $\sigma_C$, and $\sigma_D$ decided so that the energy may become a minimum by searching the ground state of the Ising model of FIG. 4, incidentally, although $\sigma_A$=+1, $\sigma_B$=+1, $\sigma_C$=−1, and $\sigma_D$=−1 in the example of FIG. 5, since in the Ising model, the ground state such that states of the all the spins are inverted has the same energy, $\sigma_A$=−1, $\sigma_B$=−1, $\sigma_C$=+1, and $\sigma_D$=+1 also becomes the ground state. Seeing the example of FIG. 5, the value of the spin at a vertex belonging to the cut V' is +1, and the value of the spin at a vertex belonging to the cut V'\V is −1. Thus, the maximum cut or the minimum cut can be realized by performing the ground state search of the Ising model and grouping the vertexes with respect to the value of the spin.

(1-2) Configuration of Ising Chip

Next, the Ising chip that is a device for realizing the ground state search of the Ising model shown in FIG. 4 and its control method will be shown. Here, an example of a device that realizes the ground state search of the Ising model of a three-dimensional grid is shown. However, the present invention is not limited to the Ising model of the three-dimensional grid, and is applicable to an arbitrary topology and to an arbitrary number of spins.

Figure 6:
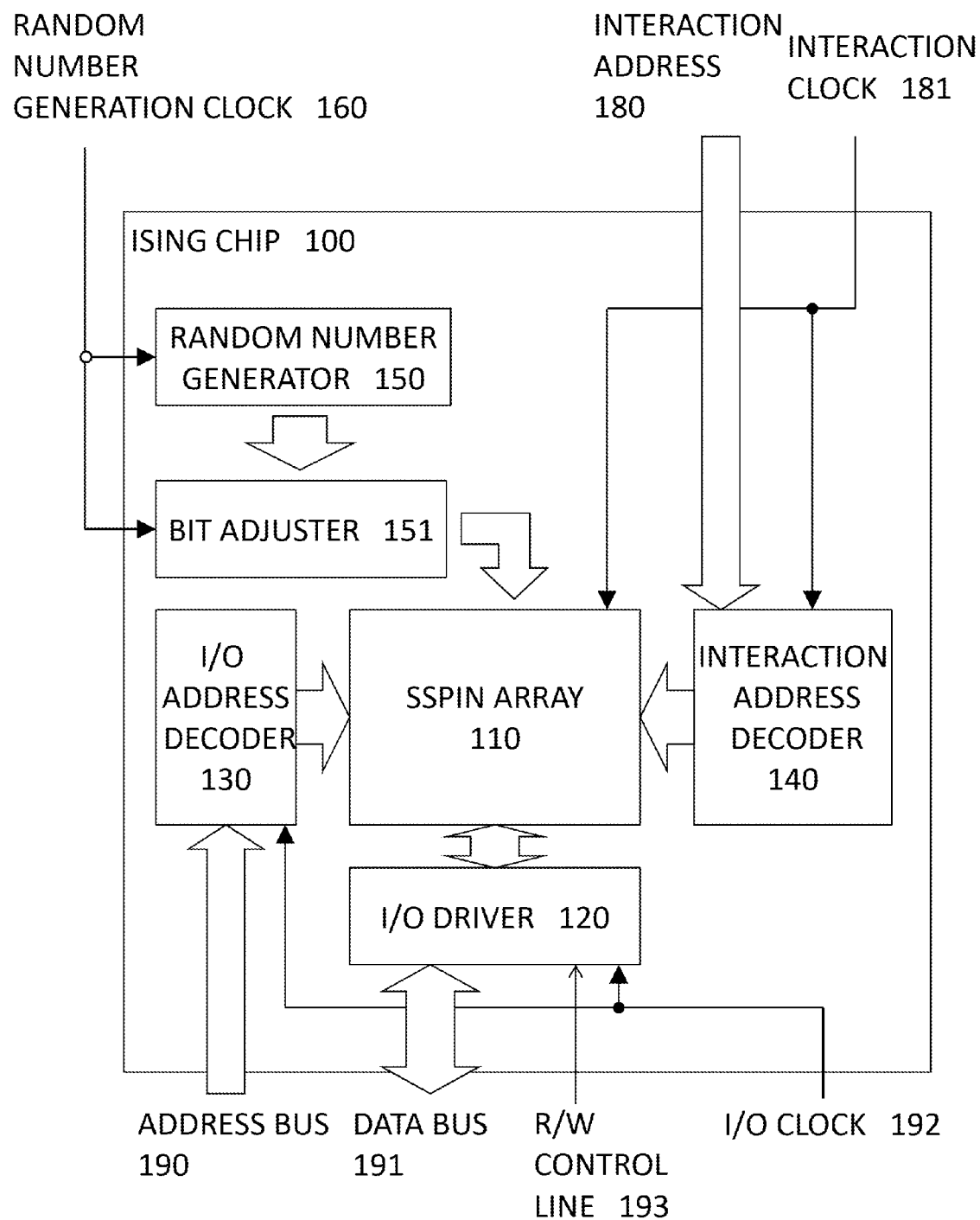
FIG. 6 is a block diagram for explaining a configuration of the Ising chip that is one embodiment of the present invention.

FIG. 6 shows an example of a block diagram of an Ising chip 100 of this embodiment. The Ising chip 100 includes a spin array 110, an I/O driver 120, an I/O address decoder 130, and an interaction address decoder 140.

Although in this embodiment, an explanation will be given assuming that the Ising chip 100 is mounted as a CMOS integrated circuit currently used widely, it is realizable with another solid state component. In this embodiment, the spin array 110 includes the semiconductor memory array. Although the kind of memory does not matter, an explanation will be given with an example using static random access memory (SRAM) capable of a high-speed operation here. The Ising chip 100 can be driven by an SRAM compatible interface for performing read/write to the spin array 110. The SRAM compatible interface includes an address bus 190, a data bus 191, a R/W control line 193, and an I/O clock 192.

In the Ising chip 100, spin $\sigma_i$, an interaction coefficient $J_{i,j}$, and an external magnetic field coefficient $h_i$ of the Ising model are all represented by information stored in the memory cell in the spin array 110. Read/write of these values to the memory cell of the spin array is performed by the SRAM compatible interface.

In order to set the Ising model that, should find the ground state in the Ising chip 100, an address is given to the memory cell. Moreover, the spin $\sigma_i$, the interaction coefficient $J_{i,j}$, and the external magnetic field coefficient $h_i$ of the spin array 110 are made to correspond to the address of the memory cell. A technique of performing read/write of the information to the memory cell at an arbitrary address is the same as that of a known control technique of the semiconductor memory.

Incidentally, the address bus 190, the data bus 191, and the R/W control line 193 of which the SRAM compatible interface is comprised operate in synchronisation, with a clock inputted into the I/O clock. 19.2. However, there is no necessity that the interface is synchronous in the present invention, and an asynchronous interface may be used, in this embodiment, an explanation will be given on the premise that it is the synchronous interface.

Moreover, since the ground state search is performed in the Ising chip 100, the interaction between the spins inside the spin, array 110 is realized. Here, the interaction means a series of processing as follows: reading the value of the memory cell of the spin array 110; calculating the energy from the read value; deciding the value of the spin that makes the energy small; and writing the decided value of the spin in the memory cell.

What controls this interaction from the outside is an interaction control interface, through which the interaction is performed, concretely by inputting an address specifying a spin group to which the interaction is performed into an interaction address 180, and achieving synchronisation with a clock inputted into an interaction clock 181.

Incidentally, it is not necessarily required for the interaction to be realized with a clock synchronization circuit, and it may be an asynchronous circuit, in this case, a role of the interaction clock 181 shall be not to input the clock but an enable signal that permits execution of the interaction.

Although it is not necessarily required for the interaction control interface to be synchronous and it may be an asynchronous interface, an explanation will be given on the premise that this embodiment uses a synchronous interface and the interaction is performed in synchronization with the interaction clock 181.

A random number generator 150, a bit adjustment term 151, and a random number generation clock 160 of FIG. 6 will be described later. Moreover, details of the interaction address decoder 140 will be described later.

(1-3) Configuration of Information Processor with Ising Chip

The information processing is realized by using one or multiple Ising chips 100, and in order to do this, the SRAM interface described above is required to be controlled.

Figure 7:
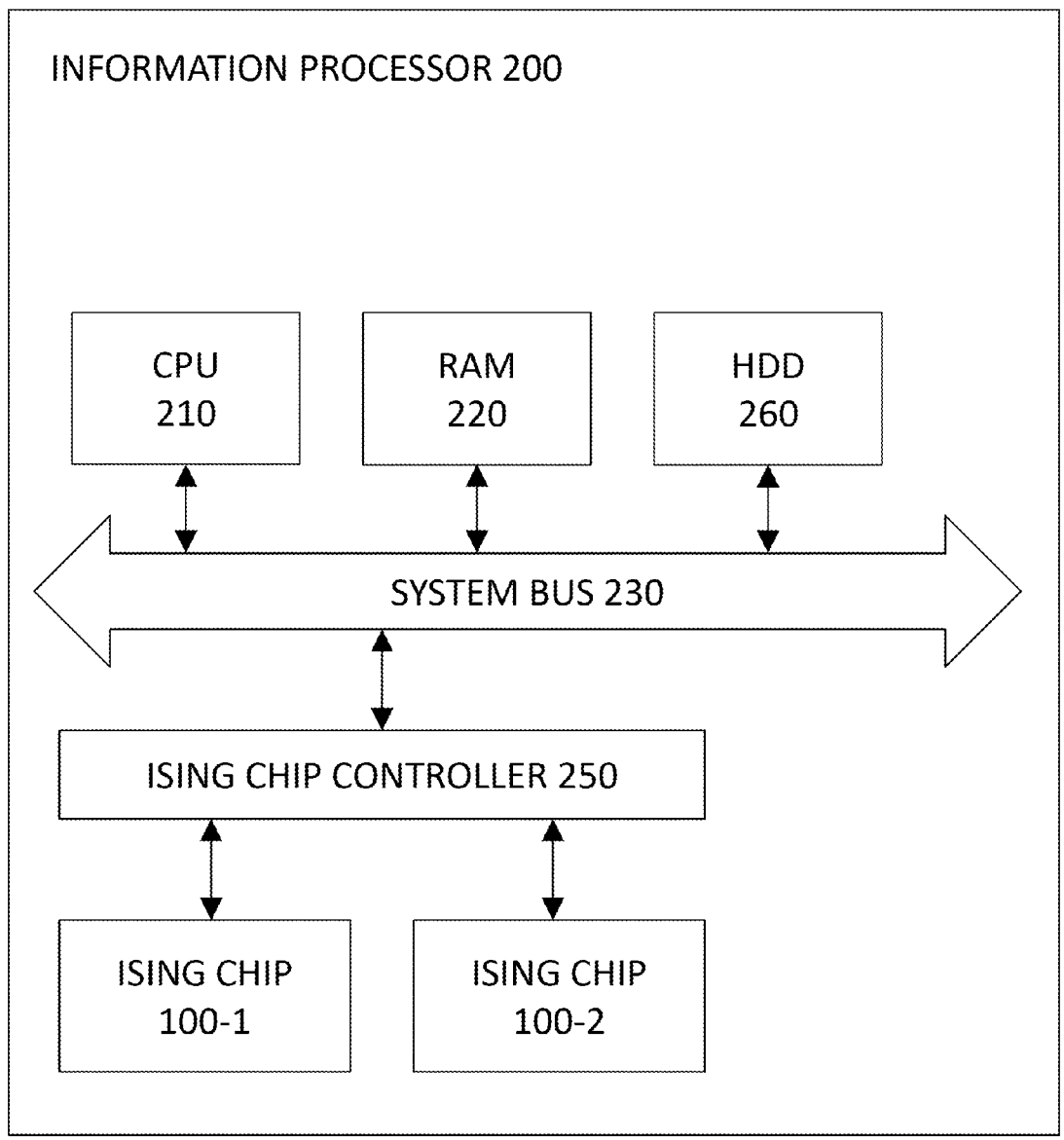
FIG. 7 is a block diagram for explaining a configuration of an information processor including the Ising chip that is the one embodiment, of the present invention.

FIG. 7 is a diagram for explaining one example of a configuration of an information processor for controlling the Ising chip of FIG. 6. In this example, the Ising chip 100 is used as a part of an information processor 200.

A typical example of the information processor 200 is a personal, computer currently used generally on which an accelerator including the Ising chip 100 is mounted. The information processor 200 has a central processor (CPU) 210, temporal memory (RAM) 220, and a storage device (HDD) 260, and these are coupled with each other by a system bus 230.

In addition, an Ising chip controller 250 is connected to the system bus 230, and has one or multiple Ising chips via the Ising chip controller 250 (in the example of FIG. 7, it has two Ising chips 100-1 and 100-2. Hereinafter, when there is no necessity of distinguishing the two Ising chips specially, they are called only the Ising chip 100). This Ising chip controller 250 and the Ising chip 100 are equivalent to the accelerator, which can take a mode of an expansion card that is used being inserted into a peripheral expansion interface such as the PCI Express®, for example.

The Ising chip controller 250 converts a protocol, of the system bus 230 (for example, PCI Represent® and QPI) in conformity to the interface of the Ising chip 100. Software that operates on the CPU 210 of the information processor 200 can control the Ising chip 100 by generally performing read/write to a specific address (so-called MMIO) Memory Mapped I/O) via the Ising chip controller 250.

In the case where the information processor 200 of FIG. 7 tries to make the Ising chip 100 solve the problem, problem data is stored in the HDD 260 in advance, for example. Moreover, a program for converting the problem data into the ground state search problem, of the Ising model and a program for controlling the Ising chip 100 are stored in the RAM 220 and are executed by the CPU 210.

(1-4) Structure of Ising Model

The spin array 110 in the Ising chip 100 corresponds to the Ising model, and simulates this. The spin array 110 has a spin unit that realizes maintaining of one spin (attention spin), the interaction coefficient that accompanies it, and the external magnetic field coefficient and processing of the ground state search as a basic constitutional unit.

Figure 8:
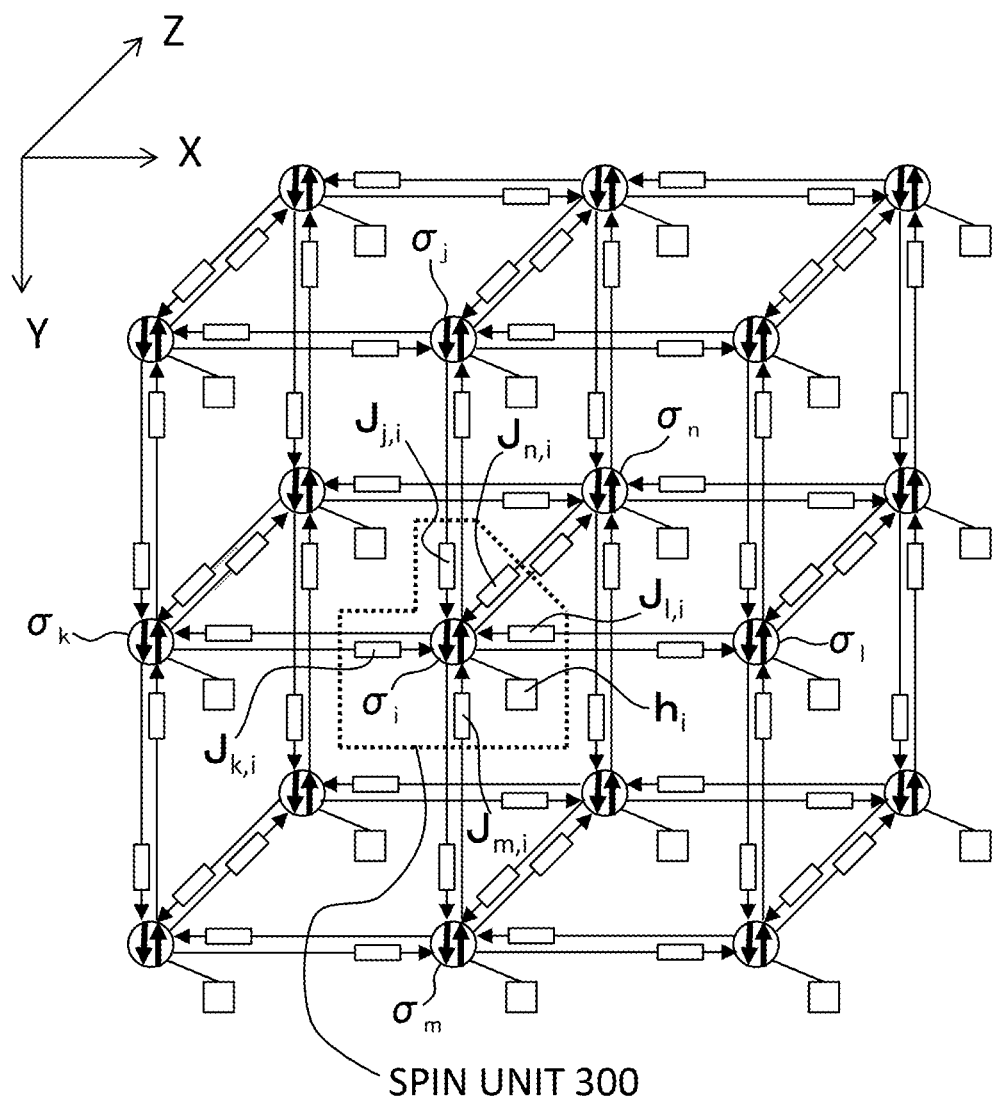
FIG. 8 is a perspective view for explaining one example of a configuration of a spin array of a three-dimensional grid.

FIG. 8 shows an example in which an Ising model with a topology of a three-dimensional grid, shape is constructed by arranging multiple spin units 300. The example of FIG. 8 is a three-dimensional grid of size 3 (X-axis direction)×3 (Y-axis direction)×2 (Z-axis direction).

The definition of the coordinate axes is, as illustrated in the diagram, such that the right direction on the sheet is an X-axis, the downward direction is a Y-axis, and a depth direction is a Z-axis (this definition is the same also in the following diagrams). These coordinate axes are only necessary for convenience in explaining the embodiment, and are not related to the present invention. In the case where using a topology other than the three-dimensional grid, for example, a tree shape topology etc., the topology will be represented with the number of stages of the tree, etc. aside from coordinate axes. In a topology of the three-dimensional grid shape of FIG. 8, if the interaction between the spins is regarded as a graph, the spin (vertex) of the degree 5 at maximum will be needed. Incidentally, if inclusion of connection of the external magnetic field coefficient is also considered, degree 6 at maximum will be needed.

Values of the neighbor spins (for example, when the neighbor spins are five) $\sigma_j$, $\sigma_k$, $\sigma_l$, $\sigma_m$, and $\sigma_n$ are inputted into a single spin unit 300 shown in FIG. 8. Moreover, the spin unit 300 has a memory cell that maintains $J_{j,\,i}$, $J_{k,\,i}$, $J_{l,\,i}$, $J_{m,\,i}$, and $J_{n,\,i}$ that are the interaction coefficients of the abovementioned neighbor spins (interaction coefficients with five neighbor spins) in addition to the spin $\sigma_i$ and the external magnetic field coefficient $h_i$.

Incidentally, the Ising model has an interaction generally represented by the undirected graph. Although in the abovementioned Formula 1, as a term representing the interaction, there is $J_{i,\,j} \times \sigma_i \times \sigma_j$, this represents the interaction from the i-th spin to the j-th spin. At this time, in the general Ising model, the interaction from the i-th spin to the j-th spin and the interaction from the j-th spin to the i-th spin are not differentiated from each other. That is, $J_{i,\,j}$ and $J_{j,\,i}$ are the same. However, in the Ising chip 100 of the present invention, it is realised that this Ising model is extended to the directed graph, and the interaction from the i-th spin to the j-th spin and the interaction from the j-th spin to the i-th spin are made asymmetrical. Thereby, expressiveness of the model is enhanced, so that it becomes possible for a smaller-scale model to represent many problems.

Therefore, when the one spin unit 300 is considered as a unit including an i-th spin $\sigma_i$, $J_{j,\,i}$, $J_{k,\,i}$, $J_{l,\,i}$, $J_{m,\,i}$, and $J_{n,\,i}$ that are the interaction coefficients that this spin unit maintains decide interactions from neighbor j-th, k-th, l-th, m-th, and n-th spins $\sigma_j$, $\sigma_k$, $\sigma_l$, $\sigma_m$, and $\sigma_n$ to the i-th spin $\sigma_i$, respectively.

This corresponds to a situation that in FIG. 8, an arrow (interaction) corresponding to the interaction coefficient included in the spin unit 300 goes from the spin outside the spin unit 300 shown in the figure to the spin inside the spin unit 300.

(1-5) Circuit Configuration of Spin Unit

In order to find the ground state of the Ising model shown in FIG. 8, the spin unit 300 includes solid state components. In this embodiment, the multiple spin units 300 each including semiconductor memory and a logic circuit are arranged to constitute the spin array 110. One example of the configuration of the spin unit 300 will be explained using FIG. 9 and FIG. 10.

Figure 9:
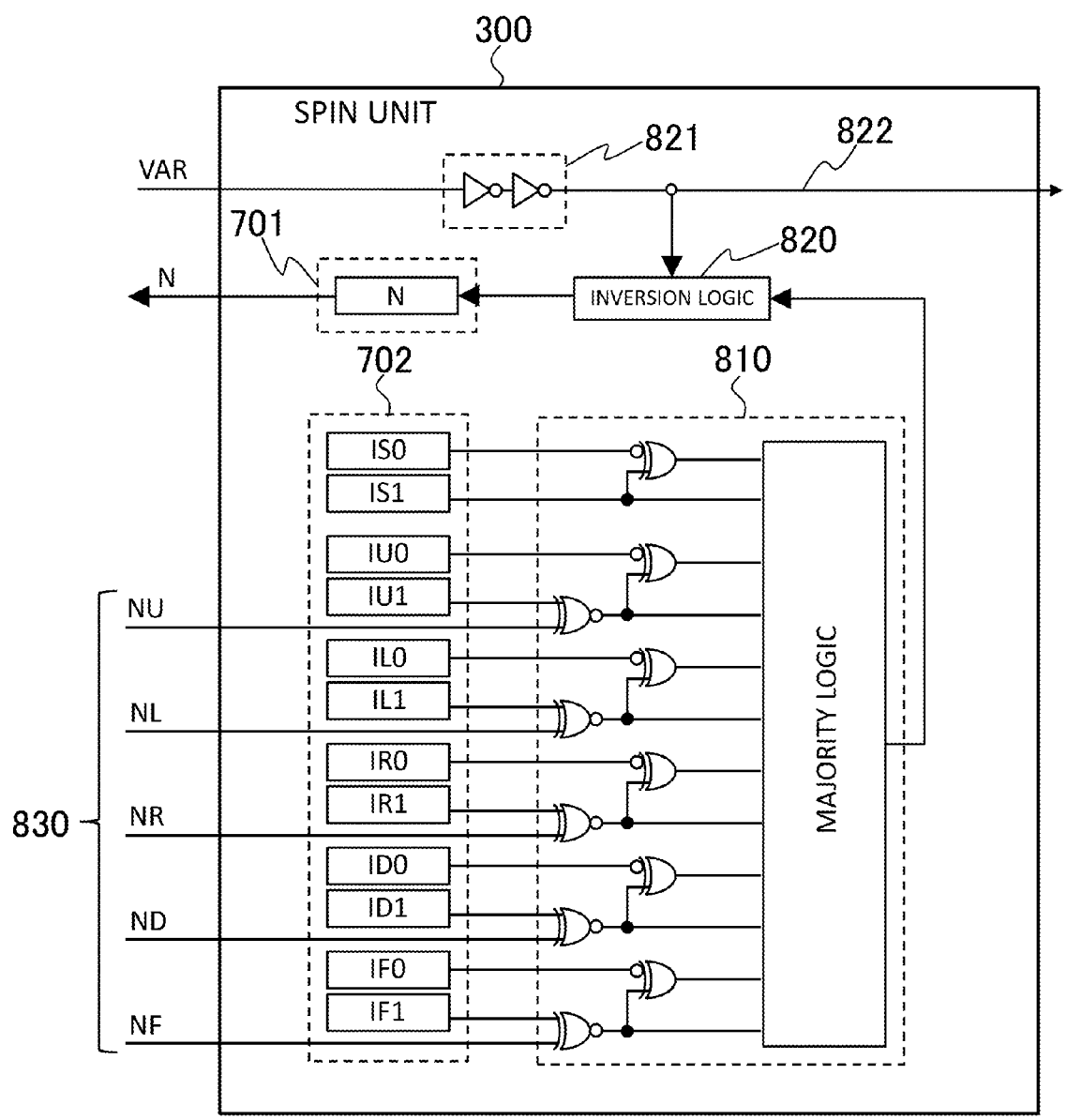
FIG. 9 is a circuit, diagram showing a configuration, example that performs an interaction between spin units.

FIG. 9 is a diagram for explaining a circuit configuration example of the spin unit. In FIG. 9, a circuit for realizing interaction between spin units is illustrated.

Figure 10:
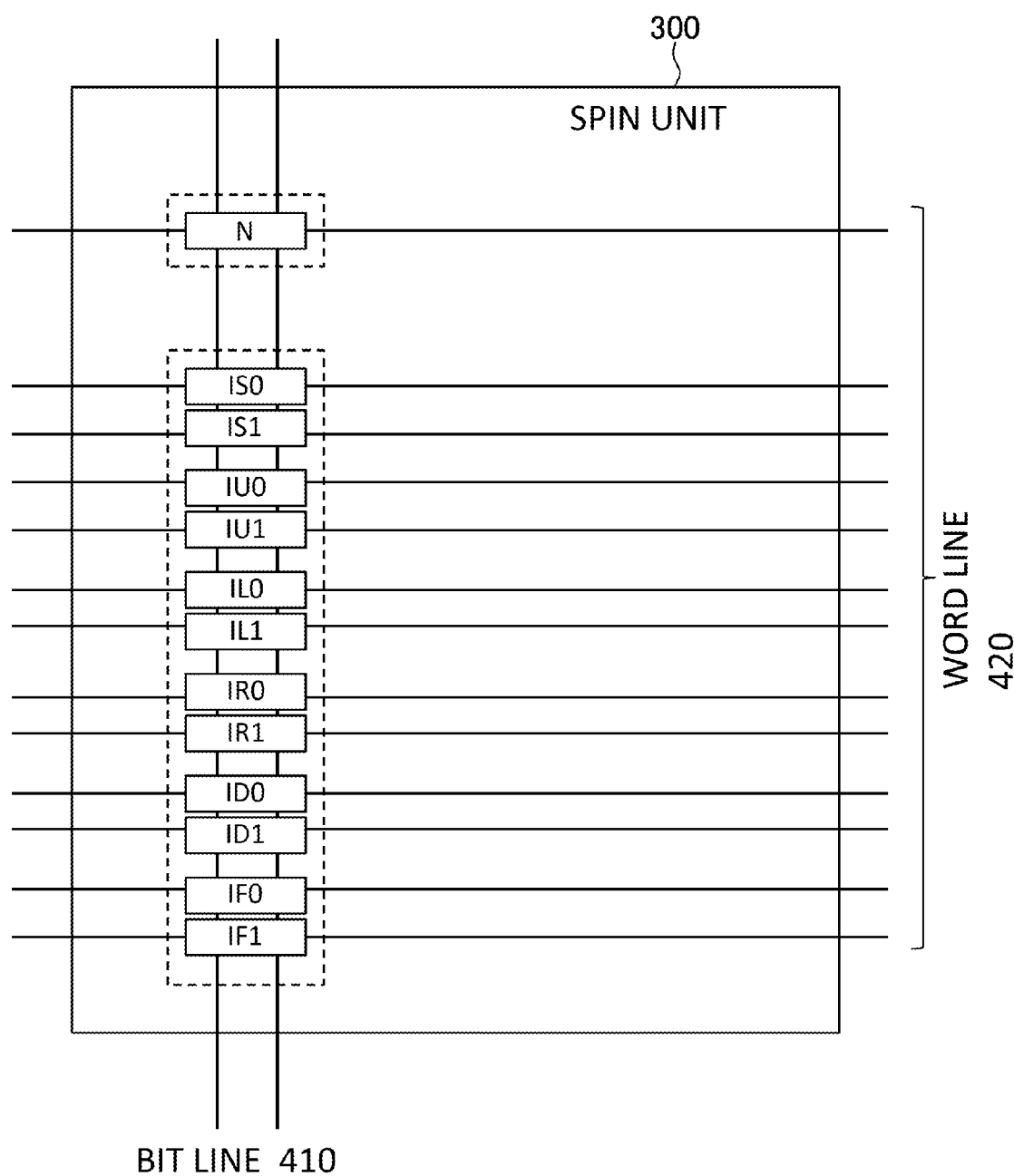
FIG. 10 is a circuit diagram showing a configuration example for accessing a memory cell that the spin unit has.

FIG. 10 illustrates the configuration of FIG. 9 paying attention to a word line and a bit line that are interfaces for accessing the memory cell that the spin unit has from the outside of the Ising chip 100.

Although a single spin unit 300 has both configurations of FIG. 9 and FIG. 10, in order to make a connection relation of wiring easy to understand, it is explained being divided into FIG. 9 and FIG. 10 for convenience.

Incidentally, how to establish connection between EN, NU, NL, NR, ND, NF, and N that are interfaces illustrated in the circuit for realizing the interaction of FIG. 9 among the multiple spin units will be explained later with reference to FIG. 15. Moreover, how to connect the word line and the bit line of FIG. 10 among the multiple spin units will be explained, later with reference to FIG. 13.

The spin unit 300 includes multiple 1-bit memory cells in order to maintain the spin $\sigma_i$, the interaction coefficients $J_{j,\ i}, \ldots, J_{n,\ i}$ and the external magnetic field coefficient $h_i$ of the Ising model. This 1-bit memory cell is illustrated in FIG. 9 and FIG. 10 as N(701), IS0, IS1, IU0, IU1, IL0, IL1, IR0, IR1, ID0, ID1, IF0, and IF1 (the above referred to as 702). Incidentally, since each of pairs of IS0 and IS1, IU0 and IU1, IL0 and IL1, IR0 and IR1, and ID0 and ID1, and IF0 and IF1 plays a role as one set of the two memory cells, they are collectively abbreviated as ISx, IUx, ILx, IRx, IDx, and IFx, respectively.

As one example of a structure or each memory cell included in the spin unit 300, a cell of the known SRAM memory can be used. That is, the memory cell, has a data maintaining part including two CMOS inverters. Data reading and writing from/to the data maintaining part are realized by controlling a gate of a pass gate transistor serially connected with an inverter with the word line, and by connecting a source drain path to the bit line. It is true that the memory cell structure it is not limited to this and may be any configuration as long as it can store a binary. For example, other memories like DRAM or flash memory can be used.

In the example of FIG. 9, each memory cell shall be a SRAM memory cell capable of storing one bit. However, a multivalued memory cell may be used. Regarding the multivalued memory cell, a physically single memory cell may be used, or it may be configured to foe capable of storing multiple bits using multiple 1-bit memory cells. If the memory cell is multi-valued, the degree of freedom of usable values of the coefficient will foe widened. On the other hand, a circuit scale and a processing time are expanded. Therefore, it is best to select suitable memory according to the kind and usage of the problem that should be solved.

Here, an explanation will be given assuming that the spin unit 300 represents the i-th spin. A memory cell N is a memory cell for representing the spin $\sigma_i$, and maintains the value of the spin. Although the value of the spin is $+1/-1$ (also representing the upward direction by +1 and the downward direction by −1) in the Ising model, this is made to correspond to 1/0 that are binaries of the memory cell. Although +1 and −1 are made to correspond to 1 and 0, respectively, in this specification, reverse correspondence may be used.

Figure 11:
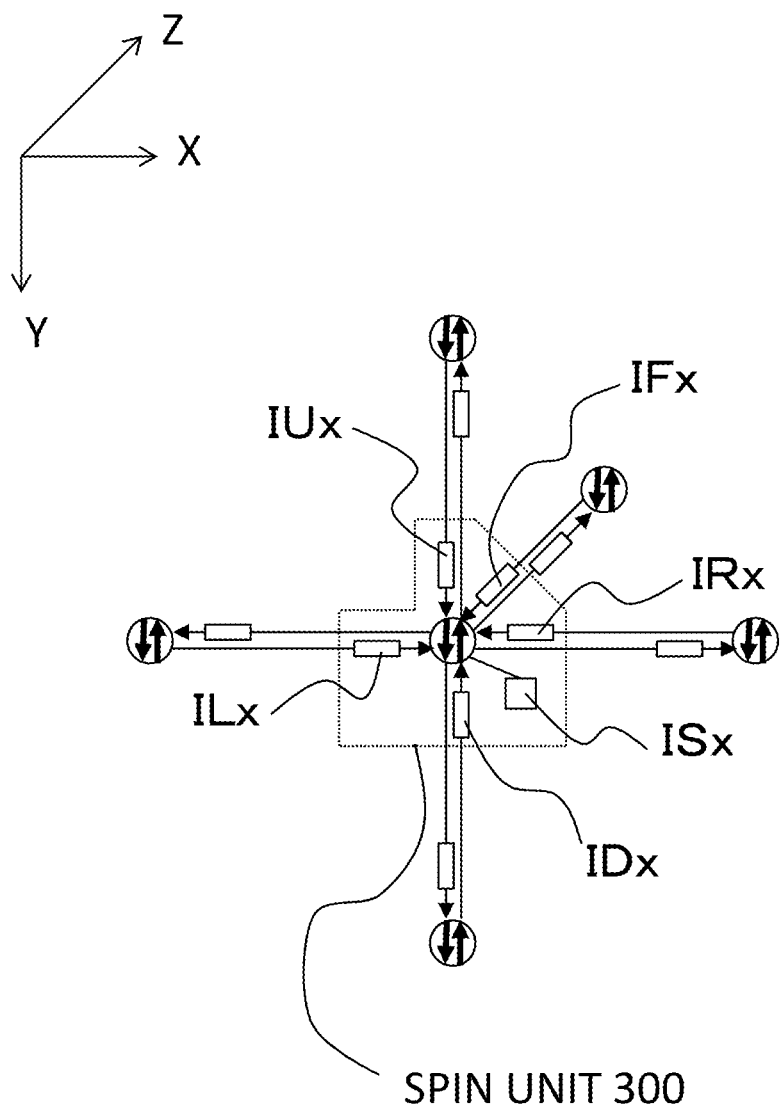
FIG. 11 is a perspective view for explaining a configuration example of the spin unit in the three-dimensional grid.

Using FIG. 11, the correspondence between the memory cell included in the spin unit 300 of FIG. 9 and FIG. 10 and the topology of the Ising model shown in FIG. 8 is shown, ISx represents the external magnetic field coefficient. Moreover, IUx, ILx, IRx, IDx, and IFx represent the interaction coefficients, respectively. They indicate the interaction coefficients as following: IUX does an upward direction spin (in the Y-axis direction, −1); ILX does a left-wise direction spin (in the X-axis direction, −1); IRX does a right-wise direction, side spin (in the X-axis direction, +1); IDX does a downward, direction spin (in the Y-axis direction, +1); and IFX does a spin connected in a depth direction (in the Z-axis direction, +1 or −1). Moreover, in the case where the Ising model is regarded as the directed graph, when seeing from a certain spin, the other spin has a coefficient of an influence exerted on a local spin. A coefficient of an influence that the local spin exerts on another spin belongs to the other spin, respectively. That is, this spin unit 300 is connected with up to five spins.

In the Ising chip 100 of this embodiment, the external magnetic field coefficient and the interaction coefficient correspond to a ternary of +1/0/−1. Therefore, in order to represent the external magnetic field coefficient and the interaction coefficient, at least a two-bit memory cell is needed for each of them. As shown in FIG. 9 and FIG. 10, ISx, IUx, ILx, IFx, IDx, and IFx each represent the ternary of +1/0/−1 by a combination of two memory cells whose trailing digits are 0 and 1 (for example, in the case of ISx, IS0 and IS1). For example, in the case of ISx, +1/−1 is represented by IS1; when IS1 is unity, it represents 1, and when being zero, it represents −1. In addition to this, when IS0 is 0, the external magnetic field coefficient is assumed to be zero; when IS0 is 1, either of +1/−1 that is decided by IS1 is set to the external magnetic field coefficient. Considering that the external magnetic field coefficient is disabled when the external magnetic field coefficient is zero, it can be said that IS0 is an enable bit of the external magnetic field coefficient (when IS0=1, the external magnetic field coefficient is enabled). Regarding IUx, ILx, IRx, IDx, and IFx representing the interaction coefficients, the coefficient and the value of the bit are made to correspond to each other similarly.

FIG. 10 is a diagram showing a relation among the memory cell of the spin unit 300, the word line, and the bit line.

The memory cells N, IS0, IS1, IU0, IU1, IL0, IL1, IR0, IR1, ID0, ID1, IF0, and IF1 in the spin unit 300 must be readable and writable from the outside of the Ising chip 100, respectively. Therefore, as shown in FIG. 10, the spin unit 300 has a bit line 410 and a word line 420, respectively. As previously described, ternaries of +1/0−/−1 are represented by a set of two memory cells with end digits of 0 and 1 in FIG. 10, and when a four-valued or more-valued coefficient is intended to be represented, what is necessary is just to increase 1-bit memory cells of which the set is comprised in number and add them in a direction of the bit line.

The spin units 300 are arranged in a tiled configuration, and the bit line 410 and the word line 420 are connected to each of them. The memory cell in the spin unit 300 can be read/written with an SRAM compatible interface of the Ising chip 100 like general SRAM by performing driving, controlling, and reading on the memory cell with the I/O address decoder 130 and the I/O driver 120 that are shown in FIG. 6.

By the above configuration, the three-dimensional grid Ising model of 3×3×2 shown in FIG. 8 can be mapped in the memory on the Ising chip 100.

FIG. 12 shows an example of a memory map 2000 of the Ising chip 100. The figure shows 18 blocks corresponding to 18 sites that correspond to the Ising model of FIG. 8. Each block contains 13 bits corresponding to N, IS0, IS1, IU0, IU1, IL0, IL1, IR0, IR1, ID0, ID1, IF0, and IF1 shown in FIG. 9.

(1-6) Spin Unit Arrangement in Spin Array

Figure 13:
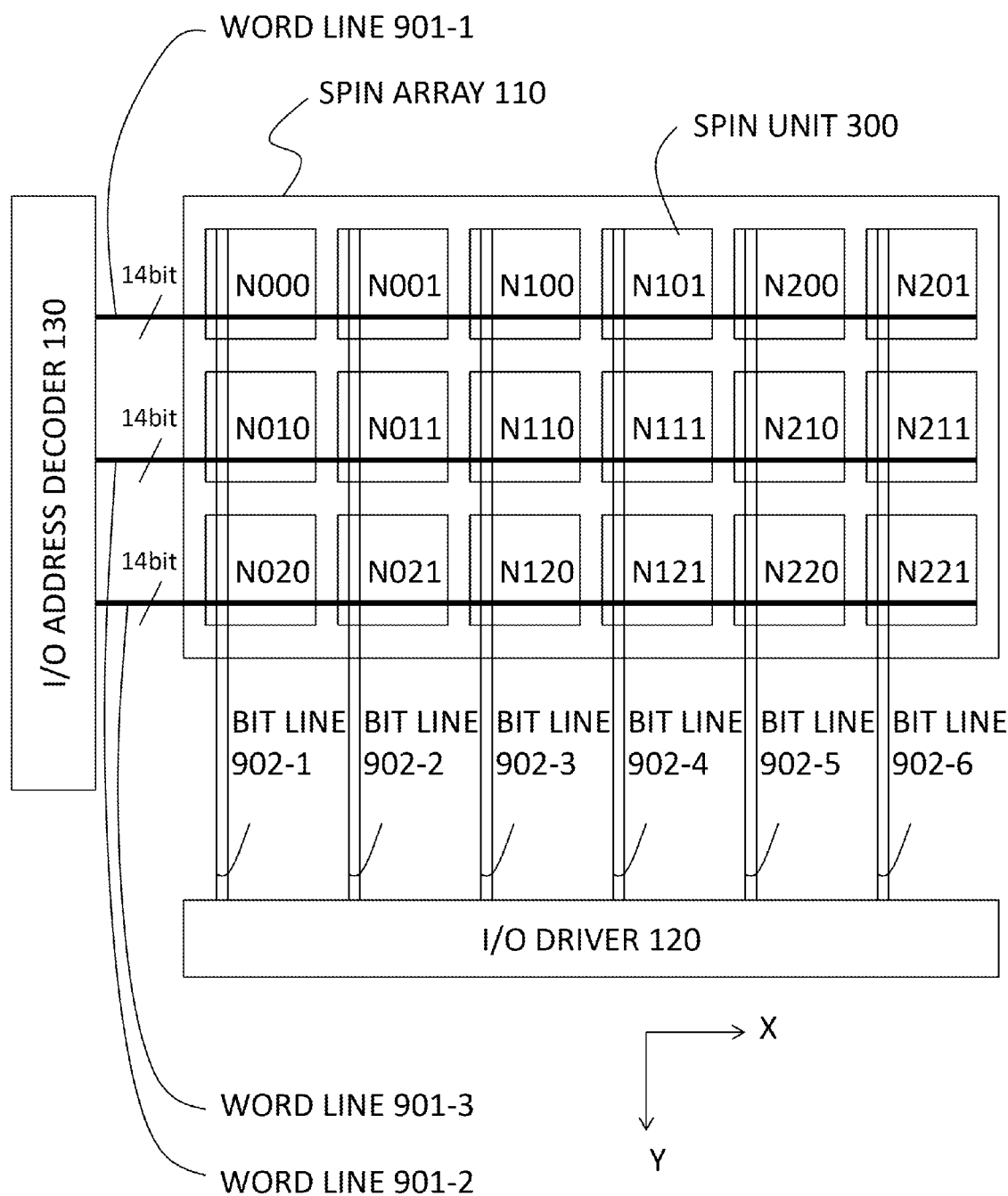
FIG. 13 is a block diagram for explaining one example of an arrangement of the spin unit on the Ising chip.

FIG. 13 is a diagram for explaining one example of an arrangement of the spin unit 300 on the Ising chip TOO. This explains a configuration of the spin array 110 from a viewpoint of layout as a semiconductor device.

Figure 14:
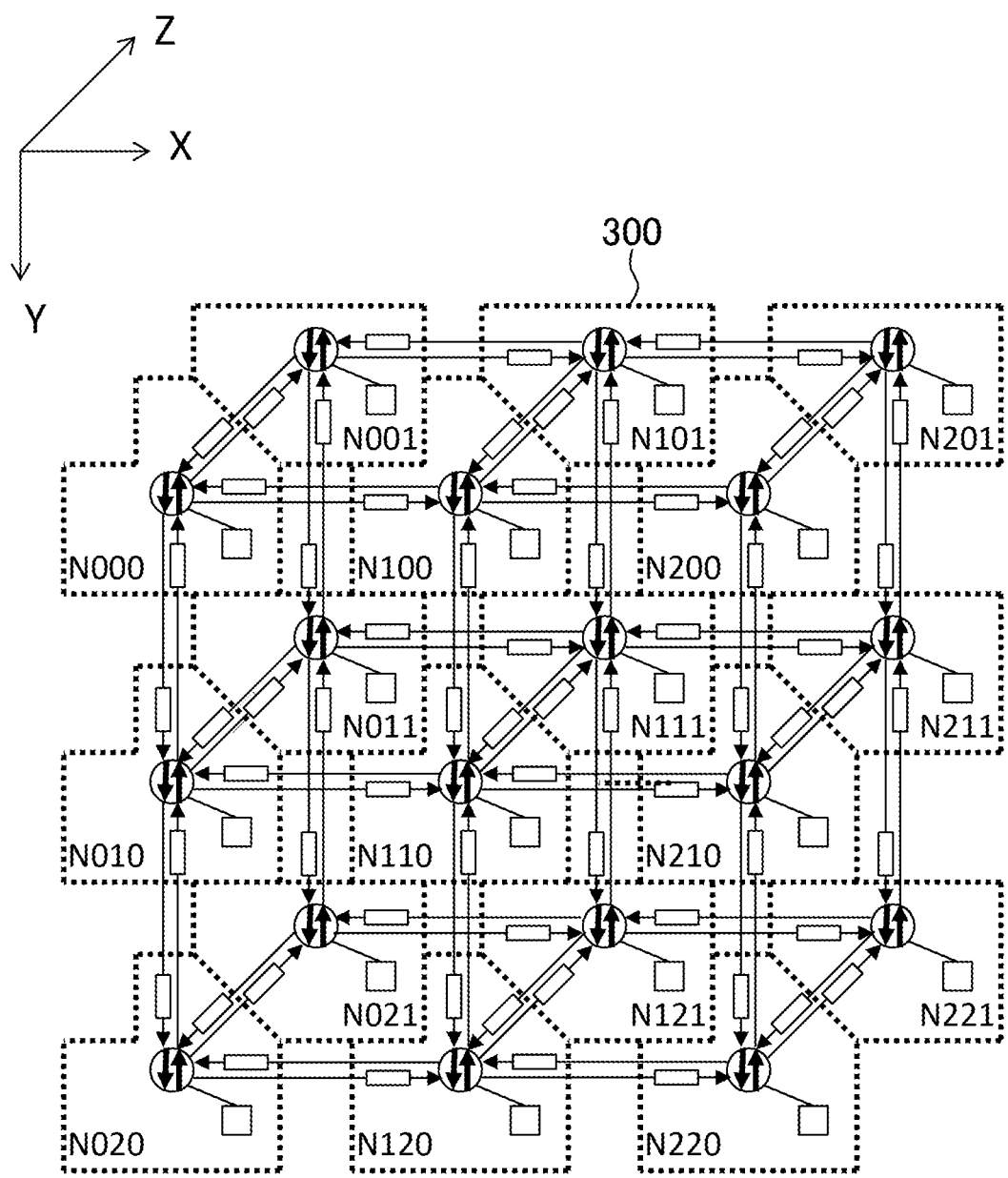
FIG. 14 is a perspective view for explaining a correspondent between the spin array of the three-dimensional grid and the spin unit.

FIG. 14 is such that a reference letter "N000" etc. for identifying the spin unit 300 is written for the spin array of FIG. 8. Depending on a position on the X-axis, the Y-axis, and the Z-axis, the reference letter is given like Nxyz. Since the spin array of this embodiment has the topology of the three-dimensional grid, a contrivance on the layout is needed in order to realize the spin unit 300 as a semiconductor device whose circuit is formed on a two-dimensional plane. The spin units are arranged and connected on the two-dimensional plane on a semiconductor substrate with the topology of the Ising model maintained.

In FIG. 12 and FIG. 13, a reference letter corresponding to a reference letter "N000" etc. of the spin unit 300 in FIG. 14 is written, and this reference letter shows to which vertex the spin unit 300 represented on FIG. 12 and FIG. 13 corresponds in a topology of the three-dimensional grid of FIG. 14. As is clear from FIG. 13, in this embodiment, in order to arrange the three-dimensional grid vertexes of 3×3×2 on a two-dimensional plane, the vortexes are arranged so that each grid vertex of the grid vertex alignment in the Z-axis' direction may be inserted into an interval of the grid vertex alignment in the X-axis direction.

That is, the spin units whose Z-axis direction coordinates are either zero or unity are arranged alternately, being arranged in the X-axis direction (a right direction on the sheet is a positive X-axis direction) like N0y0, N0y1, N1y0, N1y1, N2y0, and N2y1, while being arranged in the Y-axis direction (the downward direction on the sheet is a positive Y-axis direction) like Nx0z, Nx1z, and Nx2z on a two-dimensional plane of FIG. 13.

On the Ising chip 100, physically the spin units 300 are arranged as shown in FIG. 13, and on them, the word lines 901-1, 901-2, and 901-3 and the bit lines 902-1, 902-2, 902-3,902-4, 902-5, and 902-6 are wired. These word lines and bit lines are connected with the word lines 42-0 and the bit lines 410 of the spin unit 300 shown in FIG. 10. Since each spin unit 300 has 13 memory cells in an array direction of the word line (the word line 420 is 13 bits), the word lines 901-1, 901-2, 901-3 each become 13 bits, respectively.

(1-7) Control of Ground State Search Processing of Ising Model

In order to realize the ground state search of the Ising model, it is necessary to realise the interaction between the spins must be realised so that the spin alignment may shift to one such that the energy of the whole Ising model is lower. The interaction for this is performed based on the interaction coefficient and the external magnetic field coefficient that are given. That is, a next value of a certain spin is decided from the interaction from other spins connected to the spin and the external magnetic field coefficient that the spin has. At this time, the next value of the spin becomes a value that minimises a local energy within a range where the spin is connected.

Although it can be thought at first that updating these spins is done sequentially one by one for each spin, this method requires a time proportional, to the number of spins and parallelism cannot be used. Then, it is desirable to perform "interaction between spins" for all the spins simultaneously in parallel.

However, it is not appropriate to aim at updating ail the spins simultaneously. Since when updating a certain spin, the spin is updated so that the energy between this spin and the neighbor spins may be minimized based on the values of the neighbor spins, if the values of the neighbor spins are updated simultaneously with the update of that spin, updates of the both will overlap each other, and the energy will not be able to be minimized, which will cause the energy to vibrate. That is, when updating a certain spin, updating simultaneously a spin connected to the spin (spin directly connected to the certain spin through the interaction coefficient is called the neighbor spin hereinafter) should be avoided.

Therefore, in this embodiment, the spin units 300 in the spin array 110 are grouped so that the neighbor spins may not be updated simultaneously, and the spin units that are updated simultaneously at a time should be limited to those belonging to one group. In the case of a topology as shown in FIG. 8, the spin units 300 may be divided into two groups. Then, these two groups are going to be updated alternately.

FIG. 6 is referred to again. In the configuration of FIG. 6, in order to direct a group that is updated at certain timing, the Ising chip 100 has the interaction address 180 as an input interface. The interaction address 180 is an interface for specifying a group to be updated among the abovementioned groups, and by an input of the interaction clock 181, the spins (spin units 300) belonging to the group specified by the interaction address 180 are updated simultaneously.

In this method, additional hardware is unnecessary in the spin unit 300, and what is necessary is just to provide a set of the interaction address decoders 140 for the whole Ising chip 100. Therefore, the abovementioned problem can be solved without complicating the spin unit 300 that is a constitutional unit.

Although in the abovementioned example, the spin units wore divided into two groups so that the neighbor spins may not be updated simultaneously, the spin units may be divided into three or more groups as long as a division method does not permit the neighbor spins to be updated simultaneously.

(1-8) Circuit Configuration Fox Deciding Next State of Spin

The heading will be explained referring to FIG. 9 again.

In order for the multiple spin units 300 to be updated in parallel simultaneously, each spin unit 300 has a circuit for deciding the next state of the spin by calculating the interaction independently. FIG. 9 shows a circuit for deciding the next state of the spin. In FIG. 9, the spin unit has NU, NL, NR, ND, NF, and N as interfaces with the outside. H is an interface through which the value of the spin of the spin unit is outputted to other spin units (units that adjoin the spin unit in the topology of FIG. 8). NU, NL, NR, ND, and NF are interfaces 830 for inputting the values of the spins that other spin units have therethrough, respectively. These interfaces serve for the following inputs, respectively: NU is for an upper spin (−1 in the Y-axis direction); NL is for a left-hand side spin (−1 in the X-axis direction); NR is for a right-hand side spin (+1 in the X-axis direction); ND is for a lower spin (+1 in the Y-axis direction); and NF is for a spin connected in a depth direction (+1 or −1 in the Z-axis direction). Incidentally, when considering the topology of the Ising model, it is necessary to decide processing of its end.

In the case where the end is simply terminated like the topology of FIG. 8, it is not necessary to input anything to an interface facing the end among NU, NL, NR, ND, and NF (proper processing is executed on them as unused input terminals, for example, being connected to a fixed value of zero or unity within the scope of the circuit). For example, in the case of the spin unit N000, there are no inputs for two terminals NU and NL.

The next state of the spin is decided so that the energy between the spin and the neighbor spins may be minimized in the spin unit 300, and this is equivalent to making judgment as to, when evaluating the product of the value of the neighbor spin and the interaction coefficient and the external magnetic field coefficient, which is more dominant, a positive value or a negative value. For example, the next state of the spin $\sigma_i$ is decided as follows assuming that spins $\sigma_j$, $\sigma_k$, $\sigma_l$, $\sigma_m$, and $\sigma_n$ adjoin the i-th spin $\sigma_i$. First, it is assumed that the values of the neighbor spins are $\sigma_j=+1$, $\sigma_k=-1$, $\sigma_l=+1$, $\sigma_m=-1$, and $\sigma_n=+1$, the interaction coefficients are $J_{j,i}=+1$, $J_{k,i}=+1$, $J_{l,i}=+1$, $J_{m,i}=-1$, and $J_{n,i}=-1$, and the external magnetic field coefficient is $h_i=+1$. At this time, arranging the product of the interaction coefficient and the value of the neighbor spin and the external magnetic field coefficient, respectively, they become $\sigma_j \times J_{j,i}=+1$, $\sigma_k \times J_{k,i}=-1$, $\sigma l \times J_{l,i}=+1$, $\sigma_m \times J_{m,i}=+1$, $\sigma_n \times J_{n,i}=-1$, and $h_i=+1$. The external magnetic field coefficient may be replaced with an interaction coefficient with a spin having always the value of +1.

Here, the local energies between the i-th spin and the neighbor spins become the abovementioned coefficients multiplied by the value of the i-th spin with there signs reversed, respectively. For example, since the local energy with the j-th spin becomes −1 when the i-th spin is set to +1 and becomes +1 when the i-th spin is set to −1, setting the value of the i-th spin to +1 works in a direction in which the local energy here is made small compared with that of the reverse.

When such local energy is considered for between all the neighbor spins and the external magnetic field coefficient, the calculation is performed as to which can make small the energy, selection of +1 or −1 of the i-th spin. For this purpose, what is necessary is just to check which is larger in number, +1 or −1, in respective arrangements of the product of the interaction coefficient and the value of the neighbor spin and the external magnetic field coefficient. In the previous example, bids count four and −1's count two. A total sum of the energy will be −2 if the i-th spin is set to +1 and the total sum of the energy will be −2 if the i-th spin is set to −1. Therefore, it is possible to decide the next state of the i-th spin that minimizes the energy by a majority vote that when the number of +1 is larger, the next state of the i-th spin is set to +1, and when the number of −1 is larger, the next state of the i-th spin is set to −1.

A logic circuit BIO illustrated in the spin unit 300 of FIG. 9 is a circuit for performing the abovementioned interaction. First, by negation of exclusive OR (XNOR) with the memory cell that shows a state of the neighbor spin and +1/−1 of the interaction coefficient, the next state of the spin that minimises the energy when seeing only the interaction can be calculated, (assuming that +1 has been encoded to 1 and −1 has been encoded to 0). In the case where the interaction coefficients are only +1/−1, if it is determined which of +1/−1 is large in number among these outputs by majority logic, the next state of the spin can be decided. Considering that the external magnetic field coefficient is equivalent to an interaction coefficient with the spin always having the state of +1, simply a value of the external magnetic field coefficient becomes a value that should be inputted into the majority logic for deciding the next state of the spin.

Next, a realisation method of the coefficient 0 will be considered. When there is a majority logic f ($I_1$, $I_2$, $I_3$, . . . , $I_n$) of n inputs, it can be said that the following propositions are true. First, suppose that there are inputs $I'_1$, $I'_2$, $I'_3$, . . . , $I'_n$ that are duplicates of $I_1$, $I_2$, $I_3$, . . . , $I_n$ (in this case, for arbitrary k, $I_k=I'_k$ holds). At this time, an output of $f(I_1, I_2, I_3, \ldots, I_n)$ is equal to $f(I_1, I_2, I_3, \ldots, I_n, I'_1, I'_2, I'_3, \ldots, I'_n)$ to which the duplicates are also inputted together. That is, even if two of each input variable are inputted, respectively, the output remains unchanged. Furthermore, suppose that there are another input $I_x$ and its inversion $!I_x$ besides the inputs $I_1, I_2, I_3, \ldots, I_n$. At this time, an output of $f(I_1, I_2, I_3, \ldots, I_n, I_x, !I_x)$ is equal to $f(I_1, I_2, I_3, \ldots, I_n)$. That is, when the input variable and its reversal are inputted, the they work so that an influences of the input variable may be canceled on majority decision. The coefficient 0 is realized using this property of majority logic.

Specifically, as shown in FIG. 9, a duplicate of the value that serves as a candidate or the spin next state previously described or its reversal is inputted to the majority logic simultaneously by a value of a bit (IS0 etc.) that decides enabling of the coefficient using an XOR. For example, since when the IS0 is 0, the value of the IS1 and the inverted value of the IS1 are inputted simultaneously into the majority logic, there will be no influence of the external magnetic field coefficient (the external magnetic field coefficient will foe equivalent to zero). Moreover, when IS0 is 1, the value of IS1 and the same value (duplicate) as that value will foe inputted Into the majority logic simultaneously.

In the above-mentioned explanation, the spin and the each coefficient take a value of binary or ternary, the circuit is realized using a majority logic circuit. However, the essence of the ground state search, as described above, lies in judging, when evaluating the product of the interaction coefficients and the value of the neighbor spin and the magnetic field coefficient, which is more dominant, a positive value or a negative value. Therefore, in the case where the spin and each coefficient take multiple values, the logic circuit can be realized with respective adder circuits of positive and negative values.

(1-9) Avoidance of Local Optimal Solution in Ground State Search of Ising Model (1-9-1) Method for Using Random Number Generator Although the ground state search of the applied Ising model is realizable through energy minimization by the interaction between the spins described above, there is a possibility that the search may fall into a local optimal solution only by this. In the abovementioned logic circuit 810, since it fundamentally makes only a movement in a direction in which the energy is made small, once it falls into the local optimal solution, it cannot get away from there and cannot reach a global optimal solution. Therefore, in order to escape from the local optimal solution, processing of permitting a shift that enlarges the energy by a predetermined probability is taken in.

In this embodiment, it is decided that the value of the spin is inverted by a probability decided by a virtual temperature T. Here, the temperature T is such that a process of the ground state search is likened to physical annealing. It an early stage of the ground state search, T is set to a high temperature, local search is performed while lowering the temperature gradually, and it is cooled to a state where the temperature finally becomes zero.

Referring to FIG. 6 again, in order to invert the value of the spin by a predetermined probability, in this embodiment, the random number generator 150 and the random number generation clock 160 are used. The bit adjuster 151 adjusts an output bit from the random number generator 150 so that the value of the spin may foe inverted by a high probability in the early stage of the ground state search and the value of the spin may foe inverted by a low probability in a final stage. Specifically, by taking out a prescribed number of bits from the output of the random number generator 150 and calculating them in an AND circuit or an OR circuit of many inputs, the output is adjusted so that there may be many 1's in the early stage of the ground state search, and many 0's may be occur in the final stage of the ground state search.

In FIG. 9, an output from the bit adjuster 151 is VAR. The bit adjuster output VAR passes through an amplifier 821, and is inputted into an inversion logic circuit 820. Although the output of the logic circuit 810 outputs the value of the spin that is a local solution, the value of the spin is inverted when the VAR is 1 in the inversion logic circuit 820. Thus, a value that is inverted by a predetermined probability will be stored in a memory cell 701 for storing the value of the spin.

A line 822 is a configuration whereby the multiple spin units 300 share the single random generator 150 and the bit adjuster 151, and transfers an output of the bit adjuster 151 to neighbor spin units. The amplifier 821 is to keep the output from dropping even if the output of the bit adjuster 151 is branched.

Incidentally, as shown in FIG. 6, a random number generator may be provided in each spin unit 300 besides a scheme where the random number generator 150 is provided in the Ising chip 100 and a random number is delivered to the each spin unit, which uses it. Alternatively, a random number generation circuit may be provided outside the Ising chip 100 and the random number may be delivered to the chip from the outside of the chip.

(1-9-2) Method for Controlling Source Voltage

Although in the example of FIG. 6, the random number generator was used, there is a method, as another means for generating a shift that enlarges the energy by a predetermined probability, whereby a bit error of the memory cell is induced by decreasing a source voltage that is supplied to the memory cell, representing the spin, and the spin alignment is changed at random.

As a configuration for this, a memory cell for maintaining the coefficient among the memory cells that the spin unit 300 has is operated with a voltage supplied by a normal source line, and the memory cell K representing the spin is operated with a voltage supplied by a spin dedicated source line. Incidentally, all components other than the memory cells, for example, a logic gate for calculating the interaction, etc. are operated with a voltage supplied by the normal source line.

A bit error rate of the memory cell is proportional to the source voltage supplied to the memory cell. Generally, this voltage of about 1 V is supplied to the memory cell, which is used with the bit error rate suitable for maintaining memory contents. When the voltage is being decreased from this voltage, the bit error rate is also deteriorating in proportion to a range of reduction of the voltage. For example, decreasing the voltage to about 0.6 V reduces the bit error rate to about −1 power of 10, and such a state where the bit error is easy to occur is used for escape from the local optimal solution.

Therefore, for example, in order not to fall into the local optimal solution by searching a solution space more widely in the early stage of the ground state search, the memory cell N that stores the above-mentioned, value of the spin performs the ground state search by the interaction in a situation where a random bit error may occurs by supplying a low source voltage such as 0.6V to the source line for spin. In this situation, the state basically shifts to a state of a reduced energy by the interaction, and in parallel with this, the state shifts to a random state due to the bit error, which causes also a shift to a state to which only the interaction cannot create it, and therefore it becomes possible to search the solution space widely. In order to stabilise the state as the ground state search progresses, the voltage is varied little by little to a state where the bit error rate does not occur easily.

(1-10) Wiring Between Spin Units

Figure 15:
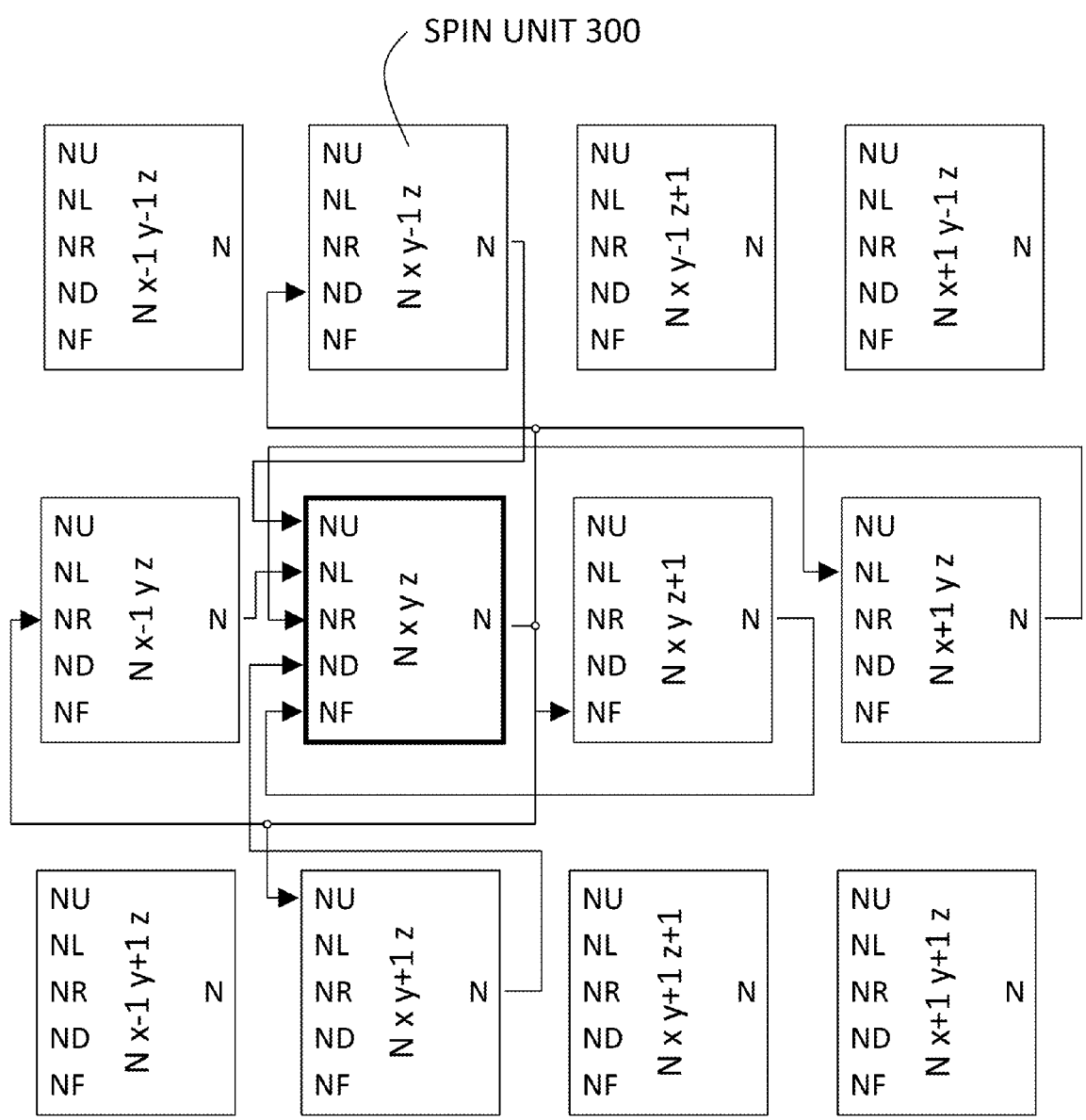
FIG. 15 is a wiring diagram for explaining one example of wiring that performs the interaction between the spin units.

FIG. 15 is a diagram for explaining one example of wiring that performs the interaction between the spin units.

FIG. 15 shows an example of wiring of NO, NL, NR, ND, NF, and N that are interfaces of the spin unit shown in FIG. 9. FIG. 15 shows wiring that is suitable in order to realize the topology as shown in FIG. 8 with the spin units arranged as shown in FIG. 13 when one certain spin unit Nxyz is paid attention to. By performing such wiring for every spin unit, the topology of FIG. 8 is realizable on the circuit.

(1-11) Operating Sequence

Figure 16:
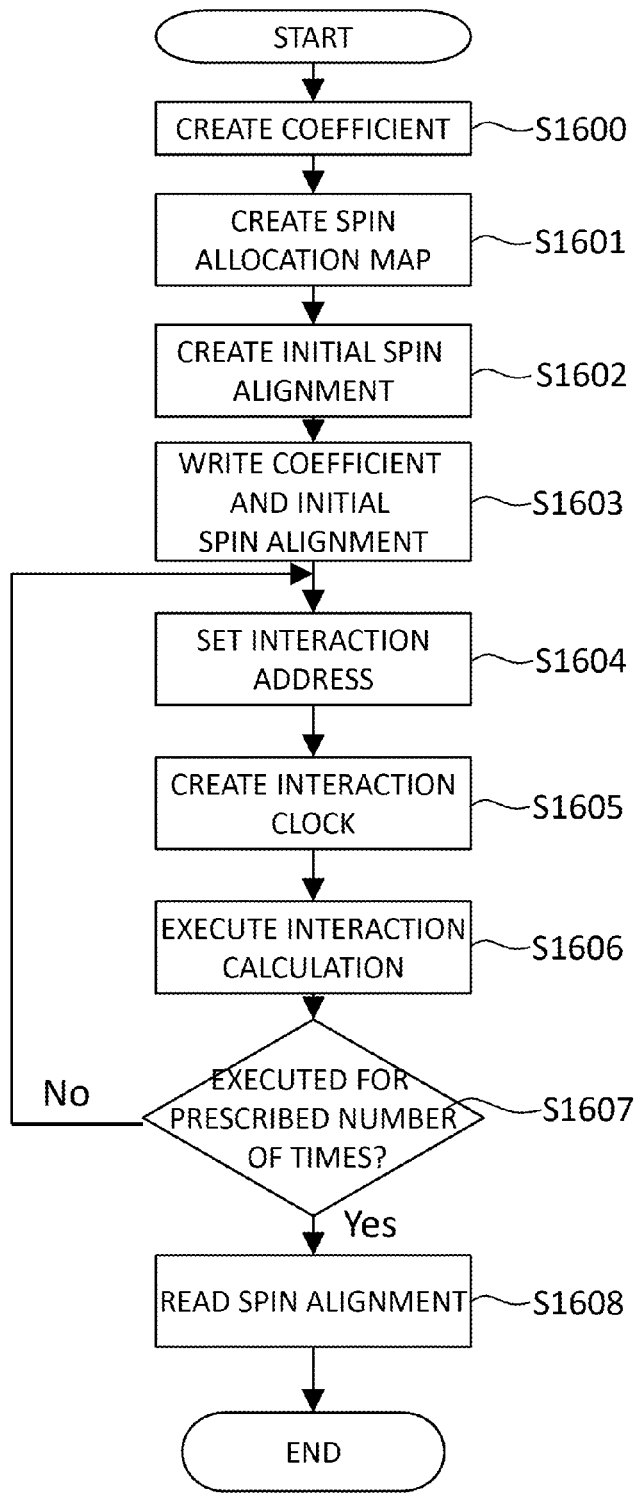
FIG. 16 is a flowchart for explaining one example of a control procedure of the Ising chip.

FIG. 16 shows an outline of a procedure of performing the ground state search by the CPU 210 controlling the Ising chip 100 in the processor 200.

In Step S1600, the interaction coefficients and the external magnetic field coefficient that represent an object problem of the Ising model are generated. Describing this in an example of the maximum cut problem, this is to generate the Ising model shown in FIG. 4 when the maximum cut problem as shown in FIG. 3 is given.

In Step S1601, a spin allocation map is generated. The spin allocation map is information defining how the Ising model is assigned to the Ising chip 100 when solving the Ising model intended to be solved. For example, the Ising model of FIG. 4 is applied to a three-dimensional grid as shown in FIG. 14, this is mapped on the spin array of FIG. 13, and the memory map as shown in FIG. 12 is generated.

In Step S1602, initial spin alignment is generated. Usually, an initial value of the spin Is set to a random value.

In Step S1603, the coefficients and the initial spin alignment are written in the spin array based on the memory map.

In Step S1604, the interaction addresses are set, and the first group and the second group of the spin array are specified alternately, for example.

In Step S1605, similarly, a clock for the first group and the second group of the spin array are generated.

In Step S1606, according to the interaction address and the interaction clock, the value of the spin array is read, the next state of the spin is decided, and the spin is rewritten. At this time, the spin is rewritten at random by a predetermined probability so that the solution may not fail into the local solution as described above.

When interaction calculation is performed a prescribed number of times in Step S1607, spin alignment is read in step S1608. This spin alignment serves as a solution.

A control of the whole as the above can be performed by the CPU 210 of the information processor shown in FIG. 7 based on software stored in the RAH 220.

(1-12) Data Structure Representing Ising Model and Format

FIG. 17 shows an example of a data structure that represents the Ising model on the Information processor 200. The Ising model is defined by a problem definition 1700, and includes an interaction definition part 1710 for defining the interaction coefficient, and the external magnetic field coefficient definition part 1720 for defining the external magnetic field coefficient.

The interaction definition part 1710 makes one set of the identifier for specifying the spin that serves as an origin of the interaction (for example, a unique number is given to the spin and designates it as an identifier), an identifier of the spin that serves as a destination of the interaction, and the interaction coefficient, and arranges these sets by the number of interactions. This is close to an adjacency list that is the data structure when, handling a graph on a computer. Here, the represented Ising model becomes the directed graph.

The external magnetic field coefficient definition part 1720 makes one set of an identifier for specifying the spin that gives an external magnetic field and the external magnetic field coefficient, and arranges these sets by the number of the external magnetic field coefficients.

Incidentally, the interaction coefficient between spins that are not defined by the interaction definition part 1710 and the external magnetic field coefficient to a spin that is not defined by the external magnetic field coefficient definition part 1720 shall be zeros. That is, the default value is zero indicating that no interaction exists between the spins concerned in the case of the interaction coefficient, and becomes zero indicating that no external magnetic field exists for the spins concerned in the case of the external magnetic field coefficient.

FIG. 18 snows one example of a more concrete expression form of the data structure of FIG. 17, especially a format (file format) in the case of maintaining data on the HDD 260. The data structure of FIG. 18 is realised as a text file on the HDD 260. A format of the text file is one in which an identifier for identifying whether the data is for the interaction or the external magnetic field, identifiers of the spins, and the coefficients are arranged, as shown as problem data 1800 in FIG. 18.

(1-13) Data Structure Representing Solution and Format

Figure 19:
FIG. 19 is a table diagram showing a configuration ox solution data of the Ising chip.

FIG. 19 shows so example 1900 of a data structure by which the solution data indicating a spin alignment that becomes a solution or a solution candidate being read out by spin alignment read (S1608) of FIG. 16 is represented on the information processor 200, and an example of a format on the HDD 260. Since the solution of the Ising model is the spin alignment, its data structure becomes an arrangement of sets that is obtained by making one set of the identifier of the spin and the value of the spin and arranging the sets like the solution 1000. Then, on the premise that values are written without abbreviation for ail the spins, the data structure can foe maintained on the HDD 260 as a text file in which only values of the spins are enumerated like solution data 1020 while omitting the identifiers of the spins.

(2) Application to Data Classification Problem (2-1) Application to Problem of Region Extraction of Image Data As an application example of the calculation using the interaction model, the segmentation of image data will be explained. The segmentation of image data means that when a region having a predetermined characteristic (feature) in the image is intended to be extracted, the user specifies an example of the region that is intended to be extracted (called a seed or a target), a portion similar to this is automatically extracted.

FIG. 20 shows an example of region extraction of the image data. The image data generally includes pixels each having x and y coordinate components. Each pixel has information such as luminance, hue, and color saturation as characteristics. Suppose that the user wishes to specify the foreground region 1710 and the background region 1720 from a segmentation object image 1700 and to discriminate each region automatically. This work is a work of differentiating the pixels into a group of pixels that are similar to a pixel constituting the foreground specified by the user and a group of pixels that are similar to a pixel constituting the background specified by the user.

Figure 21:
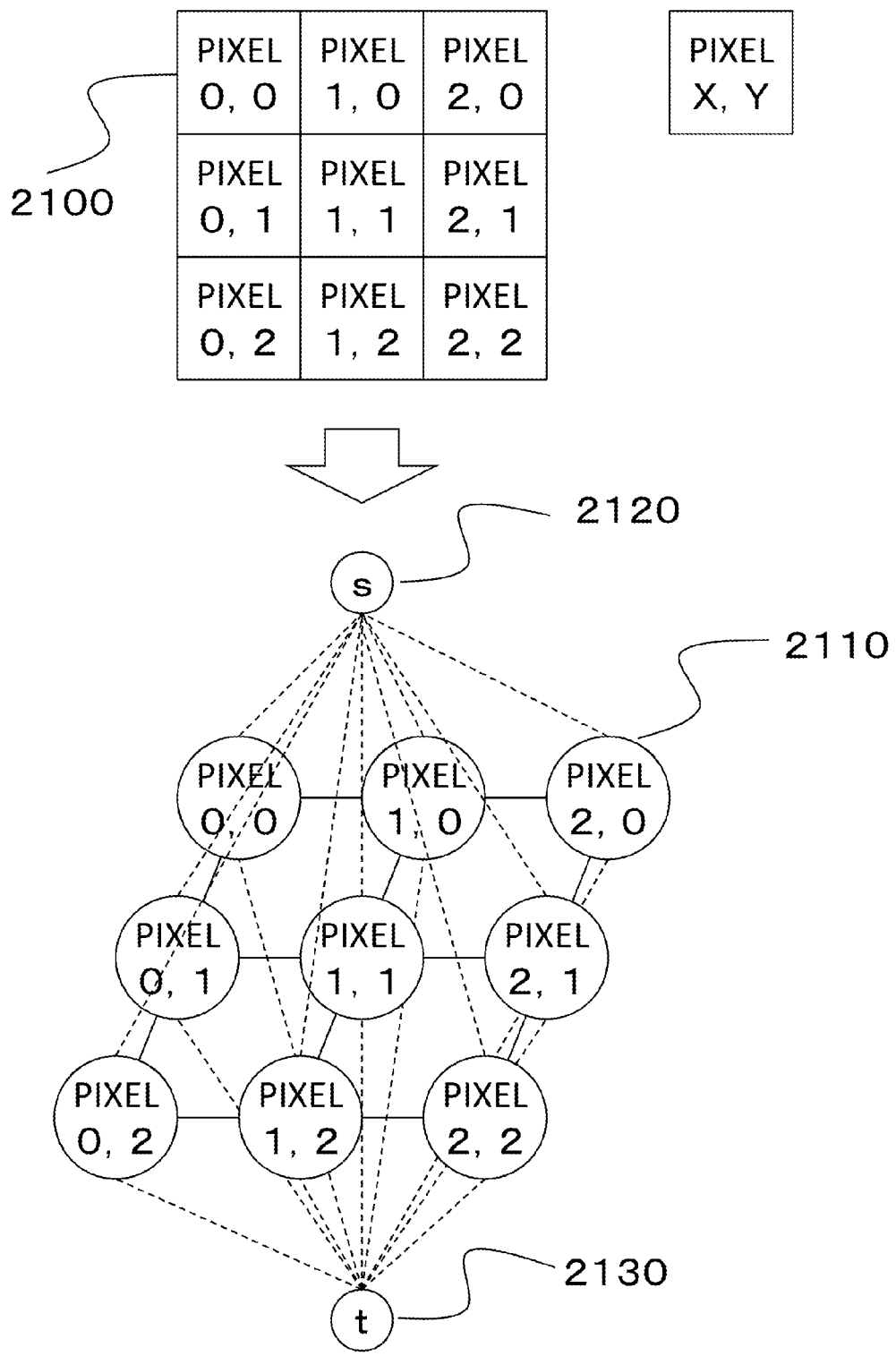
FIG. 21 is a conceptual diagram showing a relation between a pixel of an image and a site of the Ising model.

FIG. 21 shows a diagram in which a problem of the region extraction of the image data is made into a graph. For example, consider the case where nine pixels 2100 of a pixel (0, 0) to pixel (2, 2) are intended to be classified into the foreground and background specified by the user. At this time, a graph in which pixel (0, 0) to pixel (2, 2) are designated as nodes 2110, and the foreground pixel s specified by the user is designated as a source node 2120, and the background pixel t specified by the user is designated as a target node 2130 is created. Each node is connected to each other with a side and the each side has a cost as described above. If a cut that minimizes a sum of costs is found out, a solution can be found. If the coat is associated with an intensity of the side, when pulling the source and the target in a reverse direction, the cut is executed at a side whose intensity is the weakest.

Figure 22:
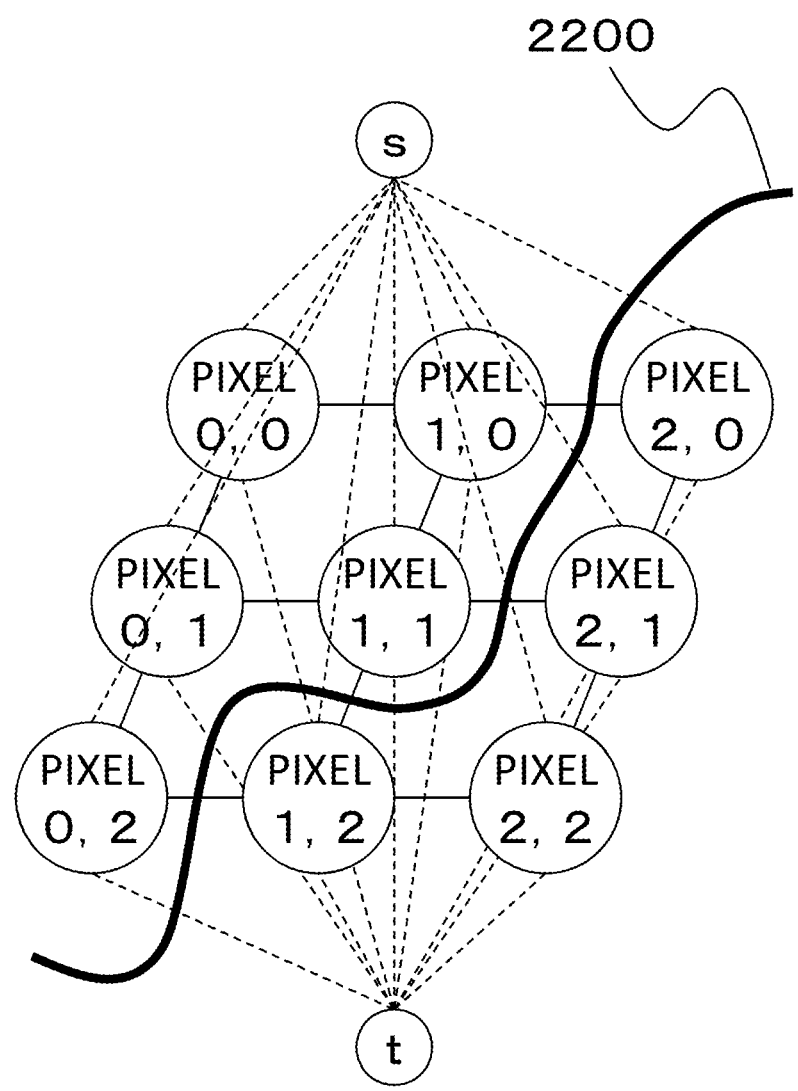
FIG. 22 is a conceptual diagram showing a minimum cut in the Ising model that is made to correspond to the pixel.

FIG. 22 shows a state where the minimum cut is solved. In a portion of s-t minimum cut (s-t Mincut), a sum of costs becomes a minimum, four pixels of pixels (2, 0), (2, 1), (2, 2), and (1, 2) are classified into the background, and other pixels are classified into the foreground.

Figure 23:
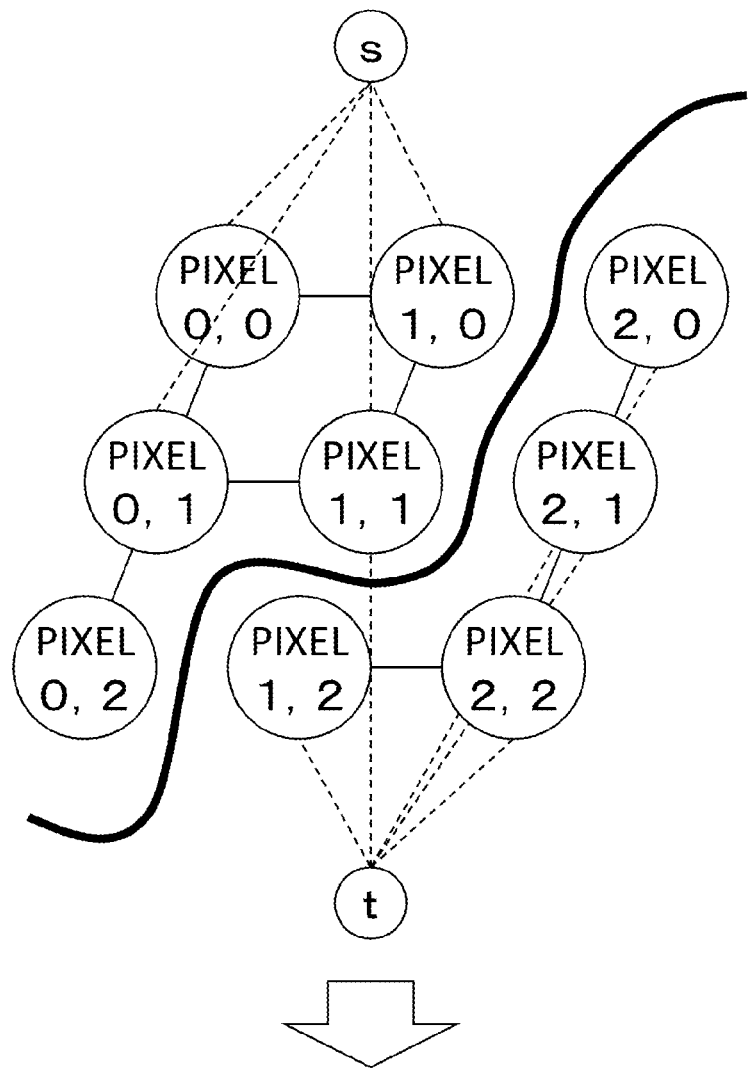
FIG. 23 is a conceptual diagram showing a segmentation result by the Ising model that is made to correspond to the pixel.

FIG. 23 shows a result that is obtained by performing the segmentation on pixels according to the solution, and classifying the pixels into the foreground side (seed (s) side) and the background side (target (t) side).

Figure 24:
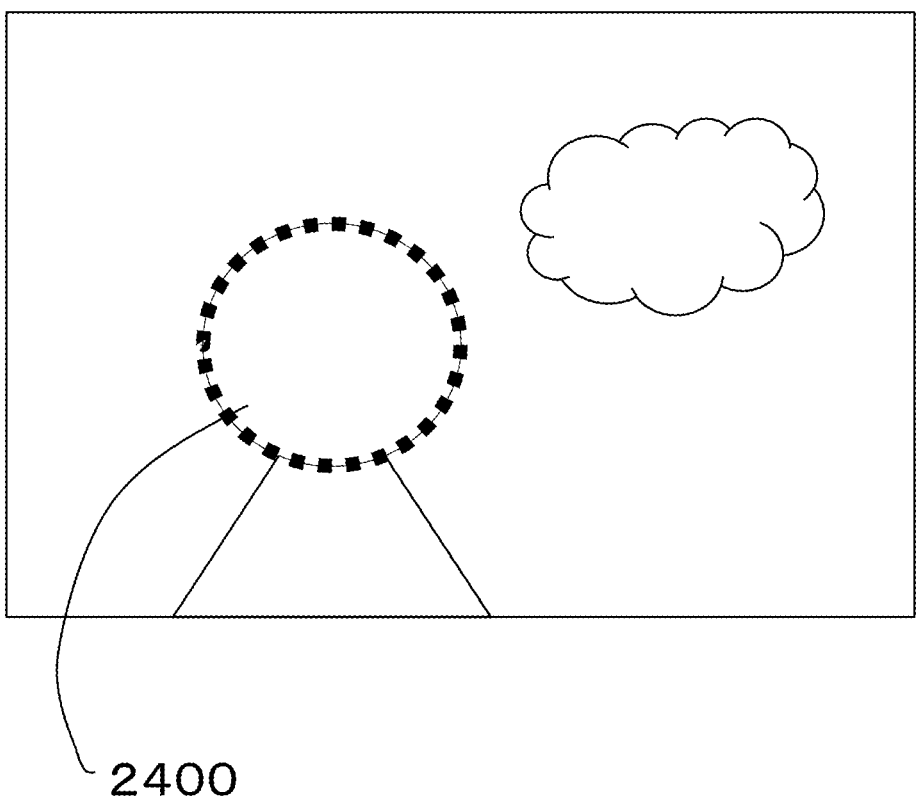
FIG. 24 is a plan view showing an example of displaying the segmentation result.

FIG. 24 is a display example of the result. The pixels that are estimated, to be the same as the pixel specified as the foreground region 1710 are classified as the foreground side (s side), and the region extracted as the foreground is displayed as a mask 2400.

(2-2) Conversion of Problem of Region Extraction of Image Data into Ground State Search Problem of Ising Model The maximum cut problem shown in FIG. 3 was to group the set V of the vertexes into V' and V'\V so that the size of the cut may be maximized when the graph G=(V, E) was given. Moreover, if the signs of the weights of the maximum cut problem are reversed, it will become the minimum cut problem (FIG. 4).

Incidentally, a technique called Graph cut is known in the region extraction (image segmentation) of an image. In the graph out problem, a solution that minimizes the energy including a data term and a smoothing term is found. Here, the data term is a term that indicates a similarity between the seed or target and the attention pixel. However, if region division of the image is performed only based on the data terra, there will be a case where a boundary of the region will become unnatural. Moreover, a region that is dotted with noiselike things may occur. Then, the smoothing term is adopted in order to maintain smoothness of the image. The smoothing term is a term that indicates a difference of a characteristic (luminance etc.) that the pixels of the neighbor spins have and one that the pixel of the attention spin has.

In the graph of FIG. 21, a dotted line that connects between the seed or the target and the pixel will correspond to the data term, and a solid line that connects between the pixels will correspond to the smoothing term.

(2-2-1) Method for Deciding Ising Model Coefficient for Image Data Segmentation

EXAMPLE 1

Figure 25:
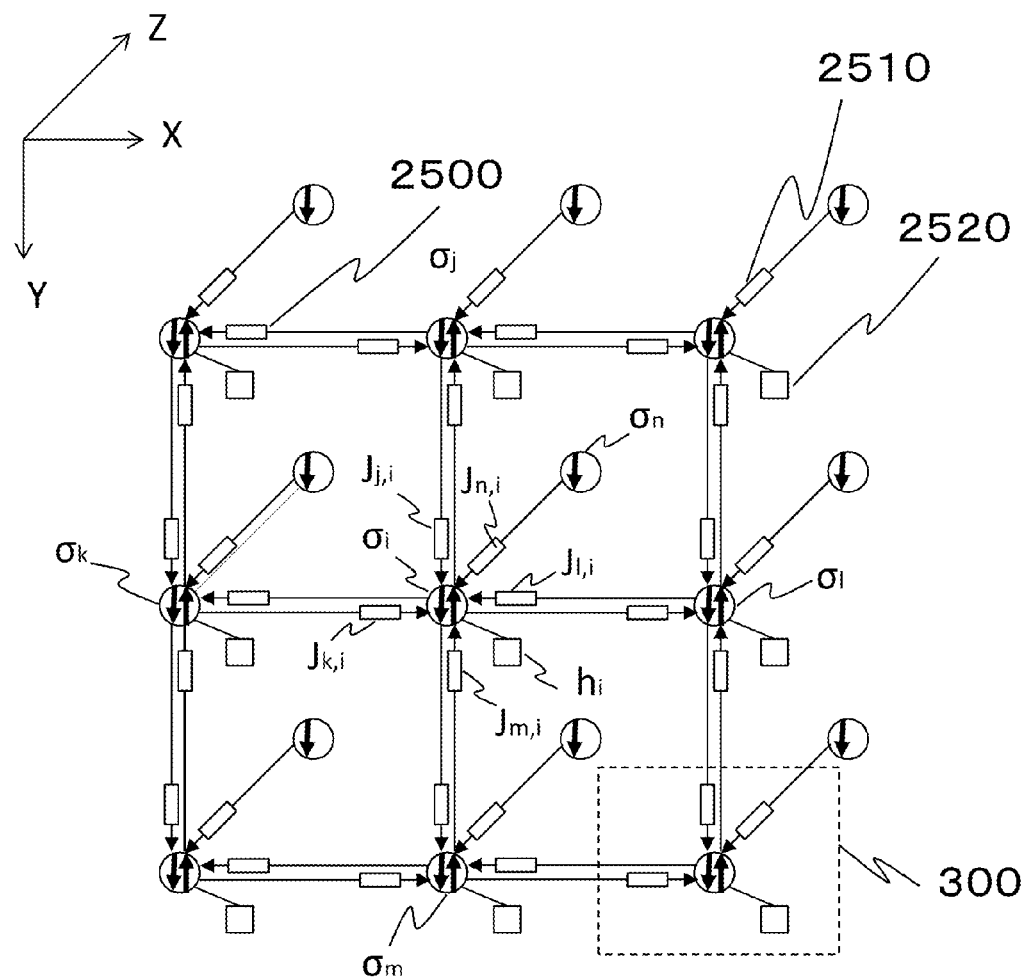
FIG. 25 is a perspective view showing an application example of an image segmentation problem to the Ising model.

With reference to FIG. 25, an example of a setting of the coefficients (the interaction coefficients and the external magnetic field coefficient) for image data segmentation will be explained. FIG. 25 shows an example in which the multiple spin units 300 are arranged to constitute an Ising model having a topology of the three-dimensional grid shape for performing the segmentation. In order to simplify it, the example in which the segmentation is performed based on a luminance value of a pixel will be explained.

The example of FIG. 25 is a three-dimensional grid whose dimensions in the X-, Y-, and Z-axis directions are 3×3×2. When a topology other than the three-dimensional grid is used, for example, a topology on a tree, the topology will be represented with the number of stages of the tree, etc. In the topology of the three-dimensional grid shape of FIG. 25, if the interaction between, the spins is regarded as a graph, the spin (vertex) of the degree 5 at maximum will be needed.

Incidentally, if inclusion of connection of the external magnetic field coefficient is also considered, the degree 6 at maximum will be needed.

The minimum cut problem for the image data segmentation is applied to the Ising model of Formula 1, and the coefficients $J_{i,j}$ and $h_i$ for finding a minimum energy function $E(\sigma)$ are set as follows.

The input image shall correspond to the spin unit on an X-Y plane. The input image is identified whether it is the foreground (1) or the background (0) by the upward direction (+1) and the downward direction (−1) of the spin. Here, the foreground is made to correspond, to (+1) of the spin, and the background, is made to correspond to (−1) of the spin. For example, in the case where there is an image shown in FIG. 21 including three pixels longitudinally and three pixels transversely, each pixel will correspond to nine spin units on the X-Y plane. Here, the luminance value of each pixel shall be referred to as I(x, y) and a range of the luminance value shall be |I(x, y)|≤Imax. The data of the luminance value shall be stored in the HDD 260 as the image data in advance.

First, the user specifies the regions that are considered to be the foreground (layer 1=0) and the background (layer 1=1), respectively. Next, a histogram indicating what kind of characteristic the pixel has in the region specified by the user is created. For example, it is a histogram that represents the luminance value on an abscissa and represents a frequency at which the luminance value appears in the layer on an ordinate. In the case of a gray scale image, for the characteristic of a pixel, the luminance value may be used like this example. In the case of a color image, it can be represented with three- or four-dimensional vectors that are represented in various color spaces in addition to the luminance value.

The histograms of the respective regions of the foreground and the background shall be referred to as an occurrence frequency of the luminance c in θ(c, 1)=layer 1 (being normalized between zero and unity).

The interaction coefficients (smoothing terms) $J_{j,i}$, $J_{k,i}$, $J_{l,i}$, and $J_{m,i}$ are expressed by Formula 3. As shown in FIG. 25, spins of a first layer (Z=0, i.e., on the X-Y plane) have interaction coefficients (smoothing terms) 2500 therebetween in a grid configuration, k and, $\lambda_n$ are coefficients (constants).

$$J_{ij}=J_{ji}=\lambda_h \cdot e^{-k|I(x_i,y_i)-I(x_j,y_j)|} \quad \text{[Formula 3]}$$

The interaction coefficient (background data term) $J_{n,i}$ is expressed by Formula 4. As shown in FIG. 25, the spins in the first layer (Z=0) and a second layer (Z=1) that have the same X and Y have the interaction coefficients (background data, term) 2510 therebetween in the grid configuration, $\lambda_g$ is a coefficient (constant).

$$J_G=0$$

$$J_H=\lambda_g \cdot \log \{\theta[I(x_i,y_i),I]+1\} \quad \text{[Formula 4]}$$

The external magnetic field coefficient (foreground data term) $h_i$ is expressed by Formula 5. As shown in FIG. 25, the spin of the first layer has the external magnetic field coefficient (foreground data term) 2520, $\lambda_g$ is a coefficient (constant).

$$h_i=\lambda_g \cdot \log \{\theta[I(x_i,y_i),0]+1\} \quad \text{[Formula 5]}$$

Figure 26:
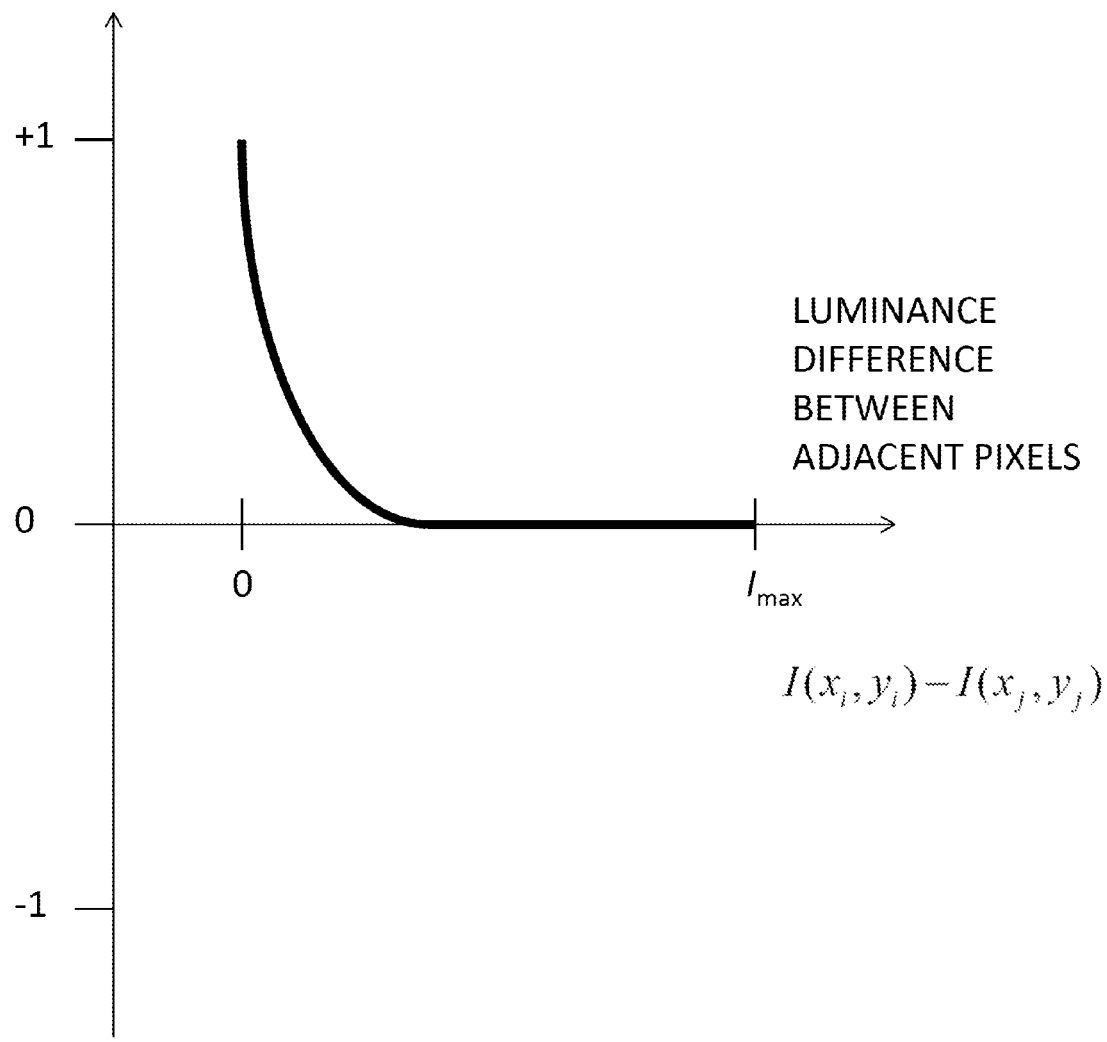
FIG. 26 is a graphical representation showing a relation between a luminance difference between neighbor pixels and a smoothing term output.

As shown in FIG. 26, the interaction coefficient (smoothing term) $J_{i,j}$ 2500 takes a value close to unity when the luminance difference between neighbor pixels is small. As a feature of the image, the pixels adjacent to each other belong to the same segment in many cases. Then, the smoothing term is moved so that the value of the spin of the attention pixel may become equal to a value of a dominant spin in the neighbor pixels. When the luminance difference between the neighbor pixels is large, the smoothing term takes a value of zero and the data term becomes dominant.

With the external magnetic field coefficient 2520, the foreground data term is used to estimate whether the attention pixel is close to the pixel specified as the foreground or not. With the interaction coefficient (background data term) 2510, the background data term is used to estimate whether the attention pixel is close to the pixel specified as the background or not. For this reason, the data term refers to histograms of the foreground and the background specified by the user, for example, evaluates to which the attention, pixel is close, the foreground or the background, based on the histograms, and judges the spin of the attention pixel based on it.

(2-2-2) Deciding Method for Ising Model Coefficient for Image Data Segmentation

EXAMPLE 2

Figure 27A:
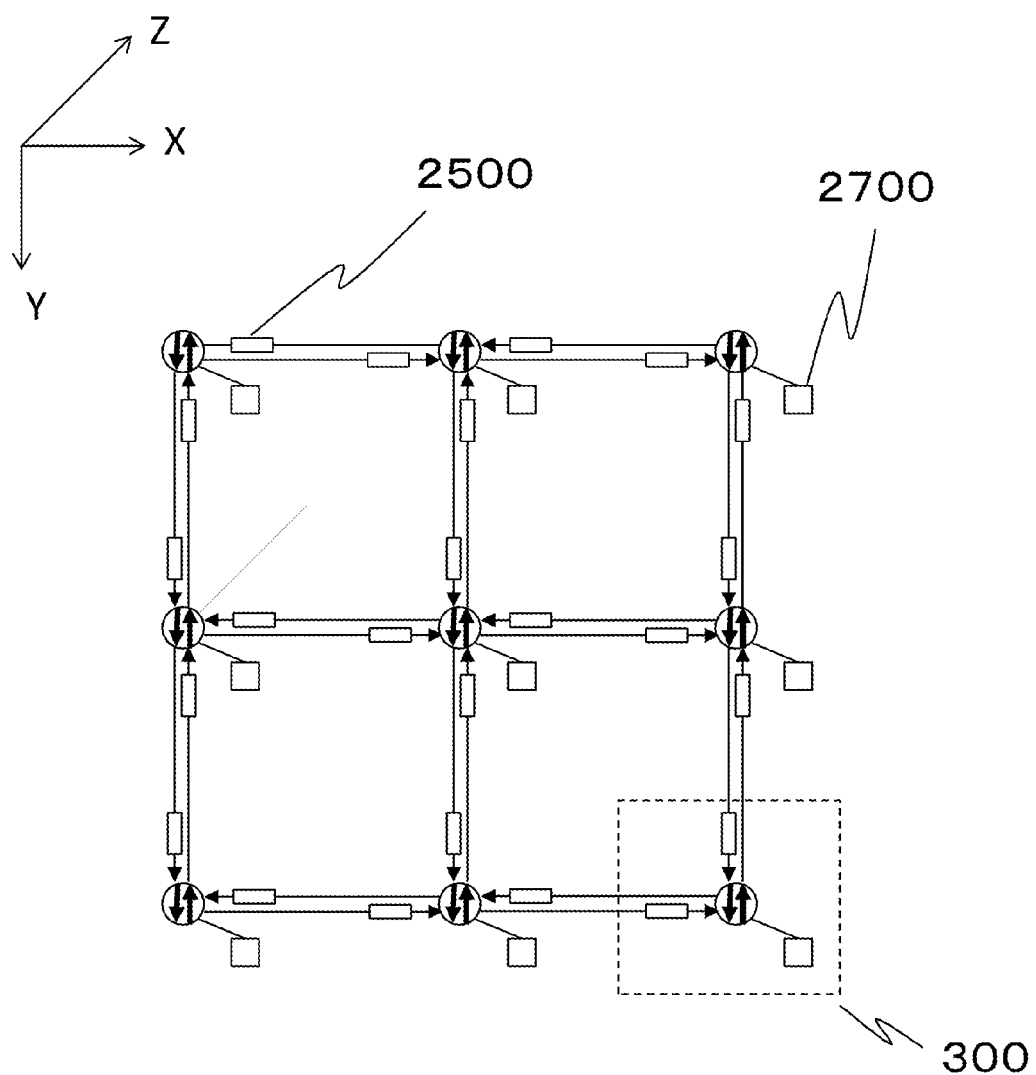
FIG. 27A is a perspective view showing another application example of the image segmentation problem to the Ising model.

With reference to FIG. 27a, an example of a setting of the coefficients for the image data segmentation will be explained. FIG. 27a shows an example in which the multiple spin units 300 are arranged to constitute the Ising model having a topology of a two-dimensional grid shape for performing the segmentation. In order to simplify it, an example in which the segmentation is performed based on the luminance value of the pixel will be explained.

The example of FIG. 21A is the two-dimensional grid shape with a size of 3×3 in the X- and Y-axis directions. In a topology of the two-dimensional grid shape of FIG. 27a, regarding the interaction between the spins as a graph, the spin (vertex) of degree 4 at maximum is needed. Incidentally, if inclusion of connection of the external magnetic field coefficient is also considered, the degree 5 at maximum will be needed.

Like the example of FIG. 25, the input image is associated with the spin unit on the X-Y plane. Moreover, a definition of the luminance value of each pixel, specification of the foreground and the background by the user, and creation of histograms of the foreground and the background are the same as those of Example 1.

The interaction coefficients (smoothing terms) $J_{j,i}$, $J_{k,i}$, $J_{l,i}$, $J_{m,i}$ are expressed by Formula 6. As shown in FIG. 27A, the spins of the first layer (Z=0, i.e., on the X-Y plane) have the interaction coefficients (smoothing terms) 2500 therebetween in the grid configuration, k and $\lambda_h$ are coefficients (constants).

$$J_{ij}=J_{ji}=\lambda_h \cdot e^{-k|I(x_i,y_i)-I(x_j,y_j)|} \quad \text{[Formula 6]}$$

The external magnetic field coefficient (data term) $h_i$ is expressed by Formula 7. As shown in FIG. 27A, each spin has an external magnetic field coefficient (data term) 2700. $\lambda_g$ is a coefficient (constant).

$$h_i=\lambda_g \cdot \{\log \{\theta[I(x_i,y_i),0]+1\}-\log \{\theta[I(x_i,y_i),1]+1\}\} \quad \text{[Formula 7]}$$

Although in Example 1, the data term was divided into the foreground data term and the background data term, in Example 2, the external magnetic field coefficient (data term) takes the following form.

Data term=Foreground data term−Background data term

As a result, a data term becomes a positive value when the attention pixel is closer to the characteristic of the foreground, and fakes a negative value when it is closer to the characteristic of the background. Therefore, the spin of the attention pixel can be judged based on this.

The interaction coefficient (smoothing term) is the same as that of Example 1.

Figure 27B:
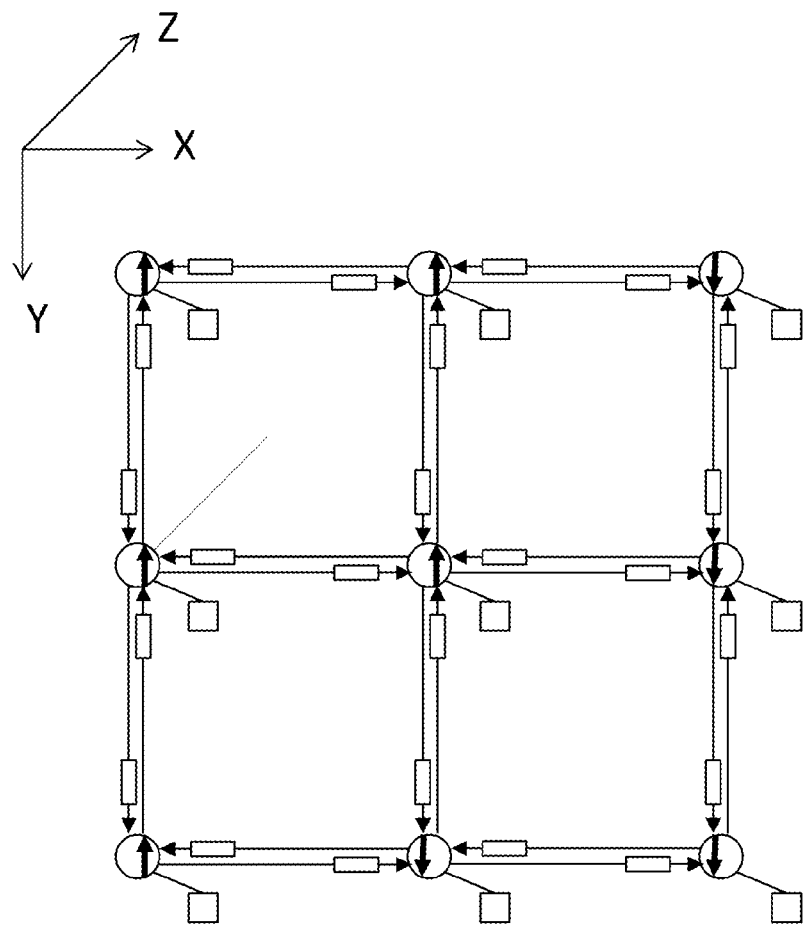
FIG. 27B is a conceptual diagram showing an example of a solution of the image segmentation problem by the Ising model.

FIG. 27B shows an example of a correspondence between the solution obtained using a model of FIG. 27A and the image. It is found that each spin corresponds to a pixel and the value of each spin indicates a segment into which the pixel is classified.

In the topology of the Ising model for the image segmentation explained above, the spin unit on a certain plane corresponds to the pixel of the image as it is. Although the topology shown in FIG. 25 and FIG. 27 corresponds to the pixels of 3×3, when the pixel increases in number, the spin unit on the same plane may be increased in number as it is.

(2-2-3) Deciding Method for Ising Model Coefficient for Image Data Segmentation

EXAMPLE 3

The formula expressed by Formula 3 (same as Formula 6) was used for any of the smoothing terms explained above.

FIG. 26 snows the luminance difference between the neighbor pixels on an abscissa and the smoothing term output expressed by Formula 3 that is defined on an ordinate, the both being made into a graph. $J_{i,j}$ output becomes a maximum when the luminance difference between the neighbor pixels is zero, as is clear from FIG. 26. Assigning this $J_{i,j}$ to Formula 1, it turns out that the energy becomes small when the signs of the neighbor spins are the same. That is, the spin of the attention pixel Is drawn in the same direction as those of the spins of surrounding pixels. The smoothing term of Formula 3 is suitable in the case where the characteristic (for example, luminance) of the pixel varies smoothly. On the other hand, it is difficult for the term to appropriately reflect a portion where the characteristic of the pixel varies discretely (for example, a boundary between two objects).

Formula 8 is an example of another smoothing term.

$$J_{ij}=J_{ji}=\lambda_g \cdot e^{-k|I(xi,yi)-I(xj,yj)|} - e^{-k|jcon-\{I(xi,yi)-I(xj,yj)\}|}$$ [Formula 8]

Figure 28:
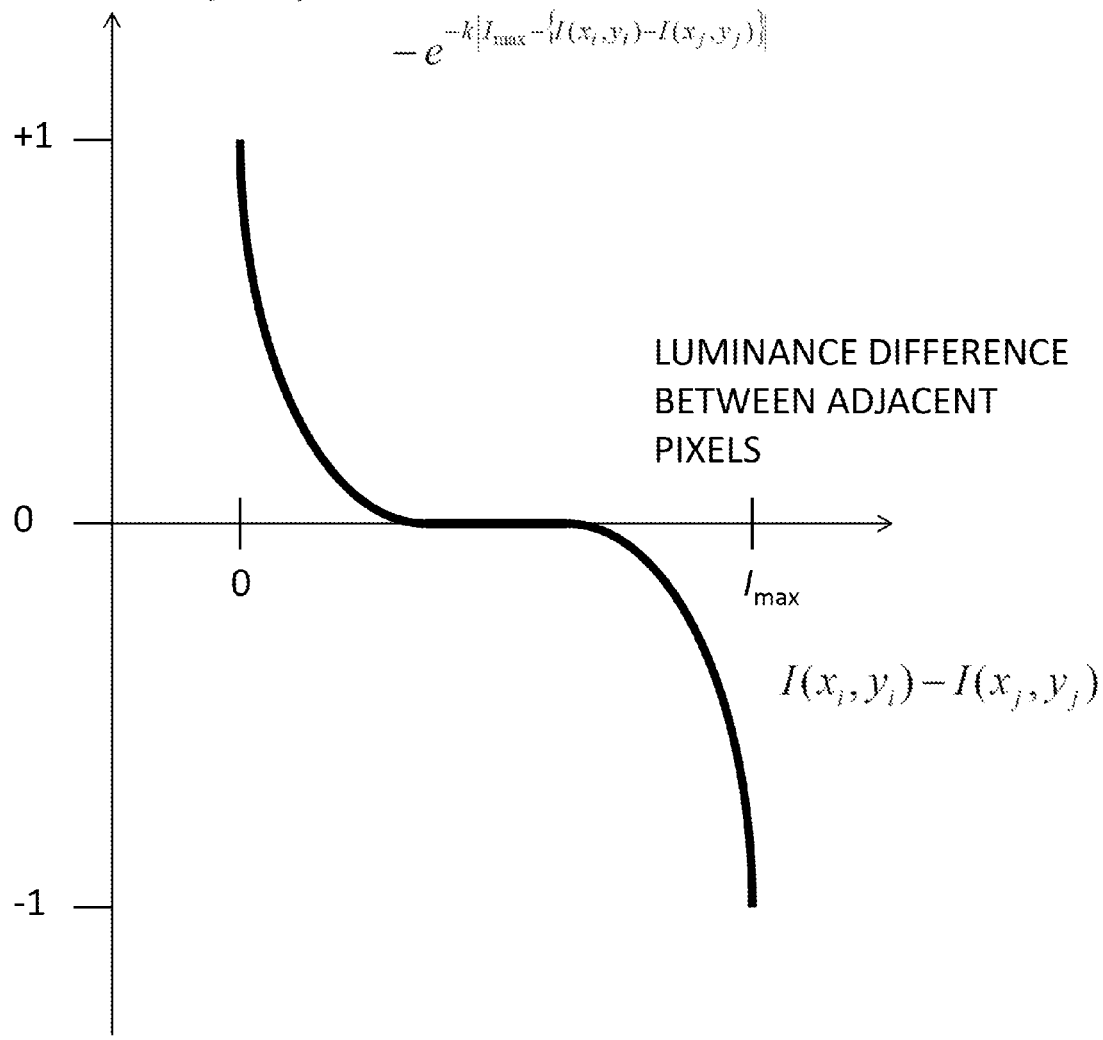
FIG. 28 is a graphical representation showing another example of the relation between the luminance difference between the neighbor pixels and the smoothing term output.

FIG. 28 shows the luminance difference between the neighbor pixels on an abscissa and the smoothing term output expressed by Formula 8 that is defined on an ordinate, the both being made into a graph.

As is clear from FIG. 28, when the luminance difference between, the neighbor pixels is zero, $J_{i,j}$ output becomes a maximum. On the contrary, when the luminance difference between the neighbor pixels is MAX, $J_{i,j}$ output becomes a negative maximum. Then, when the luminance difference between the neighbor pixels takes a value between the two, $J_{i,j}$ output becomes zero. Using the smoothing term of Formula 8, the following can be said: when the luminance difference between the neighbor pixels is small, the value of the spin of the attention pixel is drawn in the same direction as that of the value of the spin of the surrounding pixels, and on the contrary, when the luminance difference between the neighbor pixels is large, the value of the spin of the attention pixel is drawn in the reverse direction to that of the value of the spin of the surrounding pixels. Moreover, when the luminance difference between the neighbor pixels is a middle value, the smoothing term approaches zero and an influence of the data, term becomes dominant.

In the above, the example of the function for performing the segmentation was shown in two kinds of examples. However, the present invention is not limited to this function, and the calculation can be done using other functions. For example, a part of the term can be omitted by using only the interaction coefficient or using only the external magnetic field coefficient. Moreover, another coefficient, can also be introduced additionally and the Ising model can be applied, to the interaction model obtained by generalizing the Ising model.

(2-3) Processing with Ising Chip

As shown in FIG. 25 and FIG. 27, a problem, of the region extraction of the image data that was converted into the ground state search problem of the Ising model is fundamentally the same as a configuration of FIG. 8. Therefore, the problem can be processed by the configuration explained in "(1) Basic configuration of Ising chip," and that configuration is followed. Below, a point peculiar to the problem of the region extraction of the image data will be explained.

(2-3-1) System Configuration for Image Data Segmentation

Figure 29:
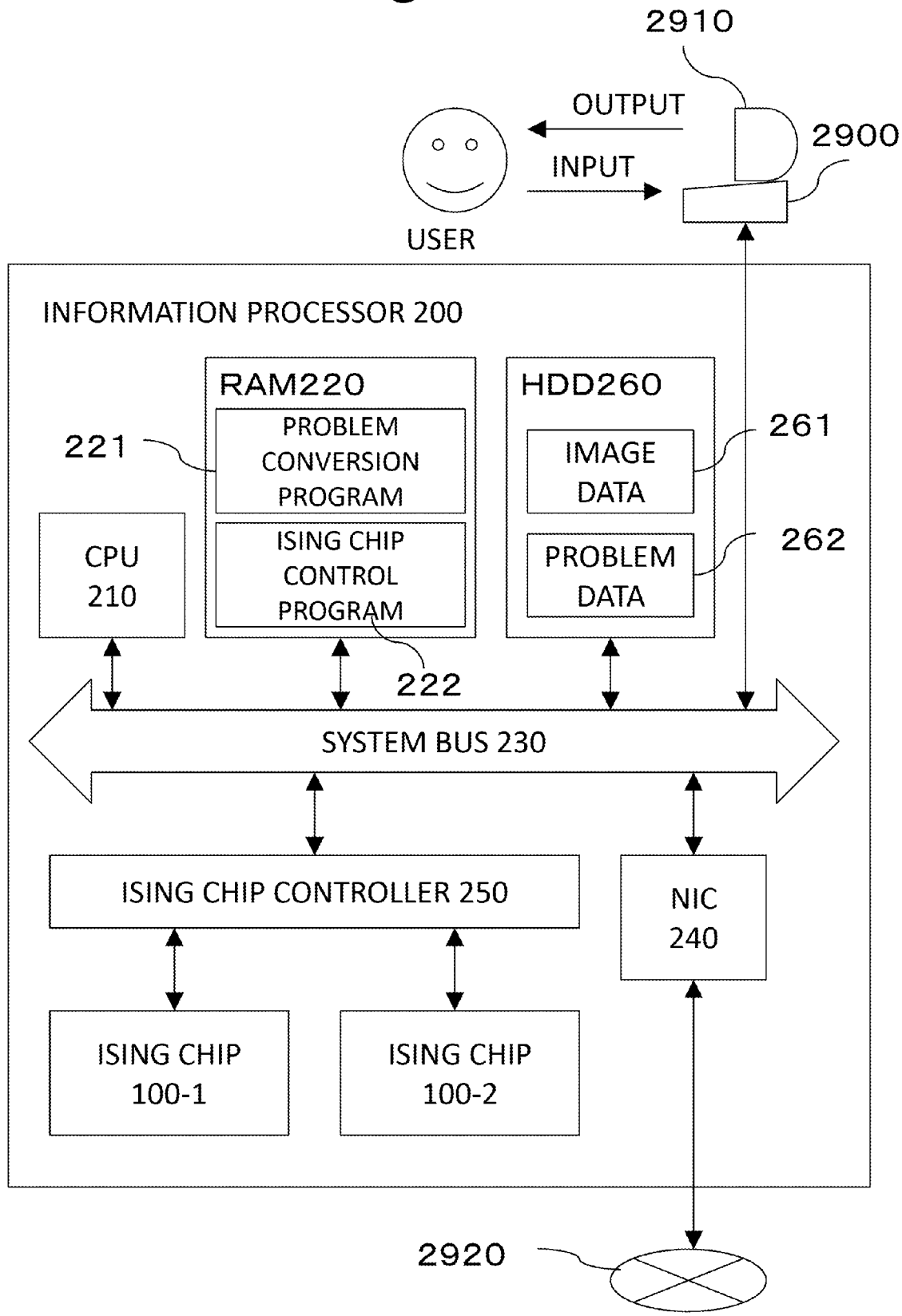
FIG. 29 is a block diagram for explaining a configuration of an image processor including the Ising chip that is one embodiment of the present invention.

FIG. 29 shows a system configuration diagram for the image data segmentation. The same component as that of FIG. 7 is given the same reference letter and its explanation is omitted, and different portions will be explained mainly.

The system of FIG. 29 includes an input device 2900 and an output device (display device) 2910 for the user to specify the image data. Moreover, it is connectable to a network 2920 with the system bus 230 through a network interface circuit (NIC) 240. This system can also operate in cooperation with other information processors through the network 2920.

The user specifies the foreground region 1710 and the background region 1720 with the input device 2900, while displaying the image, for example, shown in FIG. 20 on the display device 2910. Various kinds of data and programs are stored in the RAM 220 and the HDD 260 (to be described later).

(2-3-2) Processing Flow for Image Data Segmentation

Figure 30:
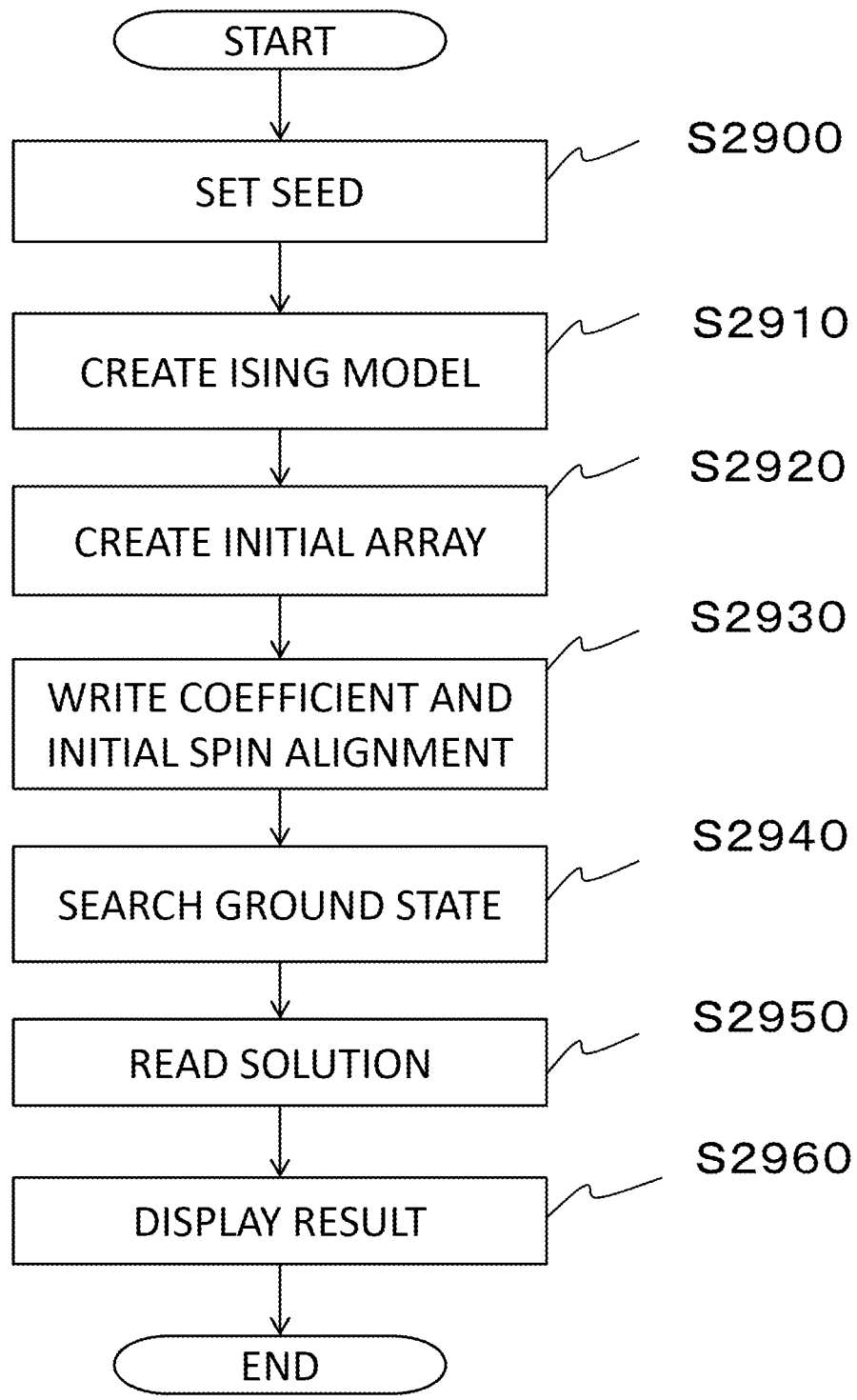
FIG. 30 is a flowchart of image segmentation processing that is one embodiment of the present invention.

FIG. 30 shows an outline of a processing flow, in S2900, a portion that serves as the seed is set from the image. In S2910, an Ising model is generated from the image and the seed. In S2920, an initial alignment of spins and coefficients corresponding to the Ising model is generated. In S2930, the spins and the coefficients that are generated are written in the spin array. In S2940, the ground state is searched and the interaction is executed a prescribed number of times. In S2950, an obtained solution is read. In S2960, a result is displayed to the user based on the obtained solution. Below, each processing will be explained referring to a system configuration of FIG. 29 and a flow of FIG. 30.

(2-3-2-1) Setting of Seed

Processing of setting a portion that serves as the seed from the image of FIG. 30 (S2900) will be explained.

Figure 31:
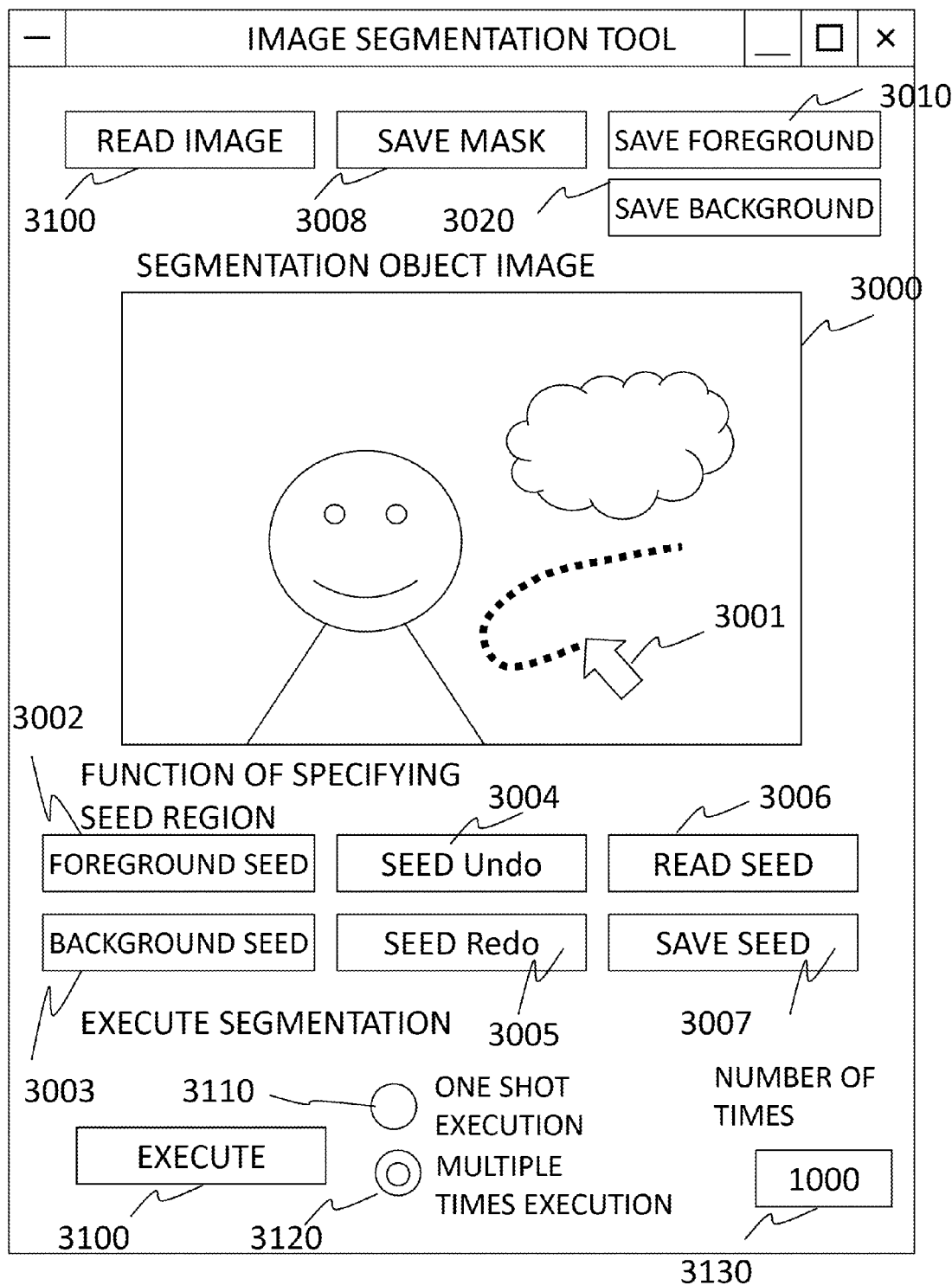
FIG. 31 is a plan view of an image segmentation processing screen that is one embodiment of the present invention.

FIG. 31 is an image displayed on the output device 2910 of the system of FIG. 29, and it is used for setting the seed and displaying the result.

This screen shows the segmentation object image 3000, and at the same time, is configured to permit a pointer 3001 to specify an arbitrary part of the object image 3000. The image 3000 can be called by a button 3100. After the user specifies an arbitrary part of the object image 3000 with a closed circle etc., the seed of the foreground or the background can be set by the user selecting a button 3002 or 3003. The seed that was set can be cancelled by a button 3004. Moreover, cancellation can be canceled by a button 3005. Moreover, the seed that was set can be recorded by a button 3007. Moreover, the seed that is recorded can be read by a button 3006.

A pixel specified as the seed by the user can be identified with X and Y coordinates. For example, if the number of pixels of the object image 3000 is 800×600 (length and breadth), a position of each pixel will take one of the values ranging from (1, 1) to (800, 600). Image data 261 of the object image 3000 is stored in the HDD, and data that indicates characteristics such as coordinates of a pixel, a luminance of the pixel, hue, and saturation is made to correspond to coordinates of the pixel. The pixel specified by the user as the seed is given a flag of the foreground or the background, and is stored in the image data 261. Other configurations of FIG. 31 will be explained later.

(2-3-2-2) Generation of Ising Model

Processing (S2910) that generates the Ising model from the image and the seed of FIG. 30 will be explained.

Here, the Ising model is generated based on the segmentation object image 3000 and the seed specified by the user. Although as the Ising model, there are ones that are shown in FIG. 25 or FIG. 27, which can be selected arbitrarily, in this embodiment, it will be defined in advance by a problem conversion program in the RAM 220. Here, the Ising model shown in FIG. 25 will be explained as an example.

In an Ising model of FIG. 25, the spin on an xy-plane can be made to correspond to the pixel of the object image 3000 as it is. Then, the spin unit 300 includes a spin representing one pixel with two to four interaction coefficients (smoothing terms), one external magnetic field coefficient (foreground data term), and one interaction coefficient (background data term) accompanied.

(2-3-2-3) Generation of Initial Alignment of Spins and Coefficients Corresponding to Ising Model Processing (S2920) of generating the initial alignment of the spins and coefficients of each spin unit 300 of FIG. 30 will be explained.

Regarding the spin, a value of a corresponding pixel will be set. In "(1) Basic configuration of Ising chip," a spin initial value was set at random. This is because in the initial stage, the solution is unknown (that is, it is unknown whether the pixel is in the foreground or in the background). However, in the problem or the image segmentation, a pixel of the seed specified by the user is a pixel whose solution is known in advance. Therefore, in the pixel of the seed specified by the user, the value of the spin is set according to discrimination of the foreground and the background specified by the user. The pixel of the seed specified by the user can be identified by referring to the image data 261 in the HDD. For the pixels other than the seed specified by the user, each of them is set to a random value using a random, number generator etc.

Their coefficients are calculated based on Formula 3, Formula 4, and Formula 5.

The interaction coefficient (smoothing term) $J_{i,j}$ are calculated by Formula 3. This calculation requires a luminance value I(x, y) of each pixel. In order to refer to the luminance value I(x, y), the image data 261 in the HDD is referred to for the luminance value I(x, y).

The interaction coefficient (background data term) is calculated by Formula 4. This calculation requires a luminance histogram θ(c, l) of the background. The luminance histogram, of the background is created by normalizing an occurrence probability of each luminance value based on the data of the pixel specified by the user as the background in the image data 261 stored in the HDD, and is stores in the RAM 220 in advance.

The interaction coefficient (foreground data term) is calculated by Formula 5. The creation method is the same as that of the interaction coefficient, (background data term).

The above processing and calculation are performed by a problem conversion program 221 in the RAM 220 and the data created in order to be set in each spin unit 300 is stored in the HDD 260 as problem data 262. Although these pieces of data are basically digital values in order to be written in the memory, what bit width is selected for the data will be decided in consideration of the size of the image, a processing speed, and the circuit scale of the Ising chip, k, $\lambda_h$, $\lambda_g$, etc. that are constants in the formulae of respective coefficients are set in advance within the problem conversion program 221, or the user sets them with the input device 2900.

(2-3-2-4)

The processing (S2930) of writing the generated spin and coefficients in the spin array 110 of FIG. 30 will be explained. The physical configuration of the spin array 110 in which the data is written is as explained in FIG. 9 to FIG. 15 previously, and the fundamental, configuration is the same.

However, when there exists a spin whose solution is known in advance like the problem of image segmentation, it is necessary to add functions described below.

As was explained previously, in order to avoid the solution from being trapped to the local solution, it is desirable to make the spin shift at random by a predetermined probability during a period when the ground state is being searched.

Incidentally, in the case of the image data segmentation, the user has specified the kind of pixel serving as a reference at first. That is, for example, the pixel specified by the user as the foreground in FIG. 20 is a 100% foreground theoretically, if the user's input is trusted, it should be always treated as the foreground, and the pixel specified as the background should be treated as the background.

However, if the value of the spin is made to shift at random for avoidance of the local optimal solution, the kind of pixel (value of spin) specified by the user will also change. For this reason, a right value will be changed into an erroneous value, and waste arises in the processing.

For this reason, this embodiment adopts a configuration in which the value of the spin corresponding to the pixel specified by the user shall foe invariable.

Figure 32A:
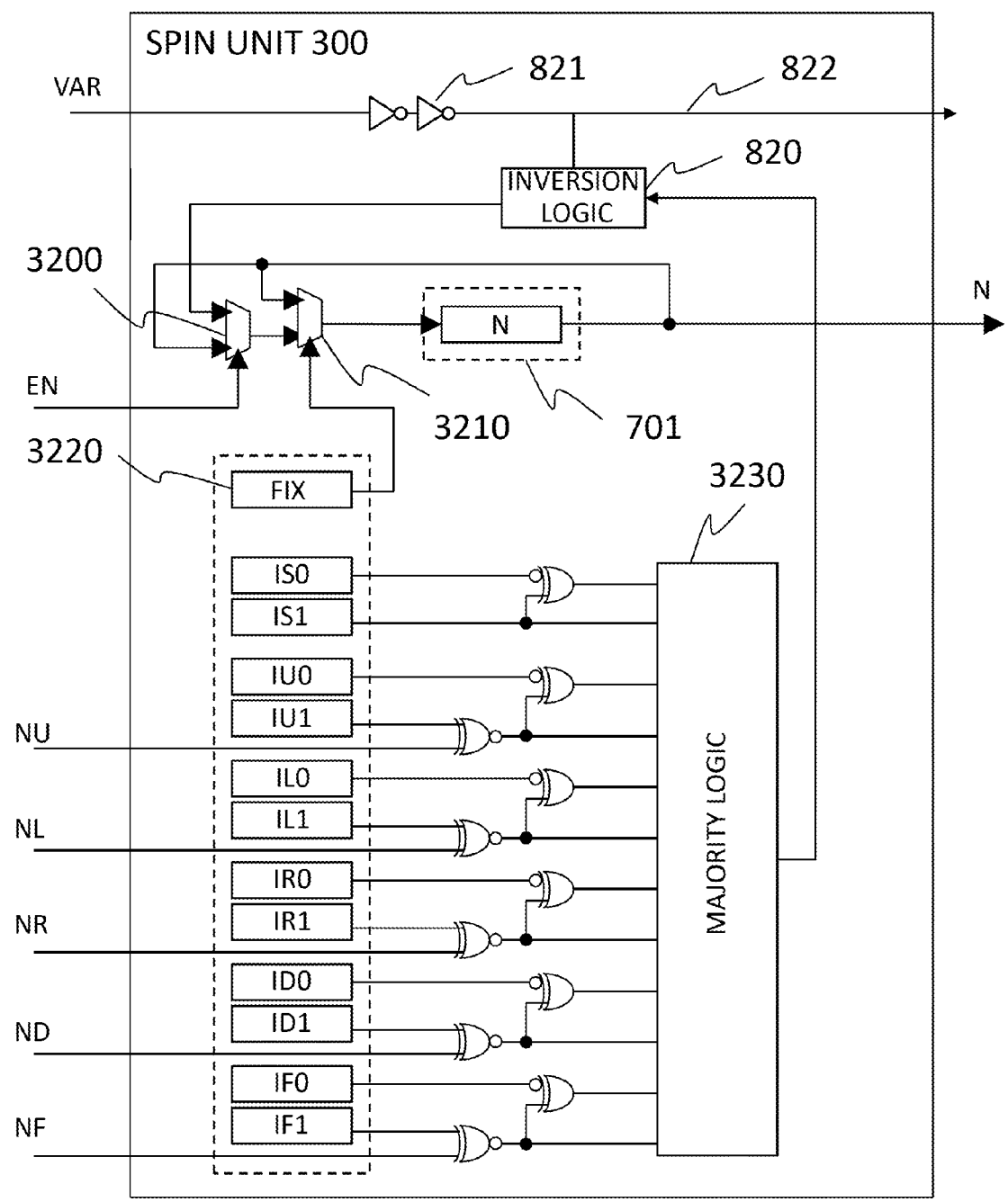
FIG. 32A is a circuit diagram showing a configuration example for performing the interaction between the spin units.

FIG. 32A snows a configuration of the spin unit for the Ising chip intended for the image data segmentation. The same component as that of FIG. 9 is given the same reference letter, its explanation is omitted, and different portions will be explained mainly. Like FIG. 9, an output of the inversion logic circuit 820 is generated using a random number VAR. The output of the inversion logic circuit 820 is inputted into a first multiplexer 3200. Another input of the multiplexer 3200 is data of the memory cell 701 itself.

The enable signal EN inputted into the multiplexer 3200 enables selection of an output of the multiplexer 3200 and setting as to whether the rewriting of the data of the memory cell 701 should be done. When the enable signal is HIGH, the interaction, will be disregarded and the original value of the spin will continue to be written. That is, the value of the spin is maintained at its initial value.

The meaning of the enable signal EN will be explained. As previously described, in the interaction, it is necessary to control so that the values of the neighbor spins may not change simultaneously. Then, the spin unit is divided into two groups, for example, a group A and a group B. Each spin unit 300 has an interface (EN) that inputs therein a signal that permits update of the spin. The interaction address decoder 140 decodes an address (a group's identifier) specified by the interaction address 180, and generates an update enabling signal for each group-Then, update of the spin unit belonging to a group that is permitted for update at that time by the interaction clock 181 is performed.

The output of the multiplexer 3200 is inputted into a multiplexer 3210. Another input of the multiplexer 3210 is the data of the memory cell 701 itself. An output of a memory cell 3220 is inputted into the multiplexer 3210, which selects an output of the multiplexer 3210.

As previously described, in this embodiment, a function of fixing a value of a specific spin is provided. For this reason, data for deciding whether or not to fix the data of the memory cell 701 is stored in the memory cell 3220. For example, when data of the memory cell 3220 is unity, the data of the memory cell 701 itself is selected as the output of the multiplexer 3210, and the data of the memory cell 701 remains unchanged. When the data of the memory cell 3220 is zero, the output of the multiplexer 3200 becomes the data of the memory cell 701. When the data of the memory cell 701 is the data of the foreground or the background selected by the user, the data of the memory cell 3220 is set to unity. In this embodiment, the value of the spin corresponding to the pixel specified by the user, which is a spin (node node) whose value is fixed, is explained as an example. However, since a technique of fixing a value of an arbitral node in this way makes it possible to execute the calculation taking in predetermined constraints when calculating the interaction model, which is not limited to the image segmentation, this is a technique that is high in general purpose usability in ail the interaction model calculations.

The ground state search of the Ising model starts from a random state at first. Moreover, in order to prevent failing into the local solution, processing of restoring the random state by generating random numbers during the ground state search is performed. On the other hand, in the case where the value of the spin is fixed for the data specified by the user and the search is intended to be performed on the basis of this like the segmentation of the image data, it is necessary to fix the value of the spin concerned. Then, the memory cell 3220 called FIX is prepared, and a value of M is fixed when its value is unity. Then, when FIX is zero, the value of N is rewritten as a result of the interaction.

A majority logic circuit 3230 is a logic circuit that calculates the value of energy and decides the value of the spin so that the value of energy spay become small.

In FIG. 32A, the data of the memory cell 701 is made not to be rewritten by the memory cell 3220. On the other hand, the same result is also obtained by the following: the memory cell 3220 is not added, and after the data of the memory cell 701 is rewritten, and subsequently processing of writing back the original data is performed for the data specified by the user. However, the processing speed lowers by as much as a time of write back.

Figure 32B:
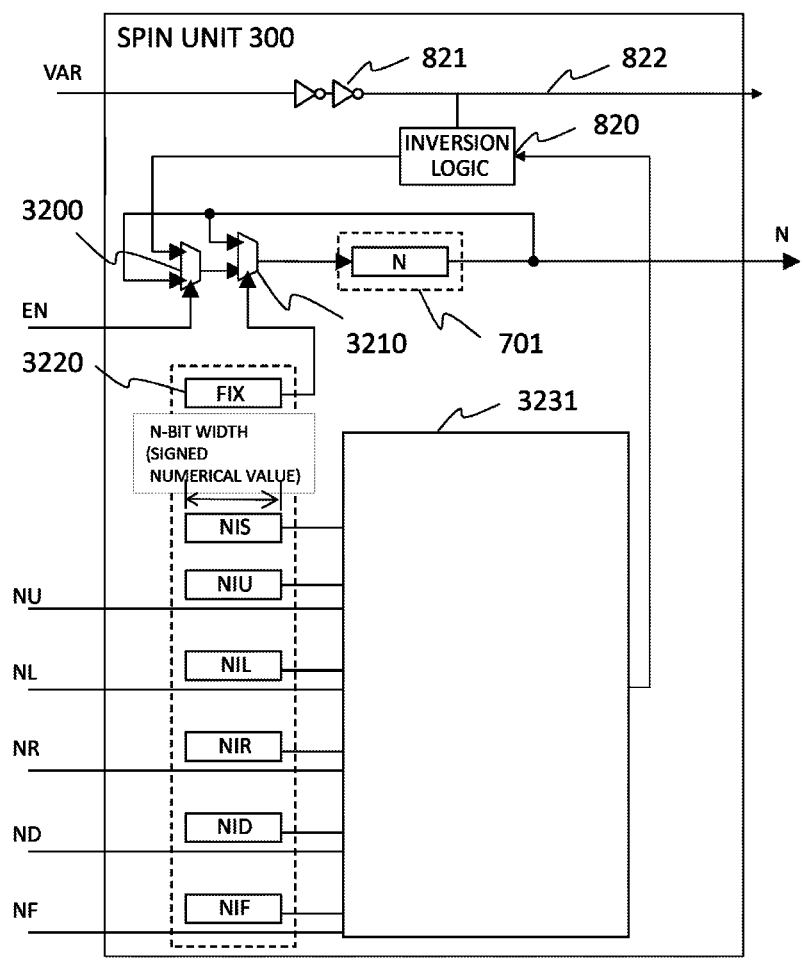
FIG. 32B is a circuit diagram showing a configuration example for performing the interaction between the spin units.

FIG. 32B shows an example in which the memory cell is made multivalued. As previously described, since the interaction coefficient and the smoothing coefficient take analog values, they are converted into digital values when performing initialization. In FIG. 32A, since the coefficient is stored using two 1-bit memory cells, the sign of positive/negative and the binary coefficient can be used. The memory for storing the coefficient can also be made into one for a signed numerical value of n-bit width by making the memory cell multivalued or using multiple memory cells. In this case, the sign of positive/negative and the coefficient for n-1 bits can be stored. Alternatively, an integral value that has the sign of positive/negative by complement notation of two etc. is stored. A next state decision circuit 3231 is a logic circuit that decides the value of the spin so that the value of the energy calculated by Formula 1 using the value of the neighbor spins and the coefficients as inputs may become small. A content of its logic is to judge, when evaluating the product of the value of the neighbor spin and the interaction coefficient and the external magnetic field coefficient, which is more dominant, a positive value or a negative value.

Figure 32C:
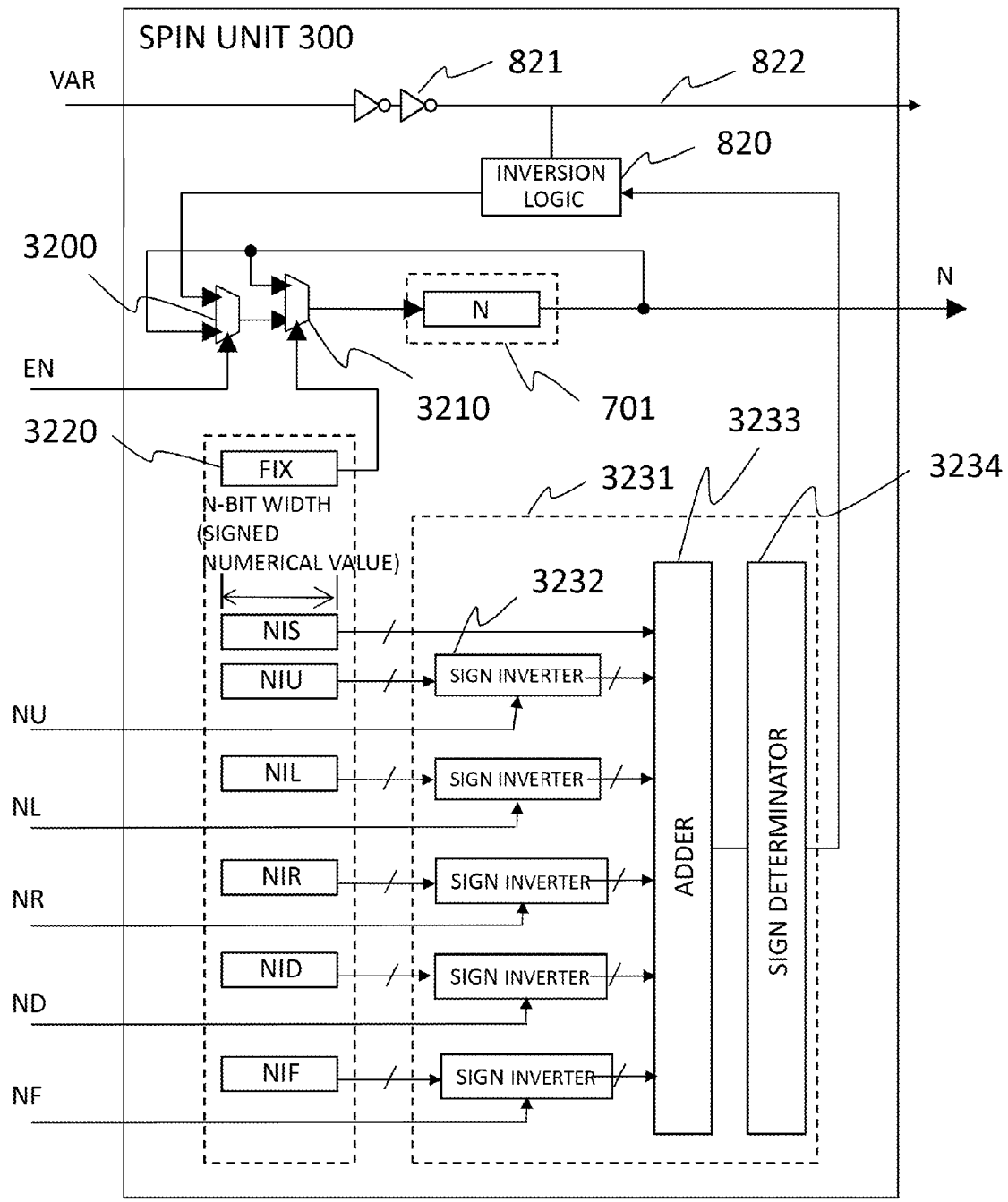
FIG. 32C is a circuit diagram showing a configuration example for performing the interaction between the spin units.

FIG. 32C shows one example of the next state decision circuit 3231. Values indicating the values of the spins are inputted into a sign inverter 3232 from NU, NL, NR, ND, and NF that are the neighbor spins. When a spin is +1, 1 shall be inputted, and when it is −1, 0 shall be inputted. The coefficients are stored in NIU, NIL, NIR, NID, and NIF, for example, and it is assumed that a higher 1 bit represents the sign of positive/negative, and lower bits represent a numerical value (absolute value). The sign inverter 3232 inverts the higher one bit of the coefficient when the spin is zero. Outputs of the sign inverters 3232 are summed by an adder 3233, and an addition result is determined to find its sign of positive or negative by a sign determinator 3234. If the sign is positive, the next state of the spin will become +1, and if being negative, it will become −1. When the addition result is zero, the next state is not decided, and the spin of the memory cell 701 is maintained in a previous state ox is sat to a random value.

FIG. 33 shows a data structure that defines the initial value of the spin and fixation of the value and a format example. A spin initial value definition 3300 defines ID that identifies the spin, the value of the spin, and a fixation flag. Vi that is ID identifying the spin may be an address of the memory in the case where the value of the spin is stored in the memory 701. Although the value of the spin $\sigma_1$ takes a binary of +1 or −1, this becomes a value of unity and zero, for example, when being stored in the memory 701. The fixation flag is stored in the memory 3220 (FIG. 32), and decides whether or not to fix data of the memory 701. Here, the data of the memory 701 corresponding to the pixel specified by the user as the seed will be fixed by the fixation flag.

Spin initial value data 3310 is data for writing the initial value of the spin in the spin array in conformity with the spin initial value definition 3300, and is stored in the RAM 220. This data has entries as many as the number of spins and the entries stand in a line with the ascending order of the spin ID (here v1 to v3). A second row of the data 3310 shows the fixation flag, and in the case of 1 (True) the value of the spin is fixed and in the case of 0 (False) it is not fixed.

Incidentally, by this data, the number of spins becomes twice the number of pixels in the case of the model as shown in FIG. 25, and becomes the same as the number of pixels in the model of FIG. 27.

FIG. 34 shows a memory map in which initial spin alignment showing the Ising model, of FIG. 25 and the coefficients are mapped into memory of FIG. 32A. In the example of FIG. 34, the spin equivalent to a pixel on the XY-plane of FIG. 25 is assigned to blocks of N000, N010, N020, etc. Moreover, (−1) fixed spins of FIG. 25 are assigned to blocks N001, N011, N021, etc. In the block to which the fixed spin was assigned, the memory cell for storing the coefficients is not used. It may be considered that, correspondence of the Ising model, and the memory map is the same as a relation between FIG. 8 and FIG. 12. However, in the example of FIG. 34, each block contains a FIX cell for fixing the spin in the second position from the top.

FIG. 35 shows the map of FIG. 34 with the coefficient and the initial spin alignment written in it. Here, the coefficients are shown as IS0, IS1, IU0, IU1, IL0, IL1, IR0, IR1, ID0, ID1, IF0, and IF1, respectively. In the memory cells 701 of the blocks N001, N011, N021, etc. in which the (−1) fixed spins shown in FIG. 25 are stored, values of zero are stored. Since this value is invariant because it is used for the calculation of a data coefficient, in subsequent processing, the blocks N001, N011, N021, etc. are not made to change, and are not used as being N/A other than the memory cell in which the (−1) fixed spin is stored.

In the memory cells 3220 of the blocks N000 and N010, 1 indicating a flag for fixing the value of the spin is stored. 1 that, is a spin of the pixel specified, by the user as the seed of the foreground is stored in the memory cells 701 of these blocks. The value of the spin is fixed by the fixation flag 1 of the memory 3220. Moreover, a random value is written, in the memory cells 701 of other blocks as the initial values of the spins.

The above processing is performed by an Ising chip control program 222 in the HAM 220, and data is set in the memory cell in the Ising chip.

(2-3-2-5)

Processing (S2940) of searching the ground state and finding a solution of energy minimum of FIG. 30 will be explained.

Figure 36:
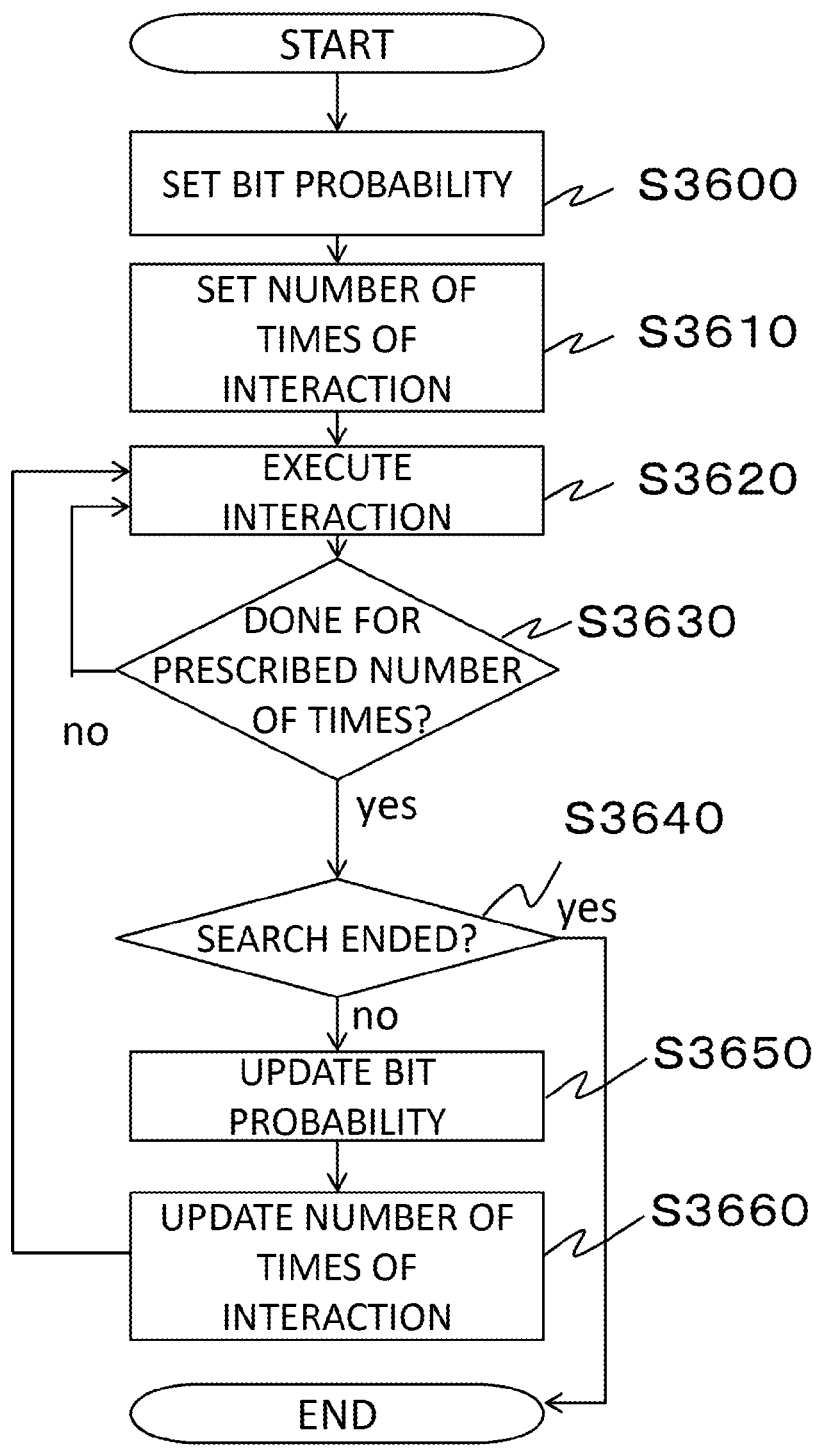
FIG. 36 is a flowchart showing a processing example of ground state search.

FIG. 36 shows a detailed flow of the processing S2940.

S3600 is processing of setting a probability of changing the value of the spin at random in order to escape from the local solution. As was explained previously in FIG. 6, a ratio of unities and zeros is adjusted by the bit adjuster 151 based on the random numbers generated by the random number generator 150. The random number VAR adjusted in FIG. 32 is inputted into the inversion logic circuit 820, and inverts an output of the next state decision circuit 3230 by a predetermined probability.

S3610 is processing that sets the number of times of the interaction. That is, it sets how many times the interaction is made to occur and the value of the spin is rewritten.

When performing the ground state search of a certain Ising model, how much amount of time should be spent (how many times the interaction is required) can be decided to some extent theoretically from a size of the Ising model etc. Therefore, first, in the example of the image segmentation, a time (number of times of the interaction) required for one shot of the ground state search can be decided depending on a sire of the given image (resolution). This setting can be set by the Ising chip control program 222.

An inversion probability of a bit is controlled by the bit adjuster 151 so as to be large in the early stage of the ground state search, and to be small in the final stage. For this reason, as a result of S3600 and S3610, how many times the interaction should be performed is set up in advance for each inversion probability, for example, like Table 1. The inversion probability of the bit and the number of times of the interaction have been set in advance by the Ising chip control program 222 or by the user through the input device 2900. According to Table 1, for example, the interaction of an inversion probability of 50% is performed by 100 times, and subsequently the interaction of an inversion probability of 40% is performed by 100 times. Thus, the ground, state search is ended at a point in time when the interaction has been performed by 460 times while the inversion probability is controlled in this way.

TABLE 1

| Inversion probability | Number of times of interaction | Termination condition (total number of times) |
| --- | --- | --- |
| 50% | 100 times | 100 times |
| 40% | 100 times | 200 times |

TABLE 1-continued

| Inversion probability | Number of times of interaction | Termination condition (total number of times) |
| --- | --- | --- |
| 30% | 100 times | 300 times |
| 20% | 100 times | 400 times |
| 10% | 50 times | 450 times |
| 5% | 10 times | 460 times |

The interaction is executed in S3620. That is, contents of the memory cell of FIG. 35 are read and a next value of the spin is decided in the next state decision circuit 3230. The next value of the spin is inverted by the probability based on the random number VAR adjusted in the inversion logic circuit 820 according to a setting of Table 1. At this time, as was explained in FIG. 10, a point that the neighbor spin units are controlled so as not to perform the interaction simultaneously using the interaction address decoder 140 (FIG. 6) is the same as that of FIG. 16.

However, in this embodiment, when a value of the memory cell 3220 is 1, a value of the memory cell 701 is written back as the value of the spin as it is. That is, the value of the memory cell 701 is fixed. Incidentally, a signal line EN is an interface to which the switching signal for permitting the update of the spin of the spin unit 701 is inputted. By controlling the multiplexer 3200 with this switching signal, it is possible to decide whether the value of the spin maintained in the memory cell 701 is rewritten, to a value from the next state decision circuit 3230.

In S3630, the number of times of the interaction is counted. The search is ended when a termination condition of the search is fulfilled after the interaction has been performed for the number of times stipulated by the termination condition of Table 1 (S3640). The termination condition of the search can be determined by checking whether the total number of times of the interaction has reached the prescribed number of times. For example, in a program of Table 1, it is 460 times.

When the prescribed number of times is not completed, the spin inversion probability is updated (S3650). In an example of Table 1, when total 200 times of interactions are counted in S3630, the inversion probability is updated from 40% to 30%. Next, the number or times of the interaction is incremented (S3660), and execution of the interaction is repeated until the number of times reaches the number of times set by the bit probability. An inversion probability of 30% is updated to 20% after the interaction is executed by total 300 times.

Figure 37:
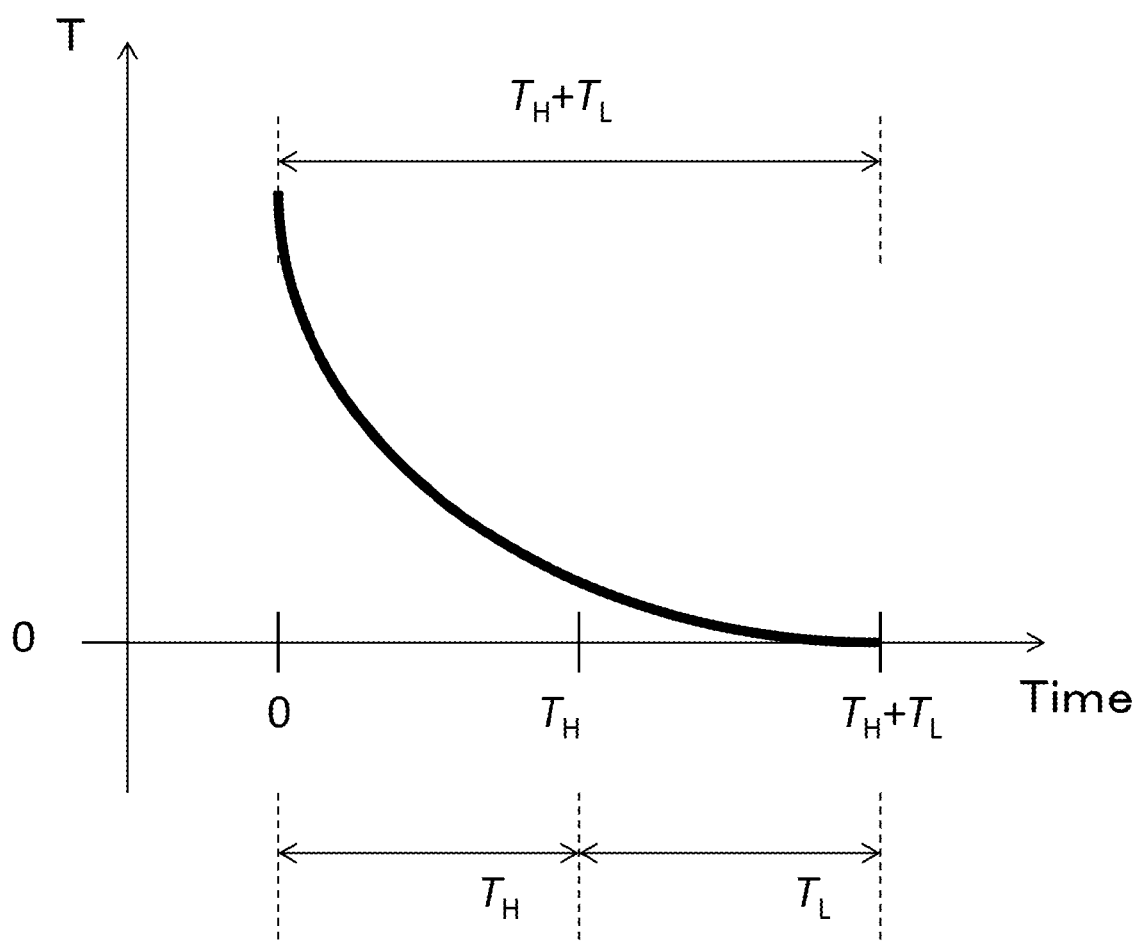
FIG. 37 is a graphical representation showing a relation between a ground state search time and a bit inversion probability.

FIG. 37 explains another concrete example of the spin inversion probability by the inversion logic circuit 820 and a control of fixation of the value of the spin by the memory cell 701. FIG. 37 is a graph that shows the ground state search time (number of times of the interaction) on an abscissa and the spin inversion probability (temperature T) on an ordinate. As was explained in the processing of S3610, the inversion probability of the bit is controlled by the bit adjuster 151 so as to be large in the early stage of the ground state search (high temperature period TH) and be small in the final stage (low temperature period TL). For this reason, the spin inversion probability decreases gradually daring a period of the ground state search TH+TL. Incidentally, although, the spin inversion probability is decreasing curvilinearly in FIG. 37, it may be decreased stepwise as was shown in Table 1.

In the example of FIG. 37, as described above, when setting the spin initial value and the coefficients at time zero that is a start time of the ground state search, the value of the spin of the memory cell 701 corresponding to the seed pixel is fixed. For this reason, 1 that is the spin fixation flag is stored in the memory cell 3220. In this embodiment, the value of the spin, continues to be fixed during a period of high temperature TH. Next, the fixation of the value of the spin is canceled at a start time of the low temperature period TL. For this reason, the spin fixation flag 1 of the memory cell 3220 is rewritten to 0 at the start time of TL. Therefore, during the low temperature period TL, the value of the memory cell 701 is rewritten, to the data such that the output of the next state decision, circuit 3230 is inverted by a predetermined probability. Then, at a point in time TH+TL when a prescribed ground state search time (number of times of the interaction) finishes, and the value of the spin is read and the ground state search is completed.

In the abovementioned processing, the fixation of the value of the spin of the memory cell 701 corresponding to the seed pixel is cancelled halfway. This is because there is a case where even the pixel specified by the user may protrude a region that the user intends actually and it may be better to prioritize the result of the Ising chip over the user's specification. Such a control can be executed, for example, by providing a flag to fix the seed data in conjunction with the inversion probability as shown in Table 2. Moreover, it is also possible to turn OFF the fixation of the seed data at a prescribed timing, not in conjunction with the inversion probability.

TABLE 2

| Inversion probability | Number of times of interaction | Termination condition (total number of times) | Seed data fixation | Value of memory cell 3220 |
|---|---|---|---|---|
| 50% | 100 times | 100 times | ON | 1 |
| 40% | 100 times | 200 times | ON | 1 |
| 30% | 100 times | 300 times | ON | 1 |
| 20% | 100 times | 400 times | ON | 1 |
| 10% | 50 times | 450 times | OFF | 0 |
| 5% | 10 times | 460 times | OFF | 0 |

(2-3-2-6) Reading of Solution and Display of Result

Upon completion of the ground state search (S2960), the value of the memory cell 701 in which the spin is stored is read. Since this serves as the solution, it is stored in the RAM 220 or the HDD 260. Each pixel is classified into the foreground and the background according to the stored value of the spin, and is displayed on the display device 2910. As an aspect of the display, it can be displayed as the mask 2400 showing the foreground, for example, as shown in FIG. 24.

(2-3-2-9) User Interface

An example of processing that the user can direct will be explained referring to FIG. 31 again. When displaying the result, the mask 2400 displayed as the foreground is recordable with a button 3008. Moreover, parts of pixels classified into the foreground and the background can be saved with buttons 3010 and 3020, respectively.

The button 3100 is an execution button, by which image segmentation processing is started. A processing mode can be selected by buttons 3110 and 3120 before the start. The button 3110 is for specifying one-shot execution. The one shot execution is processing that performs the ground state search only once and designates the result as a segmentation result. One shot of the ground state search (S2940) is performed, for example, by K times of the interaction (S3620). Moreover, the button 3120 is a button for specifying multiple time execution. In this case, the number of times is set in a window 3130. In the multiple time execution, the ground state search is performed only for the number of times that was set on the Ising chip and a best result among them is designated as the segmentation result. As a selection criterion for "the best result," the result that minimizes a value of the energy function to the smallest may be selected.

(2-4) Data Structure

A relation among the image data, the problem data of the Ising chip, and the data stored in the memory cell that were explained above will be explained using an example of Table 3.

1 to #3 are the image data. #1 is coordinates (x, y) of the pixel and 2 is the luminance value I (x, y) at the coordinates. The luminance value tabes a value of zero to 100. #3 is a seed hind specified by the user. The foreground is (1) and the background becomes (0).

4 to #6 are problem data. #4 is a spin identifier vi, which specifies a spin in the model of FIG. 25, for example. #5 is the external magnetic field coefficient $h_i$ and the interaction coefficient $J_i$ (although there are plural interaction coefficients, they are described as $J_i$ in Table 3) related to the spin concerned. #6 is the initial value of the spin and identifies the upward direction (+1) and the downward direction (−1) of the spin. Here, the foreground is associated with (+1) of the spin, and the background is associated with (−1) of the spin. Any pixels except the seed are set at random. As is clear from the above, one pixel of an image corresponds to one spin of the Ising model.

7 to #10 are data about memory of the spin unit. #7 is an address for accessing the memory 701 for storing the value of the spin. #8 is an initial value set in the memory 701. Data of (1/0) is set corresponding to the initial value (+1/−1) of the spin specified as the seed. For the spins that are not specified as the seed, 1 or 0 is stored at random. #9 is an address for accessing the memory 3220 for storing the fixation flag of the spin. #10 is data stored in the memory cell 3220, and the fixation flag 1 is stored in the spin unit to which the seed data was set.

Since the initial value data of #8 varies during execution of the ground state search, the value of the spin is read after performing the interaction for multiple times and ending the ground state search, and the kind of a pixel of corresponding coordinates is decided and displayed according to the result.

TABLE 3

| #1 Coordinates | #2 Luminance value | #3 Seed | #4 ID | #5 Coefficient | #6 Initial value | #7 address | #8 spin | #9 address | #10 Fixation flag |
|---|---|---|---|---|---|---|---|---|---|
| (1, 1) | 56 | Foreground 1 | V1 | $h_1, J_1$ | +1 | 0001 | 1 | 0011 | 1 |
| (1, 2) | 58 | Foreground 1 | V2 | $h_2, J_2$ | +1 | 0002 | 1 | 0012 | 1 |
| (1, 3) | 5 | Background 0 | V3 | $h_3, J_3$ | −1 | 0003 | 0 | 0013 | 1 |
| (1, 4) | 12 | n/a | V4 | $h_4, J_4$ | random | 0004 | 1 or 0 | 0014 | 0 |

Pieces of the above data are stored, for example, in the HDD 260, if needed, are copied to the RAM 220, and are used for the processing. Although in Table 3, pieces of data are summarized in one table, they may be configured to be stored in multiple tables that can be referred to each other.

The above configuration may include a single body computer, or arbitrary portions of the input device, the output device, the processor, and the storage device may include other computers connected through a network. The abovementioned two configurations are equivalent as a thought of the present invention, and nothing is different from each other.

In this embodiment, a function equivalent to the function that includes software can be realised with hardware such as Field Programmable Gate Array (FPGA) and Application Specific Integrated Circuit (ASIC). Such an aspect is also included in a range of the present claimed invention.

The present invention is not limited to the abovementioned embodiments, and various modifications are included. For example, it is possible to replace a part of a configuration of a certain embodiment with a configuration of another embodiment, and it is possible to add a configuration of another embodiment to the configuration of the certain embodiment. Moreover, for a part of the configuration of each embodiment, addition, deletion, and replacement of a configuration of another embodiment can be performed.

What is claimed is:

1. A semiconductor device comprising a plurality of units each of which has:
   a first memory cell for storing a value indicating a state of one node of an interaction model;
   a second memory cell for storing an interaction coefficient indicating an interaction from another node connected to the one node;
   a third memory cell for storing a flag for fixing the value of the first memory cell;
   a first arithmetic circuit that decides a next state of the one node based on a value indicating a state ox the other node and the interaction coefficient; and
   a second arithmetic circuit that decides whether or not to record a value indicating the next state in the first memory cell according to a value of the flag.

2. An image segmentation method for extracting a pixel that has a characteristic similar to a characteristic of a seed pixel specified by a user from a plurality of pixels included in an image, the method comprising the steps of:
   using an array having a plurality of units each of which has:
      a memory cell for storing a value of one node of an interaction model;
      a memory cell for storing an interaction coefficient from another node that exerts interaction on the one node;
      a memory cell for storing a bias coefficient of the one node; and
      a logic circuit that decides and rewrites a next state of the one node based on a function of indicating a state of a system including the one node and other nodes;
   making the pixels included in the image correspond to one node of the units;
   reading a value of the one node after rewriting the one node a prescribed number of times; and
   designating the value as a result of the segmentation.

3. The image segmentation method according to claim 2, comprising the step of:
   in rewriting the one node a prescribed number of times, controlling the rewriting so that the rewriting of one node made to correspond to the seed pixel specified by the user may not be performed.

4. The image segmentation method according to claim 3, comprising the steps of:
   in rewriting the one node a prescribed number of times, in a first period among the prescribed number of times, controlling the rewriting so that the rewriting of one node made to correspond to the seed pixel specified by the user may not be performed; and
   in a second period posterior to the first period among the prescribed number of times, controlling the rewriting so that the rewriting of one node made to correspond to the seed pixel specified by the user may be performed.

5. The image segmentation method according to claim 2, comprising the step of:
   in rewriting the one node a prescribed number of times, inverting and rewriting the next state of the one node by a predetermined probability.

6. The image segmentation method according to claim 5, comprising the steps of:
   in rewriting the one node a prescribed number of times, inverting the next state of the one node by a first probability in a first period among the prescribed number of times; and
   inverting the next state of the one node by a second probability lower than the first probability in a second period posterior to the first period among the prescribed numbers of times.

7. The image segmentation method according to claim 2, comprising the steps of:
   when the user specifies a first seed pixel and a second seed pixel from the pixels included in the image and the pixels included in the image are made to correspond to one node of the units, setting a node that is made to correspond to the first seed pixel to a first state and setting a node that is made to correspond to the second seed pixel to a second state; and
   when a value of the one node is read after rewriting the one node a prescribed number of times and is designated as a result of the segmentation, classifying one node that is rewritten to the first state into a segment to which the first seed pixel belongs and classifying one node that is rewritten to the second state into a segment to which the second seed pixel belongs.

8. The image segmentation method according to claim 7, comprising the steps of:
   using a smoothing term that indicates a difference of a characteristic between a pixel corresponding to the other node and a pixel corresponding to the one node as an interaction coefficient from the other node;
   using a first data term indicating a similarity between a characteristic of the pixel corresponding to the one node and a characteristic corresponding to the first seed pixel as an interaction coefficient from the node that is set to the first node; and
   using a second data term indicating a similarity between the characteristic of the pixel corresponding to the one node and a characteristic corresponding to the second seed pixel as a bias coefficient of the one node.

9. The image segmentation method according to claim 8, wherein when a difference of a characteristic between the pixel corresponding to the other node and the pixel corresponding to the one node is a minimum, a value of the smoothing term takes a positive maximum;

wherein when the difference of the characteristic between the pixel corresponding to the other node and the pixel corresponding to the one node is a maximum, the value of the smoothing term takes a negative maximum; and wherein when the difference is an intermediate value between the maximum and the minimum, the value of the smoothing term takes a value of sere.

10. The image segmentation method according to claim 7, comprising the steps of:

using a smoothing terra indicating a difference of a characteristic between a pixel corresponding to the other node and a pixel corresponding to the one node as an interaction coefficient from the other node; and using a data term indicating a difference between a first data term indicating a similarity between a characteristic of the pixel corresponding to the one node and a characteristic corresponding to the first seed pixel and a second data term indicating a similarity between the characteristic of the pixel corresponding to the one node and a characteristic corresponding to the second seed pixel as a bias coefficient of the one node.

11. The image segmentation method according to claim 10, wherein when a difference of a characteristic between the pixel corresponding to the other node and the pixel corresponding to the one node is a minimum, a value of the smoothing term takes a positive maximum;

wherein when the difference of the characteristic between the pixel corresponding to the other node and the pixel corresponding to the one node is a maximum, the value of the smoothing term takes a negative maximum; and wherein when the difference is an intermediate value between the maximum and the minimum, the value of the smoothing term takes a value of zero.

12. An image processor comprising an input device, an output device, a storage device, and first and second processors, wherein the first processor includes an array having a plurality of units each of which has:
   a memory cell for storing a value of an attention node of an interaction model;
   a memory cell for storing an interaction coefficient from a neighbor node that exerts an interaction on the node; and
   a logic circuit that decides and rewrites a next state of the attention node based on a function of indicating a state of a system including the attention node and the neighbor nodes, and wherein the second processor includes:
a function of making the storage device store an image inputted from the input device;
a function of making the output device display the image inputted from the input device;
a function of permitting a user to specify a predetermined region of the image displayed as a seed region through the input device;
a function of making a plurality of pixels included in the image correspond to the attention node of the units;
a function of setting the attention node corresponding to a pixel in the specified region of the image to a first state; and
a function of rewriting the attention node a prescribed number of times with the logic circuit, and wherein a value of the attention node is read after rewriting the attention node a prescribed number of times, and a pixel corresponding to the attention node set to the first state is displayed on the output device as being belonging to the seed region specified by the user.

* * * * *